US012381871B2

(12) United States Patent
Tokuyama

(10) Patent No.: US 12,381,871 B2
(45) Date of Patent: Aug. 5, 2025

(54) AUTHENTICATION OF USERS ACCESSING CONTENTS IN DISTRIBUTED CLOUD STORAGE

(71) Applicant: Masaaki Tokuyama, Tokyo (JP)

(72) Inventor: Masaaki Tokuyama, Tokyo (JP)

( * ) Notice: Subject to any disclaimer, the term of this patent is extended or adjusted under 35 U.S.C. 154(b) by 722 days.

(21) Appl. No.: 17/605,970

(22) PCT Filed: Mar. 24, 2020

(86) PCT No.: PCT/JP2020/013126
§ 371 (c)(1),
(2) Date: May 24, 2022

(87) PCT Pub. No.: WO2020/217823
PCT Pub. Date: Oct. 29, 2020

(65) Prior Publication Data
US 2022/0286451 A1  Sep. 8, 2022

(30) Foreign Application Priority Data

Apr. 24, 2019  (JP) .................................. 2019-082505
Nov. 28, 2019  (JP) .................................. 2019-215159

(51) Int. Cl.
*H04L 9/40* (2022.01)

(52) U.S. Cl.
CPC .............................. *H04L 63/0861* (2013.01)

(58) Field of Classification Search
CPC ............. G06F 21/32; G06F 2221/2139; G06F 2221/2149; H04L 63/0861; H04L 63/10; H04L 63/105; H04L 63/12; H04L 9/3231
See application file for complete search history.

(56) References Cited

U.S. PATENT DOCUMENTS 5,852,630 A  12/1998  Langberg et al.
8,219,840 B1  7/2012  Nanda et al.
(Continued)

FOREIGN PATENT DOCUMENTS

CN  101937495 A  1/2011
CN  103339634 A  10/2013
(Continued)

OTHER PUBLICATIONS

International Search Report and Written Opinion dated Jul. 14, 2021, PCT Application No. PCT/JP2020/016403, 6 pages.
(Continued)

*Primary Examiner* — Lizbeth Torres-Diaz
(74) *Attorney, Agent, or Firm* — Foley & Lardner LLP

(57) ABSTRACT

An information processing system (100) includes a first terminal (4A), an authentication server (1), and a second terminal (4B). The first terminal (4A) stores, into a plurality of clouds (3) in a distributed manner, a plurality of divided files generated by dividing a file including data of information generated by a first user into a plurality of files. The authentication server (1) authenticates a user to be the user himself or herself. The second terminal (4B) acquires a plurality of divided files distributed across a plurality of clouds (3) by the first terminal (4A) when a second user using the second terminal (4B) is authenticated to be the second user himself or herself by the authentication server (1). The second terminal (4B) acquires a file including data of information generated by the first user by restoring the acquired plurality of divided files.

15 Claims, 45 Drawing Sheets

(56) References Cited

U.S. PATENT DOCUMENTS

| | | | |
|---|---|---|---|
| 8,625,796 B1 | 1/2014 | Ben Ayed | |
| 8,806,227 B2* | 8/2014 | Grinchuk | G06F 21/6218 |
| | | | 713/194 |
| 8,925,058 B1 | 12/2014 | Dotan et al. | |
| 8,943,309 B1 | 1/2015 | Schilder et al. | |
| 9,119,539 B1 | 9/2015 | Dotan et al. | |
| 9,158,904 B1 | 10/2015 | Ross et al. | |
| 9,456,343 B1 | 9/2016 | Mihalache et al. | |
| 9,734,419 B1 | 8/2017 | Ye et al. | |
| 9,934,372 B1* | 4/2018 | Cornelius | G06F 21/32 |
| 10,097,527 B2 | 10/2018 | Brown et al. | |
| 10,142,577 B1 | 11/2018 | Laird | |
| 10,354,126 B1 | 7/2019 | Nagalla | |
| 10,452,823 B2 | 10/2019 | Tokuyama | |
| 10,547,610 B1 | 1/2020 | Faibish et al. | |
| 10,755,512 B1 | 8/2020 | Fernandez et al. | |
| 10,778,450 B1 | 9/2020 | Griffin et al. | |
| 11,288,346 B1 | 3/2022 | Zubovsky et al. | |
| 11,341,573 B1 | 5/2022 | Fiedler et al. | |
| 11,991,249 B2* | 5/2024 | Deng | H04W 4/02 |
| 2002/0138761 A1* | 9/2002 | Kanemaki | H04L 9/3271 |
| | | | 705/317 |
| 2005/0196131 A1 | 9/2005 | Narusawa et al. | |
| 2005/0237957 A1 | 10/2005 | Autret et al. | |
| 2006/0015725 A1 | 1/2006 | Voice et al. | |
| 2006/0268875 A1 | 11/2006 | Hanner | |
| 2007/0126552 A1 | 6/2007 | Fitzgibbon | |
| 2007/0283418 A1 | 12/2007 | Chen et al. | |
| 2009/0150320 A1 | 6/2009 | Geppert | |
| 2009/0249460 A1* | 10/2009 | Fitzgerald | H04L 63/12 |
| | | | 709/206 |
| 2009/0249478 A1 | 10/2009 | Rosener et al. | |
| 2010/0058460 A1 | 3/2010 | Kaiser et al. | |
| 2010/0064365 A1 | 3/2010 | Kanduri et al. | |
| 2011/0293095 A1 | 12/2011 | Ben Ayed | |
| 2012/0011575 A1 | 1/2012 | Cheswick et al. | |
| 2012/0159600 A1 | 6/2012 | Takagi | |
| 2013/0055348 A1 | 2/2013 | Strauss et al. | |
| 2013/0167215 A1 | 6/2013 | Yang | |
| 2013/0182279 A1 | 7/2013 | Yano | |
| 2013/0283372 A1 | 10/2013 | Tsukamoto et al. | |
| 2014/0282868 A1 | 9/2014 | Sheller et al. | |
| 2015/0121544 A1 | 4/2015 | He | |
| 2015/0161370 A1 | 6/2015 | North et al. | |
| 2015/0193669 A1 | 7/2015 | Gu et al. | |
| 2015/0312243 A1* | 10/2015 | Ponsford | G06F 21/6236 |
| | | | 713/193 |
| 2015/0339472 A1 | 11/2015 | Baughman et al. | |
| 2015/0379254 A1 | 12/2015 | Matsuda et al. | |
| 2016/0134608 A1 | 5/2016 | Hughes | |
| 2016/0212113 A1 | 7/2016 | Banerjee | |
| 2016/0275324 A1 | 9/2016 | Powell | |
| 2016/0381251 A1 | 12/2016 | Shimazaki | |
| 2017/0063852 A1 | 3/2017 | Azar et al. | |
| 2018/0020349 A1 | 1/2018 | Tyagi et al. | |
| 2018/0035013 A1 | 2/2018 | Share | |
| 2018/0041510 A1 | 2/2018 | Burch et al. | |
| 2018/0121684 A1 | 5/2018 | Goldberg et al. | |
| 2018/0137265 A1 | 5/2018 | Tokuyama | |
| 2018/0203600 A1 | 7/2018 | Hajimusa et al. | |
| 2018/0224989 A1 | 8/2018 | Deasy et al. | |
| 2018/0249070 A1 | 8/2018 | Lau et al. | |
| 2018/0260567 A1 | 9/2018 | Ullom | |
| 2018/0330068 A1 | 11/2018 | Mori | |
| 2019/0018942 A1 | 1/2019 | Takada | |
| 2019/0026456 A1 | 1/2019 | Hon et al. | |
| 2019/0052686 A1* | 2/2019 | Deng | H04W 4/02 |
| 2019/0080592 A1 | 3/2019 | Filatova et al. | |
| 2019/0130082 A1 | 5/2019 | Alameh et al. | |
| 2019/0130083 A1 | 5/2019 | Agassy et al. | |
| 2019/0132482 A1 | 5/2019 | Sue | |
| 2019/0180039 A1 | 6/2019 | Considine et al. | |
| 2019/0196755 A1 | 6/2019 | Nishi | |
| 2019/0207975 A1 | 7/2019 | Wardman et al. | |
| 2019/0238533 A1 | 8/2019 | Pointner et al. | |
| 2019/0258788 A1 | 8/2019 | Hyun et al. | |
| 2019/0268325 A1 | 8/2019 | Roper et al. | |
| 2019/0297134 A1 | 9/2019 | Gold | |
| 2019/0334921 A1 | 10/2019 | Pattar et al. | |
| 2019/0368287 A1 | 12/2019 | Shekhar et al. | |
| 2020/0045038 A1 | 2/2020 | Mumma et al. | |
| 2020/0062218 A1 | 2/2020 | Lee et al. | |
| 2020/0151430 A1 | 5/2020 | Hassan et al. | |
| 2020/0202813 A1 | 6/2020 | Liu | |
| 2020/0213298 A1 | 7/2020 | Ericson | |
| 2020/0274704 A1 | 8/2020 | Matsui et al. | |
| 2020/0322792 A1 | 10/2020 | Shimada | |
| 2020/0334683 A1 | 10/2020 | Zhuang et al. | |
| 2020/0380523 A1 | 12/2020 | Agrawal et al. | |
| 2021/0192183 A1 | 6/2021 | Hasegawa et al. | |
| 2022/0286451 A1* | 9/2022 | Tokuyama | H04L 9/3231 |
| 2022/0335111 A1 | 10/2022 | Lee | |

FOREIGN PATENT DOCUMENTS

| | | |
|---|---|---|
| CN | 104618784 A | 5/2015 |
| JP | 2001-338295 A | 12/2001 |
| JP | 2004-054496 | 2/2004 |
| JP | 2005-122700 | 5/2005 |
| JP | 2005-141436 | 6/2005 |
| JP | 2005-173930 A | 6/2005 |
| JP | 2006-259925 A | 9/2006 |
| JP | 2008-310743 A | 12/2008 |
| JP | 2010-074640 A | 4/2010 |
| JP | 2011-118561 A | 6/2011 |
| JP | 2011-193426 A | 9/2011 |
| JP | 2016-040684 A | 3/2016 |
| JP | 2018-507461 A | 3/2018 |
| JP | 2018-120384 | 8/2018 |
| JP | 2019-021055 | 2/2019 |
| WO | WO-2016/175333 | 11/2016 |
| WO | WO-2016/175334 | 11/2016 |

OTHER PUBLICATIONS

International Search Report and Written Opinion dated Oct. 29, 2020, in related PCT Application No. PCT/JP2020/013126, 7 pages (Japanese Only).

Chinese Office Action issued in corresponding CN Appl. Ser. No. 202080055264.0 dated Jun. 1, 2022 (27 pages).

International Search Report and Written Opinion Dtd Apr. 7, 2020; 8 pgs.

Non-Final Office Action on U.S. Appl. No. 17/631,294 Dtd Aug. 9, 2022.

Notice of Allowance on U.S. Appl. No. 17/631,294 Dtd Nov. 23, 2022.

Office Action issued in connection with Chinese Appl. No. 202080030710.2 dated Sep. 4, 2023.

Non-Final Office Action on U.S. Appl. No. 17/606,379 Dtd Jul. 26, 2024.

* cited by examiner

FIG.5B

AUTHENTICATION BIOMETRIC INFORMATION DB 471

| DATE AND TIME | BIOMETRIC INFORMATION | ACQUIRED INFORMATION | SCORE VALUE |
|---|---|---|---|
| 2019/3/1 12:22:23 | FACE | AAA | 100 |
| 2019/3/1 13:01:35 | VOICE | ‖‖‖‖‖ | −20 |
| 2019/3/1 13:20:16 | IRIS | ●○◎△ | 80 |
| 2019/3/1 14:01:47 | FINGERPRINT | ×○×× | 40 |
| ⋮ | ⋮ | ⋮ | ⋮ |

FIG.5C

AUTHENTICATION USER HABIT DB 472

| DATE AND TIME | USER HABIT | ACQUIRED INFORMATION | SCORE VALUE |
|---|---|---|---|
| 2019/3/1 12:22:23 | DISTANCE BETWEEN FACE AND SCREEN | 250mm | 35 |
| 2019/3/1 12:22:23 | INCLINATION | 25 DEGREES | 40 |
| 2019/3/1 12:22:23 | KEY OPERATION | ○○×× | −15 |
| 2019/3/1 12:22:23 | COMMUNICATION ENVIRONMENT | CORPORATE LAN | 25 |
| 2019/3/1 12:22:23 | POSITION INFORMATION | ×△° ■○' E, ×° ■△' N.L. | 42 |
| ⋮ | ⋮ | ⋮ | ⋮ |

FIG.5D

SCORE VALUE TABLE 473

| DATA TYPE | SCORE VALUE |
|---|---|
| BIOMETRIC INFORMATION | −100∼100 |
| USER HABIT | −50∼50 |
| TOTAL VALUE | 200 |

FIG.7A

FIRST CIPHER KEY DB 476

| NAME | PUBLIC KEY | COMMON KEY |
|---|---|---|
| AUTHENTICATION SERVER | Ka2 | KA |
| SECOND TERMINAL | Kf2 | KF |

FIG.7B

SECOND CIPHER KEY DB 479

| NAME | SECRET KEY | PUBLIC KEY | COMMON KEY |
|---|---|---|---|
| AUTHENTICATION SERVER | — | Kb2 | KB |
| FIRST TERMINAL | Kf1 | Kf2 | KF |

FIG.7C

FILE DIVISION CIPHER KEY TABLE 477

| Kr1 | Kr2 |
|---|---|
| ⋮ | ⋮ |

FIG.8

CIPHER KEY INFORMATION DB 120

| NAME | SECRET KEY | PUBLIC KEY | COMMON KEY |
|---|---|---|---|
| FIRST TERMINAL | Ka1 | Ka2 | KA |
| SECOND TERMINAL | Kb1 | Kb2 | KB |

FIG.12

FILE MANAGEMENT TABLE475

| Li | PAi (PBi) | Kr1(Kr2) | 1(2) |

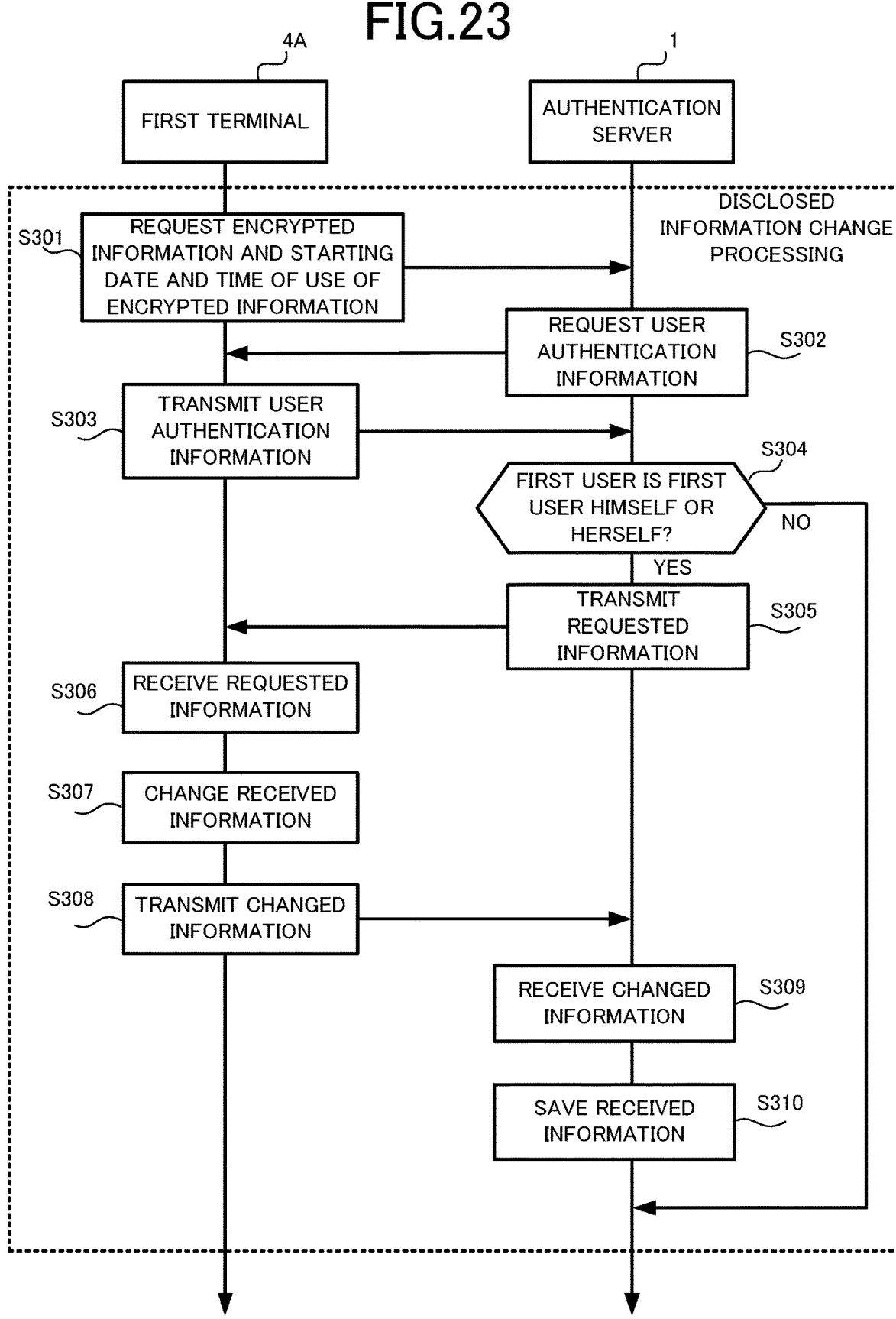

FIG.24A

FIRST CIPHER KEY DB 476A

| NAME | SECRET KEY | PUBLIC KEY | COMMON KEY |
|---|---|---|---|
| AUTHENTICATION SERVER | Kp1 | Kp2 | KC |
| SECOND TERMINAL | — | Kh2 | KE |

FIG.24B

SECOND CIPHER KEY DB 479A

| NAME | SECRET KEY | PUBLIC KEY | COMMON KEY |
|---|---|---|---|
| AUTHENTICATION SERVER | Kg1 | Kg2 | KD |
| FIRST TERMINAL | Kh1 | Kh2 | KE |

FIG.25

CIPHER KEY INFORMATION DB 120A

| NAME | PUBLIC KEY | COMMON KEY |
|---|---|---|
| FIRST TERMINAL | Kp2 | KC |
| SECOND TERMINAL | Kg2 | KD |

FIG.38A

AUTHENTICATION BIOMETRIC INFORMATION DB 471A

| BIOMETRIC INFORMATION TYPE | REGISTERED INFORMATION | MEAN VALUE OF AUTHENTICATION VALUES | ALLOWABLE AUTHENTICATION VALUE | AUTHENTICATION THRESHOLD VALUE |
|---|---|---|---|---|
| FACE | AAA | 0.44 | 0.48 | 0.40 |
| VOICE | ‖‖‖‖ | 0.32 | 0.38 | 0.27 |
| IRIS | ●○◎△ | 0.49 | 0.55 | 0.42 |
| FINGERPRINT | ×○×× | 0.39 | 0.41 | 0.30 |
| ⋮ | ⋮ | ⋮ | ⋮ | ⋮ |

FIG.38B

AUTHENTICATION USER HABIT DB 472A

| USER HABIT TYPE | ACQUIRED INFORMATION | LATEST STATUS | ACCEPTANCE CONDITION |
|---|---|---|---|
| COMMUNICATION CONNECTION | ABC_WLAN | 31 TIMES | CONNECTION COUNT EQUAL TO OR GREATER THAN 100 |
| COMMUNICATION CONNECTION | 123WLAN | 157 TIMES | CONNECTION COUNT EQUAL TO OR GREATER THAN 100 |
| EVENT EXECUTION | ○× PARK | 113 m | DISTANCE WITHIN 100 m |
| EVENT EXECUTION | △● MOVIE THEATER | 72 m | DISTANCE WITHIN 100 m |
| DISTANCE BETWEEN FACE AND TERMINAL DEVICE | — | 262 mm | WITHIN DISTANCE ± 20 mm |
| DEVICE CONNECTION | DEFGH | CONNECTED | CONNECTED |
| ⋮ | ⋮ | ⋮ | ⋮ |

FIG.38C

INCLINATION INFORMATION TABLE 481

| ANGLE | ACQUISITION DATE AND TIME | STANDBY TIME |
|---|---|---|
| 127 DEGREES | 2019/07/12 11:25:32 | 0.5sec |

AUTHENTICATION OF USERS ACCESSING CONTENTS IN DISTRIBUTED CLOUD STORAGE

TECHNICAL FIELD

The present disclosure relates to an information processing system, an information processing method, and a program.

BACKGROUND ART

Conventionally, when giving information generated by an individual to a third party, the individual makes sure not to give the information to a person other than the third party himself or herself by giving the information after confirming that the third party is the third party himself or herself. For example, Patent Literature 1 discloses a technology for authenticating a third party to be the third party himself or herself by biometric authentication and presenting information to the third party himself or herself.

CITATION LIST

Patent Literature

Patent Literature 1: Unexamined Japanese Patent Application Publication No. 2004-054496

SUMMARY OF INVENTION

Technical Problem

In Patent Literature 1, a third party himself or herself can only view information generated by an individual. Therefore, there is a problem that an individual cannot give data of information generated by the individual to an authorized third party.

The present disclosure solves the problem described above, and an objective of the present disclosure is to provide an information processing system, an information processing method, and a program that allow an individual to give data of information generated by the individual to an authorized third party.

Solution to Problem

In order to achieve the aforementioned objective, an information processing system according to the present disclosure includes a first terminal, an authentication server, and a second terminal. The first terminal stores, into a plurality of clouds in a distributed manner, a plurality of divided files generated by dividing a file including data of information generated by a first user into a plurality of files. The authentication server authenticates a user to be the user himself or herself. The second terminal acquires a plurality of divided files distributed across a plurality of clouds by the first terminal when a second user using the second terminal is authenticated to be the second user himself or herself by the authentication server. The second terminal acquires a file including data of information generated by the first user by restoring the acquired plurality of divided files.

Advantageous Effects of Invention

In an information processing system according to the present disclosure, a file saved in a distributed manner by a first user by using a first terminal can be acquired and restored by a second terminal used by a second user when the second user is authenticated to be the second user himself or herself in the second terminal, and therefore data of information generated by an individual can be given to an authorized third party from the individual.

BRIEF DESCRIPTION OF DRAWINGS

FIG. 5B is a diagram illustrating a table in an authentication biometric information database acquired from the terminal illustrated in FIG. 4A;

FIG. 5C is a diagram illustrating a table in an authentication user habit database acquired from the terminal illustrated in FIG. 4A;

FIG. 5D is a diagram illustrating a score value table used in user authentication in the terminal illustrated in FIG. 4A;

FIG. 7A is a diagram illustrating a table in a first cipher key database saved in the terminal illustrated in FIG. 4B;

FIG. 7B is a diagram illustrating a table in a second cipher key database saved in the terminal illustrated in FIG. 4B;

FIG. 7C is a diagram illustrating a file division cipher key table saved in the terminal illustrated in FIG. 4B;

FIG. 8 is a diagram illustrating a table in a cipher key information database saved in the authentication server illustrated in FIG. 2;

FIG. 12 is a diagram illustrating an example of a structure of a file management table;

FIG. 23 is a flowchart of disclosed information change processing in the file deposit processing illustrated in FIG. 22;

FIG. 24A is a diagram illustrating a table in a first cipher key database saved in the terminal according to Embodiment 4 illustrated in FIG. 4B;

FIG. 24B is a diagram illustrating a table in a second cipher key database saved in the terminal according to Embodiment 4 illustrated in FIG. 4B;

FIG. 25 is a diagram illustrating a table in a cipher key information database saved in the authentication server according to Embodiment 4 illustrated in FIG. 2;

FIG. 38A is a diagram illustrating a table in an authentication biometric information database acquired from the terminal illustrated in FIG. 36;

FIG. 38B is a diagram illustrating a table in an authentication user habit database acquired from the terminal illustrated in FIG. 36;

FIG. 38C is a diagram illustrating an inclination information table in the terminal illustrated in FIG. 36;

DESCRIPTION OF EMBODIMENTS

Embodiment 1

An information processing system, an information processing method, and a program according to embodiments of the present disclosure will be described in detail below with reference to drawings. The same or equivalent parts are given the same sign in the diagrams.

An information processing system 100 according to present Embodiment 1 is a system in which a first user can save a file generated by the first user into a plurality of clouds in a distributed manner by using a first terminal, and when a second user given permission by the first user to browse a file is authenticated to be the second user himself or herself by an authentication server, the second user can acquire, restore, and use the file saved in the plurality of clouds in a distributed manner by using a second terminal.

Figure 1:
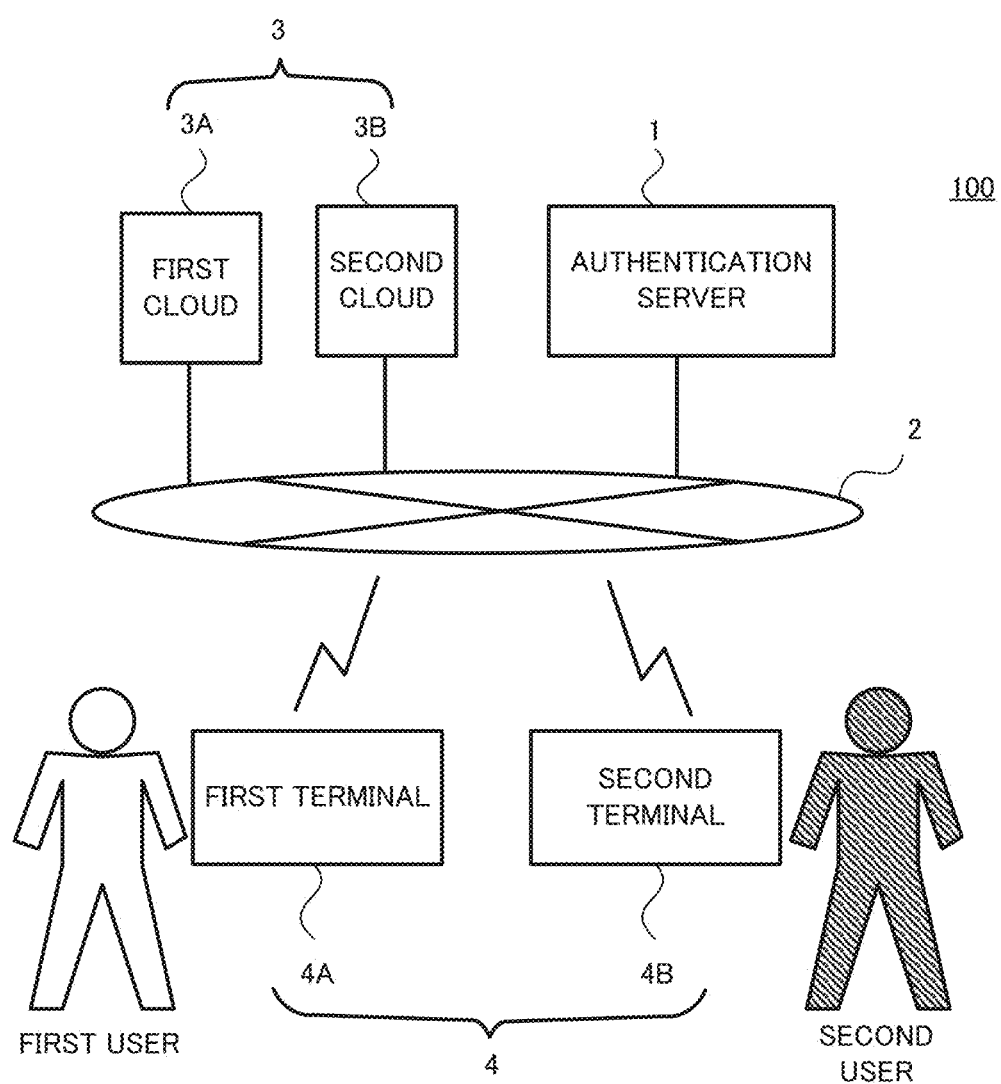
FIG. 1 is a diagram illustrating an entire configuration of an information processing system according to Embodiment 1 of the present disclosure.

FIG. 1 illustrates a configuration of the information processing system 100. The information processing system 100 includes an authentication server 1 authenticating a user to be the user himself or herself, a first cloud 3A and a second cloud 3B saving a file in a distributed manner, a first terminal 4A used by a first user, and a second terminal 4B used by a second user. The first cloud 3A and the second cloud 3B are herein collectively referred to as clouds 3. Further, the first terminal 4A and the second terminal 4B are collectively referred to as terminals 4. The authentication server 1, the clouds 3, and the terminals 4 are interconnected through a network 2.

Figure 2:
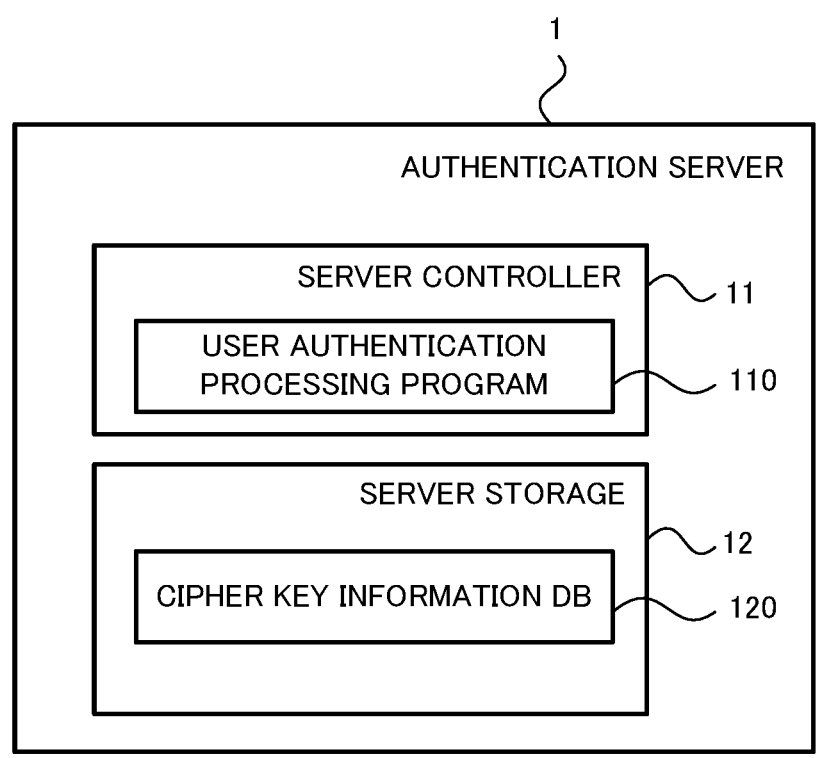
FIG. 2 is a block diagram of an authentication server in the information processing system illustrated in FIG. 1.

Next, FIG. 2 illustrates a configuration of the authentication server 1. The authentication server 1 includes a server controller 11 and a server storage 12. The server controller 11 authenticates a user accessing the authentication server 1 to be the user himself or herself and executes a user authentication processing program 110 for transmitting and receiving various types of data to and from an authenticated user. Details of the user authentication processing program will be described later. Further, the server storage 12 stores a cipher key information database 120 storing a pair key including a secret key and a public key used between the first terminal 4A used by the first user and the second terminal 4B used by the second user, and a common key. Details of the cipher key information database 120 will be described later.

Figure 3A:
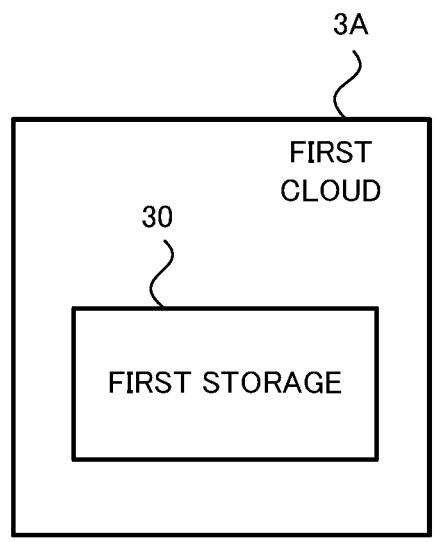
FIG. 3A is a block diagram of a first cloud in the information processing system illustrated in FIG. 1.
Figure 3B:
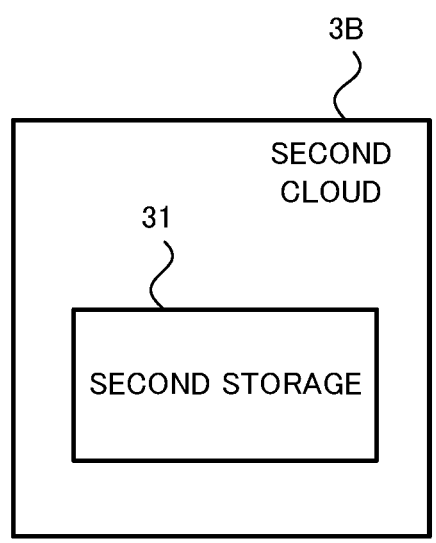
FIG. 3B is a block diagram of a second cloud in the information processing system illustrated in FIG. 1.

Next, FIG. 3A and FIG. 3B illustrate configurations of the first cloud 3A and the second cloud 3B. The first cloud 3A includes a first storage 30 as illustrated in FIG. 3A. Further, the second cloud 3B includes a second storage 31 as illustrated in FIG. 3B.

The terminal 4 according to present Embodiment 1 is a so-called smartphone and has an authentication function using biometric information such as a face image, a fingerprint, and a voiceprint of a user, and user habits such as a specific action and an operation state at the time of a user operating the terminal 4.

Figure 4A:
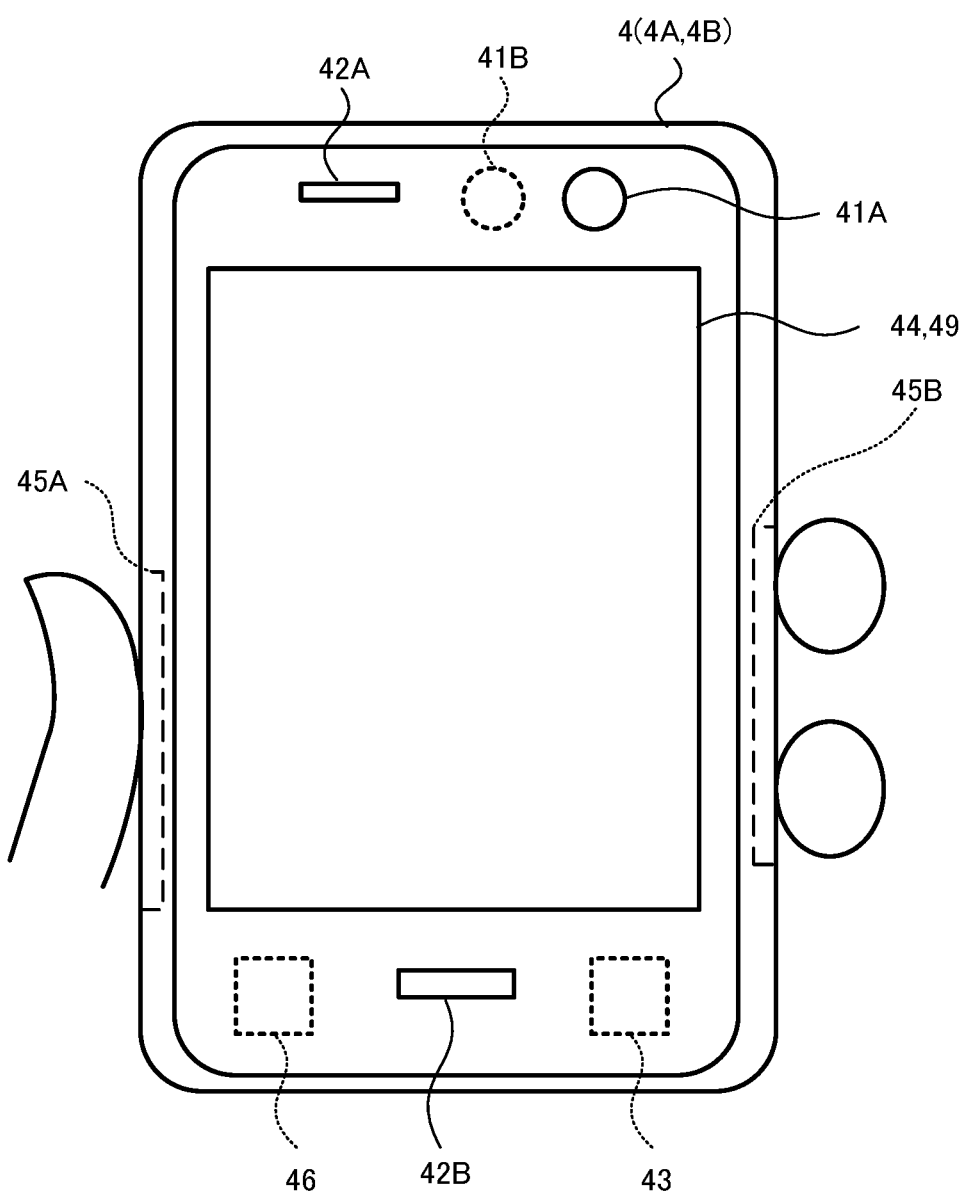
FIG. 4A is a front view of a terminal in the information processing system illustrated in FIG. 1.

As illustrated in FIG. 4A, the terminal 4 includes, on the front of the terminal 4, a front-facing camera 41A capturing an image of the face of a user, a speaker 42A, a telephone conversation microphone 42B, an inclination detector 43 detecting the inclination of the terminal 4, a touch panel serving as both an operation input device 44 and a display 49, a left fingerprint sensor 45A and a right fingerprint sensor 45B detecting fingerprints of a user, and a position detector 46 detecting the current position of the terminal 4. Further, the terminal 4 includes, on the rear, a main camera 41B that can capture an image of a human, a scene, an object, and the like viewed from a user.

The front-facing camera 41A and the main camera 41B are hereinafter collectively referred to as an image capture device 41. The speaker 42A and the telephone conversation microphone 42B are hereinafter collectively referred to as a voice input-output device 42. Further, the left fingerprint sensor 45A and the right fingerprint sensor 45B are hereinafter collectively referred to as a fingerprint detector 45.

Figure 4B:
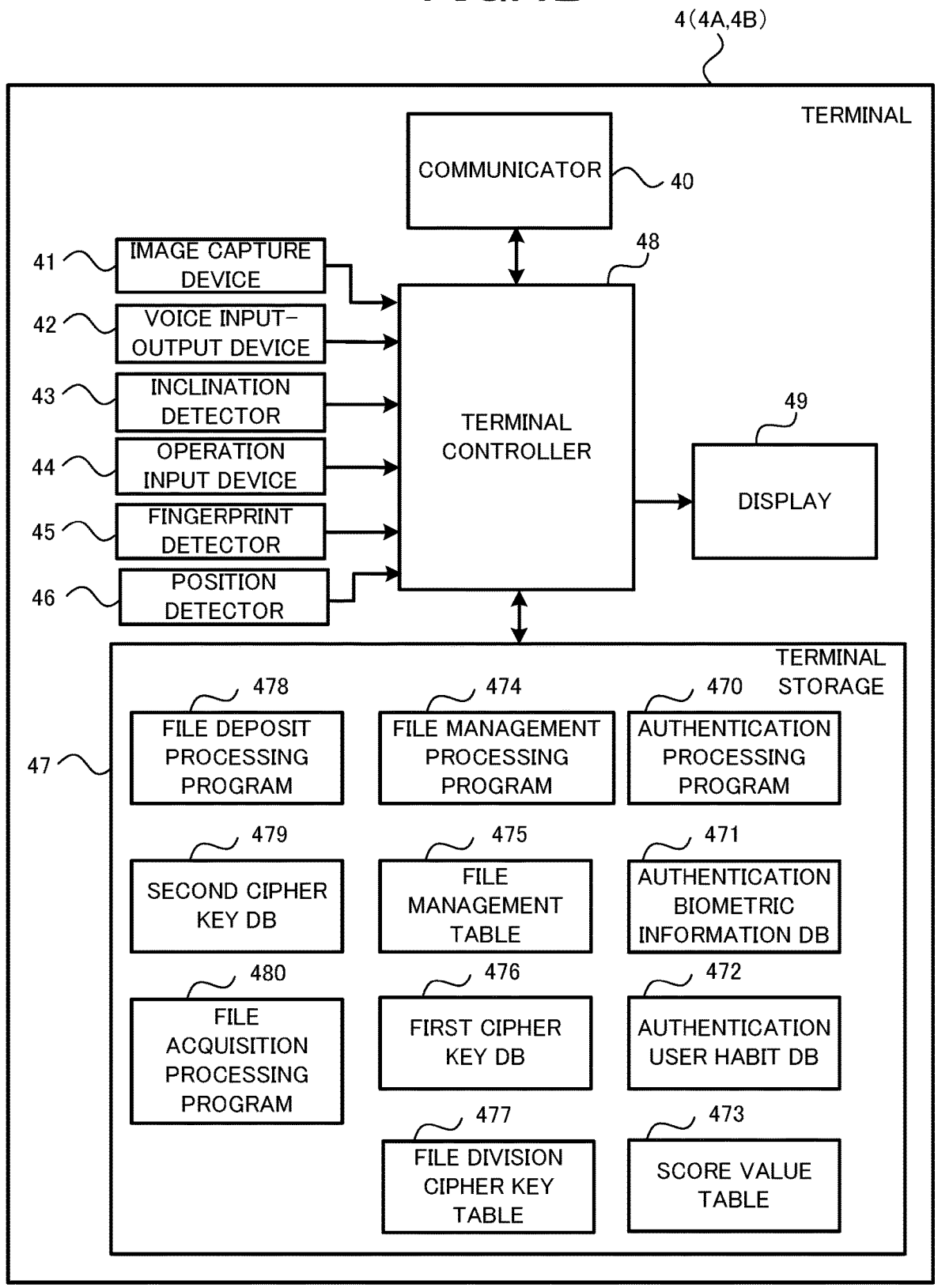
FIG. 4B is a block diagram of the terminal in the information processing system illustrated in FIG. 1.

FIG. 4B is a block diagram illustrating a configuration of the terminal 4. The terminal 4 includes a communicator 40, the image capture device 41, the voice input-output device 42, the inclination detector 43, the operation input device 44, the fingerprint detector 45, the position detector 46, a terminal storage 47, a terminal controller 48, and a display 49.

The communicator 40 communicates with and transmits and receives data to and from the authentication server 1 and the clouds 3 through the network 2 illustrated in FIG. 1; and the communicator 40 includes a data communicator allowing communication and data transmission and reception between the first terminal 4A and the second terminal 4B, and a voice communicator transmitting and receiving wireless signals for telephone communication to and from an unillustrated base station. The data communicator may be configured by using a wireless local area network (LAN), Wi-fi (registered trademark), Bluetooth (registered trademark) or the like. Further, the voice communicator may be configured by using communication equipment transmitting and receiving wireless signals for telephone communication to and from a base station.

The image capture device 41 includes the front-facing camera 41A and the main camera 41B illustrated in FIG. 4A. Various cameras that can capture a static image or a dynamic image and acquire the captured static image or dynamic image, such as a camera using an image pickup device such as a charge coupled device (CCD) or a complementary metal oxide semiconductor (CMOS) image sensor, and a video camera, may be used in the image capture device 41.

The voice input-output device 42 includes the speaker 42A and the telephone conversation microphone 42B illustrated in FIG. 4A. The speaker 42A outputs a voice received in a voice communication, music data externally acquired through the network 2 illustrated in FIG. 1, and the like. The telephone conversation microphone 42B is a device picking up a voice of a user.

The inclination detector 43 is a device that can detect the inclination, shake, and the like of the terminal 4. The inclination detector 43 may be configured by using various sensors that can detect the inclination of the terminal 4, such as an acceleration sensor, an angle sensor, and a magnetic sensor detecting geomagnetism. The number of sensors such as an acceleration sensor and an angle sensor may be one or more than one. Further, the number of types of sensor may be one or more than one.

The operation input device 44 is a device that can input an operation by a user illustrated in FIG. 4A. The fingerprint detector 45 is a sensor detecting a fingerprint of a user. The fingerprint detector 45 includes the left fingerprint sensor 45A and the right fingerprint sensor 45B illustrated in FIG. 4A. Any type of sensor, equipment, or the like that can detect a fingerprint of a user may be used as the fingerprint detector 45 without being limited to a fingerprint sensor.

The position detector 46 is a device that can detect the current position of the terminal 4. The position detector 46 may be configured by using equipment that can detect the current position of the terminal 4, such as the Global Positioning System (GPS).

The terminal storage 47 includes an authentication processing program 470, an authentication biometric information database 471, an authentication user habit database 472, a score value table 473, a file management processing program 474, a file management table 475, a first cipher key database 476, a file division cipher key table 477, a file deposit processing program 478, a second cipher key database 479, and a file acquisition processing program 480.

The authentication processing program 470 is a program performing processing of authenticating a user. The authentication biometric information database 471 is a database saving information about biometric information of a user and an authentication result. The authentication user habit database 472 is a database saving information about a user-specific habit at the time of operation of the terminal 4 and an authentication result. The user-specific habit refers to a user-specific behavior at the time of operation of the terminal 4, such as an action of the user at the time of operating the terminal 4, the distance between a screen on the display 49 and the face of the user, a keystroke, the way the user holds the terminal 4, the position in which the terminal 4 is used, and a communication environment.

The score value table 473 is a database storing an upper limit and a lower limit of each of score values related to biometric information of a user and user habits that are preregistered in the terminal 4, and a score value being a threshold value for user authentication.

The file management processing program 474 is a program for managing processing of distributing an information file to a plurality of clouds by the terminal 4, and a saving destination of the distributed information file. The file management table 475 is a table for managing a saving destination of a distributed information file.

The first cipher key database 476 is a database saving a cipher key pair including a secret key and a public key used with the authentication server 1 and the second terminal 4B used by the second user, and a common key. The file division cipher key table 477 is a table for managing cipher keys for encrypting and decrypting data of an information file saved in the first cloud 3A and the second cloud 3B in a distributed manner by the first terminal 4A used by the first user. The file deposit processing program 478 is a program performing processing of dividing data of an information file by the first terminal 4A used by the first user and depositing the divided files in the first cloud 3A and the second cloud 3B.

The second cipher key database 479 is a database storing a pair key including a secret key and a public key used with the authentication server 1 and the first terminal 4A used by the first user, and a public key. The file acquisition processing program 480 is a program for performing processing of acquiring data of an information file divided by the first terminal 4A used by the first user from the first cloud 3A and the second cloud 3B and restoring the file.

Details of the authentication biometric information database 471, the authentication user habit database 472, the score value table 473, the file management processing program 474, the file management table 475, the first cipher key database 476, the file division cipher key table 477, the file deposit processing program 478, the second cipher key database 479, and the file acquisition processing program 480 will be described later.

The terminal controller 48 executes various programs stored in the terminal storage 47. Further, the terminal controller 48 acquires various types of data from the communicator 40, the image capture device 41, the voice input-output device 42, the inclination detector 43, the operation input device 44, the fingerprint detector 45, and the position detector 46, processes the data, and stores the processed data into various databases in the terminal storage 47.

The display 49 displays processing results of various programs executed by the terminal controller 48. Further, the display 49 can display images captured by the image capture device 41, such as a static image and a dynamic image, data input from the operation input device 44, and the like. The display 49 is superposed on the operation input device 44 and constitutes the touch panel illustrated in FIG. 4A.

Next, an example of a hardware configuration of the terminal 4 will be described referring to FIG. 4C. The terminal 4 includes a processor 51 executing various programs, a memory 52 for loading various programs, a display controller 53 outputting various types of display data, display equipment 54 displaying various types of display data, an I/O port 55 for connecting the image capture device 41, the voice input-output device 42, and the like, storage equipment 56 storing various programs and various types of data, and communication equipment 57 communicating with the outside and transmitting and receiving data. The processor 51, the memory 52, the display controller 53, the display equipment 54, the I/O port 55, the storage equipment 56, and the communication equipment 57 are interconnected through a data bus 58.

The processor 51 reads various programs stored in the storage equipment 56, loads the programs into the memory 52, and executes the programs. The processor 51 may be configured by using a processing device such as a central processing unit (CPU) or a micro-processing unit (MPU). Further, the memory 52 may be configured by using a storage element such as a volatile or nonvolatile semiconductor memory such as a random access memory (RAM) or a flash memory, and a storage medium.

The display controller 53 is a controller outputting various types of display data to the display equipment 54. The display controller 53 may be configured by using a video signal output device such as a video card, a graphics processing unit (GPU), or a graphics board. Further, the display equipment 54 may be configured by using a display device such as a liquid crystal display (LCD) or an organic electroluminescence (EL) monitor.

The I/O port 55 is a connection port that can be connected to the image capture device 41, the voice input-output device 42, the inclination detector 43, the operation input device 44, the fingerprint detector 45, and the position detector 46. The I/O port 55 may be configured by using various ports that can be connected to equipment, such as a universal serial bus (USB) port and an IEEE 1394 port.

The storage equipment 56 is equipment storing various programs executed by the processor 51 and various types of data used in the various programs. The storage equipment 56 may be configured by using a storage device such as a harddisk drive (HDD) or a solid state drive (SSD).

The communication equipment 57 is equipment that can transmit and receive various types of data to and from the authentication server 1 and the clouds 3 through the network 2 illustrated in FIG. 1. The communication equipment 57 may be configured by using various types of equipment performing communication by a wireless local area network (LAN), Bluetooth (registered trademark), wireless communication, and the like.

Next, a user authentication method in the terminal 4 will be described below referring to FIG. 5A to FIG. 5D.

The terminal controller 48 in the terminal 4 illustrated in FIG. 4B acquires biometric information when a power button is depressed, when an operation such as fingerprint detection by the fingerprint detector 45 is performed on the terminal 4 by a user, or when a request for user authentication is made by another program. Data of biometric information acquired by the terminal controller 48 include an image of the face of a user captured by the front-facing camera 41A illustrated in FIG. 4A, a voice of a user picked up by the telephone conversation microphone 42B, an image of an iris of a user captured by the front-facing camera 41A, and a fingerprint detected by the fingerprint detector 45.

For example, when a user brings the terminal 4 to a position where the front of the display 49 illustrated in FIG. 4A faces the face of a user, the terminal controller 48 captures an image of the face of the user by the front-facing camera 41A illustrated in FIG. 4A and acquires the image as biometric information of the user. Further, for example, when a user places a call to another person from the terminal 4 and speaks over the telephone, when a user speaks when using the terminal 4, or when a user is required to speak in accordance with an instruction displayed on the screen of the display 49 in the terminal 4, the terminal controller 48 acquires a voice of the user picked up by the telephone conversation microphone 42B as biometric information of the user. When a user holds the terminal 4 and brings the front of the display 49 illustrated in FIG. 4A close to the face at a certain distance or less, the terminal controller 48 acquires an image of an iris of the user captured by the front-facing camera 41A as biometric information of the user. When a user holds the terminal 4 for a predetermined time or longer, the terminal controller 48 acquires a fingerprint detected by the fingerprint detector 45 as biometric information of the user.

Further, for example, there is a case that a condition for acquiring a plurality of pieces of biometric information is met such as a case of a user bringing the terminal 4 to a position where the front of the display 49 illustrated in FIG. 4A faces the face of the user and the user subsequently holding the terminal 4 for a predetermined time or longer. In this case, an order of priority of biometric information to be acquired is predetermined, and biometric information of the user is acquired in order of priority. For example, it is assumed that an image of the face, a voice, an iris, and a fingerprint of a user are prioritized in this order. In this case, when the aforementioned user brings the terminal 4 to a position where the front of the display 49 illustrated in FIG. 4A faces the face of the user and the user subsequently holds the terminal 4 for a predetermined time or longer, biometric information is acquired in an order of an image of the face and a fingerprint of the user.

Figure 5A:
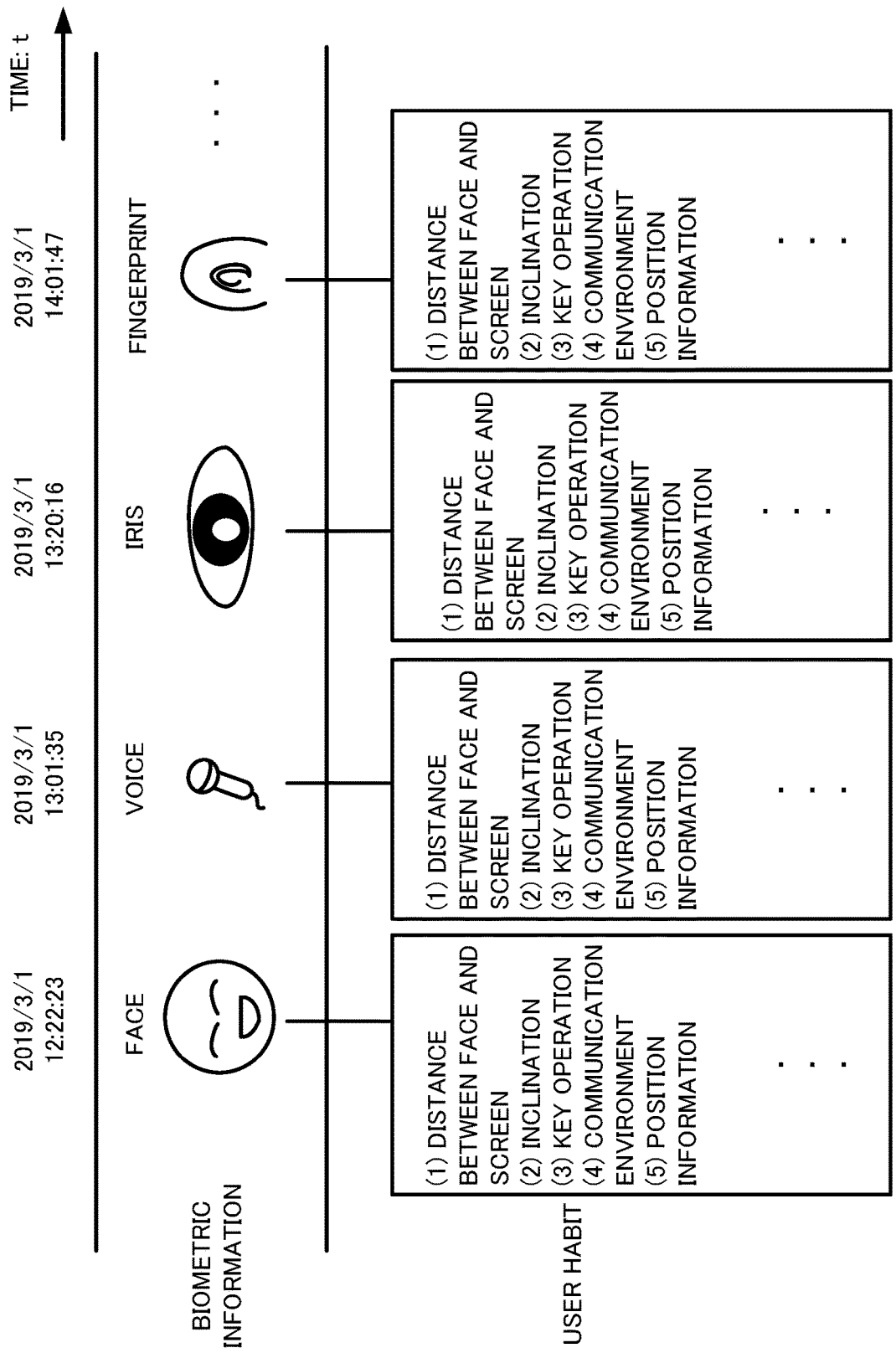
FIG. 5A is a diagram illustrating an overview of personal authentication data acquired from the terminal in the information processing system illustrated in FIG. 1.

For example, it is assumed that a user brings the terminal 4 to a position where the front of the display 49 illustrated in FIG. 4A faces the face of the user at 12:22:23 on Mar. 1, 2019, as illustrated in FIG. 5A. The terminal controller 48 captures an image of the face of the user by the front-facing camera 41A and saves the image into the terminal 4 as biometric information of the user. The terminal controller 48 determines a degree of similarity by comparing a feature value in an image of the face of the user, the feature value being preregistered in the terminal 4, with a feature value in the image of the face of the user acquired from the front-facing camera 41A.

A score value is determined from the degree of similarity. The score value is determined to take an upper limit when a preregistered feature value of data matches a feature value of data acquired by the terminal controller 48 and is determined to take a lower limit in a case of a mismatch. In a case other than a match or a mismatch, the score value takes a value set according to the degree of similarity between the feature values.

An upper limit and a lower limit of a score value are stored in the score value table 473 stored in the terminal storage 47 in the terminal 4 illustrated in FIG. 4B. FIG. 5D illustrates score values set in the score value table 473. In the score value table 473, −100 to 100 is set as a lower limit and an upper limit of a score value in biometric information. Further, −50 to 50 is set as a lower limit and an upper limit of a score value in user habit data.

Assuming that feature values match, a score value is determined to be the upper limit 100 of biometric information set in the score value table 473 illustrated in FIG. 5D. The terminal controller 48 writes data of the acquired biometric information and the determined score value into the authentication biometric information database 471 illustrated in FIG. 4B. FIG. 5B illustrates a table in the authentication biometric information database 471. The table in the authentication biometric information database 471 includes items of a date and time of acquisition of biometric information by the terminal controller 48, the type of the acquired biometric information, information acquired as the biometric information, and a score value.

The terminal controller 48 writes 12:22:23 on Mar. 1, 2019 being a date and time of acquisition of biometric information into the date and time item in the table in the authentication biometric information database 471 illustrated in FIG. 5B. The terminal controller 48 writes face into the type of the acquired biometric information item. The terminal controller 48 writes data of a user face image acquired from the front-facing camera 41A into the acquired information item. The terminal controller 48 writes 100 into the score value item.

Next, the terminal controller 48 acquires user habit data. The user habit refers to a user-specific behavior such as an action when the user uses the terminal 4, an operation state, a location, and a communication state. User habit data acquired by the terminal controller 48 are data at the same date and time as when biometric information is acquired. For example, at 12:22:23 on Mar. 1, 2019 described in FIG. 5A, the terminal controller 48 acquires, as user habit data, the distance between the face of the user and the screen of the display 49, the distance being determined from an image of the face of the user captured by the front-facing camera 41A illustrated in FIG. 4A, the inclination angle of the terminal 4 determined by the inclination detector 43, stroke data of a key operation determined by the operation input device 44, information about a communication environment acquired from the communicator 40, and position information of the terminal 4 acquired from the position detector 46.

The terminal controller 48 determines a degree of similarity by comparing a feature value in each piece of data related to a user habit, the feature value being preregistered in the terminal 4, with a feature value in each piece of data related to an acquired user habit. The terminal controller 48 determines a score value in each piece of data related to a user habit, based on the determined degree of similarity. The score value takes a value in a range from the lower limit —50 to the upper limit 50 set in the score value table 473 illustrated in FIG. 5D.

The terminal controller 48 writes the acquired user habit data and the determined score value into the authentication user habit database 472 stored in the terminal storage 47 in FIG. 4B. FIG. 5C illustrates a table in the authentication user habit database 472. The table in the authentication user habit database 472 includes items of a date and time of acquisition of user habit data by the terminal controller 48, the type of the user habit, information acquired as the user habit, and a score value.

For example, the terminal controller 48 writes 12:22:23 on Mar. 1, 2019 being the same as the date and time of acquisition of the biometric information into the date and time item in the table in the authentication user habit database 472 illustrated in FIG. 5C. The terminal controller 48 writes the distance between the face and the screen into the user habit item. The terminal controller 48 writes 250 mm into the acquired information item. This 250 mm is the distance between the face of the user and the screen determined by the terminal controller 48 from an image of the face of the user captured by the front-facing camera 41A.

The terminal controller 48 compares the value of the determined distance between the face of the user and the screen with a value of a distance between the face of a user and the screen, the distance being registered in the terminal 4, and determines a score value from a degree of similarity between the values. It is assumed here that while the distances do not match, the degree of similarity is high and the determined score value is 35. The terminal controller 48 writes 35 into the score value item in the table illustrated in FIG. 5C.

Next, the terminal controller 48 writes data related to acquired user habits such as an inclination angle of the terminal 4 determined by the inclination detector 43 into items in the table in the authentication user habit database 472 illustrated in FIG. 5C. When writing of data related to every user habit is completed, the terminal controller 48 adds up score values at the same date and time in the authentication biometric information database 471 illustrated in FIG. 5B and the authentication user habit database 472 illustrated in FIG. 5C.

For example, a score value of biometric information at a date and time of 12:22:23 on Mar. 1, 2019 in the authentication biometric information database 471 illustrated in FIG. 5B is 100. Further, score values of user habits at the same date and time in the authentication user habit database 472 illustrated in FIG. 5C are 35, 40, −15, 25, and 42 in an order from the top. Adding up the biometric information score value 100 and the user habit score values 35, 40, −15, 25, and 42 yields 227.

The terminal controller 48 acquires a score value set to an item of a total value from the score value table 473 illustrated in FIG. 5D. The terminal controller 48 compares the total score value of the biometric information and the user habits with the score value set to the total value item in the score value table 473. The terminal controller 48 authenticates the user using the terminal 4 to be a valid user when the total score value of the biometric information and the user habits is equal to or greater than the score value set to the total value item in the score value table 473 and does not authenticate the user to be a valid user when the total score value is equal to or less than the score value.

For example, 200 is set as a total score value in the score value table 473 illustrated in FIG. 5D. The terminal controller 48 compares the determined total score value 227 with the total score value 200 set in the score value table 473. Since the determined total score value is equal to or greater than the total score value set to the score value table 473, the terminal controller 48 authenticates the user operating the terminal 4 to be a valid user.

The aforementioned user authentication method in the terminal 4 is stored in the terminal storage 47 as the authentication processing program 470. When the power button is depressed, when an operation such as fingerprint detection by the fingerprint detector 45 is performed on the terminal 4 by a user, or when a request is made by another program, the terminal controller 48 performs user authentication by executing the authentication processing program 470.

Processing executed by the authentication processing program 470 will be described below referring to a flowchart of authentication processing illustrated in FIG. 6. When the authentication processing program 470 is started, the terminal controller 48 acquires biometric information such as an image of the face and a fingerprint of a user (Step S1). Next, the terminal controller 48 acquires data related to user habits (Step S2).

The terminal controller 48 determines a degree of similarity by comparing the feature value of biometric information, the feature value being preregistered in the terminal 4, with the feature value of the acquired biometric information. From the determined degree of similarity, the terminal controller 48 determines a score value within the range from the lower limit to the upper limit of a score value of biometric information set in the score value table 473 in FIG. 5D. Further, the terminal controller 48 determines a degree of similarity by comparing the feature value of user habit data, the feature value being preregistered in the terminal 4, with the feature value in the acquired user habit data. From the determined degree of similarity, the terminal controller 48 determines a score value within the range from the lower limit to the upper limit of a score value of a user habit set in the score value table 473 in FIG. 5D (Step S3).

The terminal controller 48 writes data of the acquired biometric information and the determined score value into the authentication biometric information database 471 illustrated in FIG. 4B. Further, the terminal controller 48 writes and stores data of the acquired user habit and the determined score value into the authentication user habit database 472 stored in the terminal storage 47 in FIG. 4B (Step S4).

The terminal controller 48 adds up score values of data of biometric information and user habits at the same date and time (Step S5). The terminal controller 48 acquires the score value set to the total value item in the score value table 473 illustrated in FIG. 5D. The terminal controller 48 compares the total score value of the biometric information and the user habits with the score value set to the total value item in the score value table 473 (Step S6).

When the total score value of the biometric information and the user habits is equal to or greater than the score value set to the total value item in the score value table 473 (Step S6: YES), the terminal controller 48 authenticates the user using the terminal 4 to be a valid user (Step S7). Next, the terminal controller 48 determines the mean value of the feature value of the biometric information preregistered in the terminal 4 and the feature value of the acquired biometric information. The terminal controller 48 updates the feature value of the biometric information registered in the terminal 4 with the determined mean value. Further, the terminal controller 48 determines the mean value of the feature value of user habit data preregistered in the terminal 4 and the feature value in the acquired user habit data. The terminal controller 48 updates the feature value in the user habit data registered in the terminal 4 with the determined mean value (Step S8).

Further, when the total score value of the biometric information and the user habits is equal to or less than the score value set to the total value item in the score value table 473 (Step S6: NO), the terminal controller 48 displays a message that the user is different on the display 49 illustrated in FIG. 4B and returns to Step S1 (Step S9). The authentication processing program 470 is an example of user authentication means in the claims. Further, biometric information of a user is an example of first authentication data in the claims. User habit data are an example of second authentication data in the claims.

Next, cipher keys written in the first cipher key database 476 stored in the terminal storage 47 in the terminal 4 illustrated in FIG. 4B will be described. FIG. 7A illustrates an example of a table in the first cipher key database 476. Items of a name of a target using keys, a public key, and a common key are set in the table. The public key is a key constituting a pair key along with a secret key and is generated by the authentication server 1 and the second terminal 4B used by the second user. Further, the common key is a key used between the first terminal 4A used by the first user, and the authentication server 1 and the second terminal 4B used by the second user. The common key is generated by the first terminal 4A used by the first user.

For example, Ka2 is stored as a public key and KA as a common key for "authentication server" being a name of a target using keys in FIG. 7A. Further, Kf2 is stored as a public key and KF as a common key for "second terminal" being a name of a target using keys.

Next, cipher keys written in the second cipher key database 479 stored in the terminal storage 47 in the second terminal 4B illustrated in FIG. 4B will be described. FIG. 7B illustrates an example of a table in the second cipher key database 479. Items of a name of a target using keys, a secret key, a public key, and a common key are set in the table. The secret key and the public key are keys constituting a pair key. A public key and a common key used between the second terminal 4B and the authentication server 1, and a secret key, a public key, and a common key used between the second terminal 4B and the first terminal 4A are stored in the table.

Out of the keys used between the second terminal 4B and the authentication server 1, the public key is a key generated by the authentication server 1, and the common key is a key generated by the second terminal 4B. Further, out of the keys used between the second terminal 4B and the first terminal 4A, the secret key and the public key are keys generated by the second terminal 4B, and the common key is a key generated by the first terminal 4A. For example, Kb2 is stored as a public key and KB as a common key for "authentication server" being a name of a target using keys in FIG. 7B. Further, Kf1 is stored as a secret key, Kf2 as a public key and KF as a common key for "first terminal" being a name of a target using keys.

Next, keys written in the file division cipher key table 477 stored in the terminal storage 47 in the first terminal 4A illustrated in FIG. 4B and the second terminal 4B illustrated in FIG. 4B will be described. FIG. 7C illustrates an example of a structure of the file division cipher key table 477. Keys stored in the table are keys for encrypting each divided file of an information file divided into a plurality of divided files by the first terminal 4A. For example, Kr1 and Kr2 are written in the table illustrated in FIG. 7C. Kr1 and Kr2 are hereinafter referred to as file division cipher keys.

Further, file division cipher keys are not limited to keys written in the file division cipher key table 477 and are generated by the terminal controllers 48 in the first terminal 4A and the second terminal 4B as needed. Generated file division cipher keys are added at the end of the file division cipher key table 477.

Next, cipher keys written in the cipher key information database 120 stored in the server storage 12 in the authentication server 1 illustrated in FIG. 2 will be described. FIG. 8 illustrates an example of a table in the cipher key information database 120. Items of a name of a target using keys, a secret key, a public key, and a common key are set in the table. The secret key and the public key are keys constituting a pair key. A secret key, a public key, and a common key that are used between the first terminal 4A and the second terminal 4B, and the authentication server 1 are stored in the table.

For example, Ka1 is stored as a secret key, Ka2 as a public key, and KA as a common key for "first terminal" being a name of a target using keys in FIG. 8. Further, Kb1 is stored as a secret key, Kb2 as a public key, and KB as a common key for "second terminal" being a name of a target using keys.

The information processing system 100 according to present Embodiment 1 is a system in which a first user saves a file into the first cloud 3A and the second cloud 3B in a distributed manner by using the first terminal 4A, and when a second user given permission by the first user to browse a file is authenticated to be the second user himself or herself by the authentication server, the second user can acquire and restore, by using the second terminal 4B, the file saved in the first cloud 3A and the second cloud 3B in a distributed manner. Then, a method of saving a file into a plurality of clouds in a distributed manner will be described below referring to FIG. 9 to FIG. 13, assuming that the method is performed by the first terminal 4A used by the first user. Further, a method of acquiring and restoring a file distributed across a plurality of clouds will be described referring to FIG. 9 to FIG. 12 and FIG. 14, assuming that the method is performed by the second terminal 4B used by the second user. A file including data of information generated by the first user is hereinafter referred to as a user deposit file.

Figure 9:
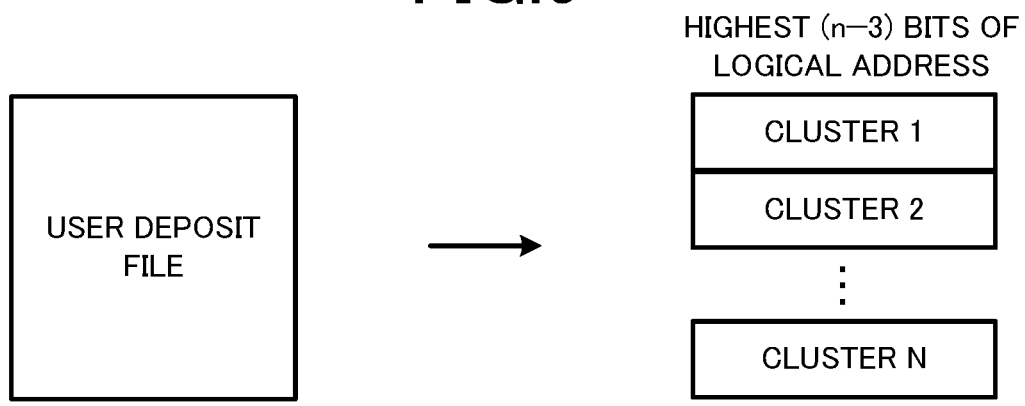
FIG. 9 is a diagram for illustrating division of a user deposit file executed by the terminal illustrated in FIG. 4A.
Figure 10:
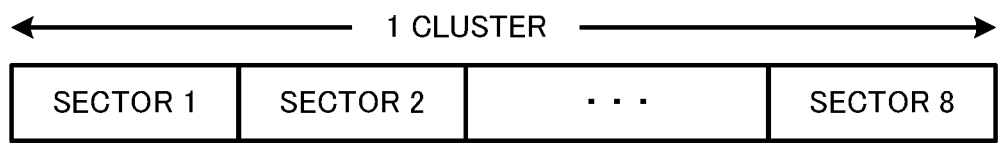
FIG. 10 is a diagram for illustrating a structure of a cluster.

First, the method of saving a file into a plurality of clouds in a distributed manner will be described referring to FIG. 9 to FIG. 13, assuming that the method is performed by the first terminal 4A used by the first user. As illustrated in FIG. 9, one user deposit file is divided into clusters being minimum units of disk access in a computer. While any number of sectors may be included in one cluster, the number is assumed to be eight as illustrated in FIG. 10 in the following description. It is assumed that one sector includes 512 bytes in the present embodiment. Accordingly, one cluster has a size of 4,096 bytes (about 4 Kbytes).

The sector and the cluster are managed by a logical address. A cluster is specified by the highest n−3 bits of an n-bit logical address. Each sector in a cluster is specified by the lowest 3 bits of a logical address. It is assumed in the following description that a logical address in terms of a cluster means the highest (n−3) bits of an entire n-bit logical address.

Figure 11A:
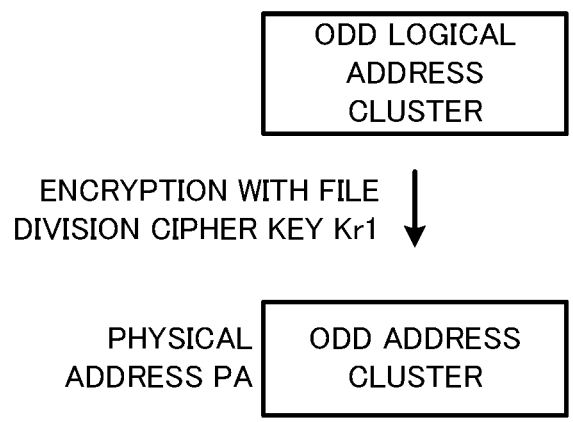
FIG. 11A is a diagram illustrating processing performed on a cluster to which an odd logical address is assigned in encryption processing executed by the terminal illustrated in FIG. 4A.
Figure 11B:
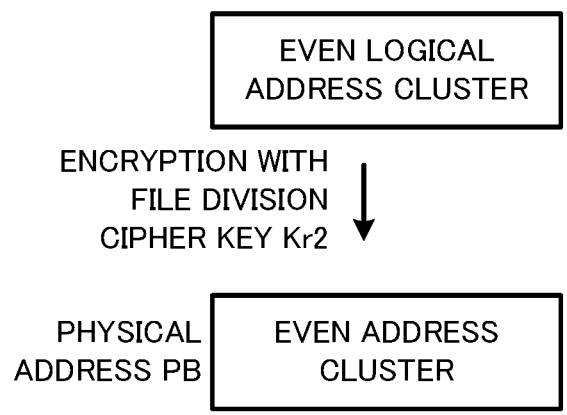
FIG. 11B is a diagram illustrating processing performed on a cluster to which an even logical address is assigned in the encryption processing executed by the terminal illustrated in FIG. 4A.

When storing a user deposit file into the first storage 30 in the first cloud 3A illustrated in FIG. 3A and the second storage 31 in the second cloud 3B illustrated in FIG. 3, processing performed on a cluster assigned with an odd logical address [(n−3) bits] illustrated in FIG. 11A by the terminal controller 48 in the first terminal 4A illustrated in FIG. 4B is different from processing performed on a cluster assigned with an even logical address illustrated in FIG. 11B. A cluster assigned with an odd logical address is hereinafter referred to as an odd logical address cluster. Further, a cluster assigned with an even logical address is hereinafter referred to as an even logical address cluster.

First, the terminal controller 48 in the first terminal 4A acquires file division cipher keys from the file division cipher key table 477 in the terminal storage 47. For example, the terminal controller 48 acquires file division cipher keys Kr1 and Kr2 written in the file division cipher key table 477 illustrated in FIG. 7C.

The terminal controller 48 performs encryption processing with the file division cipher key Kr1 on a cluster assigned with an odd logical address and stores the encrypted cluster into any physical address PA on the first storage 30 in the first cloud 3A illustrated in FIG. 3A. On the other hand, the terminal controller 48 performs encryption processing with the file division cipher key Kr2 on a cluster assigned with an even logical address and stores the encrypted cluster into any physical address PB on the second storage 31 in the second cloud 3B.

After performing the aforementioned processing, the terminal controller 48 generates the file management table 475 illustrated in FIG. 12. The file management table 475 is a table saving a cluster specified by a logical address Li, a physical address PAi or PBi being a storage destination, a file division cipher key Kr1 or Kr2 for encryption, and a number indicating the first cloud 3A or the second cloud 3B including the physical address PAi or PBi that are mapped to each other. For example, the number is set in such a way that the number indicating the first cloud 3A including the physical address PAi is set to "1," and the number indicating the second cloud 3B including the physical address PBi is set to "2," as illustrated in FIG. 12.

The file management table 475 is stored in the terminal storage 47 in the first terminal 4A illustrated in FIG. 4B. It is assumed in present Embodiment 1 that the file division cipher key Kr1 is used when the logical address Li is an even number and the file division cipher key Kr2 is used when the logical address Li is an odd number. In such a case, a cipher key can be specified from the logical address Li, and therefore the file management table 475 does not need to store the file division cipher key Kr1 or Kr2.

Next, the method of restoring a file being encrypted and being stored in the first cloud 3A illustrated in FIG. 3A and the second cloud 3B illustrated in FIG. 3B in a distributed manner as described above will be described referring to FIG. 9 to FIG. 12 and FIG. 14, assuming that the method is performed by the second terminal 4B used by the second user.

The terminal controller 48 in the second terminal 4B illustrated in FIG. 4B acquires, from the server storage 12 in the authentication server 1, the file management table 475 previously saved in the server storage 12 in the authentication server 1 illustrated in FIG. 2 by the first terminal 4A. The terminal controller 48 in the second terminal 4B determines a logical address of the first cluster out of clusters constituting a user deposit file being a target of restoration from the acquired file management table 475.

The terminal controller 48 in the second terminal 4B specifies a cloud 3 and a physical address related to the logical address of the first cluster from the file management table 475. Next, the terminal controller 48 specifies a file division cipher key related to the logical address of the first cluster. The terminal controller 48 reads a cluster, based on the specified cloud 3 and the specified physical address, and performs decryption by using the specified file division cipher key.

The terminal controller 48 in the second terminal 4B executes a similar operation on subsequent clusters and decrypts every cluster. The terminal controller 48 connects the decrypted clusters and restores the user deposit file. A cluster acquired by dividing the user deposit file is an example of a divided file in the claims.

The aforementioned method of storing divided files acquired by dividing a user deposit file into clouds in a distributed manner is included in the file management processing program 474 stored in the terminal storage 47 in the terminal 4 as file storage processing. Further, the method of restoring a user deposit file from divided files stored in clouds in a distributed manner is included in the file management processing program 474 stored in the terminal storage 47 in the terminal 4 as file restoration processing.

First, the file storage processing of dividing a user deposit file and storing the divided files into a plurality of clouds in a distributed manner will be described referring to a flowchart illustrated in FIG. 13. The file storage processing will be described here as processing executed by the terminal controller 48 in the first terminal 4A illustrated in FIG. 4B.

The terminal controller 48 in the first terminal 4A specifies a logical address Li of the first cluster constituting a user deposit file being a saving target and determines whether the address is an odd number (Step S11). When the logical address Li is an odd number (Step S11: YES), the terminal controller 48 encrypts the processing target cluster with the file division cipher key Kr1, as illustrated in FIG. 11A (Step S12). The terminal controller 48 stores the encrypted cluster into an area of an unused physical address PA on the first storage 30 in the first cloud 3A illustrated in FIG. 3A (Step S13).

Next, the terminal controller 48 in the first terminal 4A writes the logical address Li of the processed cluster, a physical address PAi of the storage area, the file division cipher key Kr1, and the number "1" indicating the first cloud 3A including the physical address PAi that are mapped to each other into the table in the file management table 475 illustrated in FIG. 12 and stores the items into the terminal storage 47 illustrated in FIG. 4B (Step S14).

The terminal controller 48 in the first terminal 4A determines whether saving of every cluster is completed (Step S15). When saving of every cluster is not completed (Step S15: No), the terminal controller 48 adds 1 to the logical address Li (Step S18). Next, the terminal controller 48 returns to Step S11 and processes the next cluster.

On the other hand, when the logical address of the processing target cluster is determined to be not an odd number in Step S11 (Step S11: NO), the processing target cluster is encrypted with the file division cipher key Kr2, as illustrated in FIG. 11B (Step S16). The terminal controller 48 in the first terminal 4A stores the encrypted cluster into an area of an unused physical address PB on the second storage 31 in the second cloud 3B illustrated in FIG. 3B (Step S17).

The terminal controller 48 in the first terminal 4A writes the logical address Li of the processed cluster, a physical address PBi in the storage area, the file division cipher key Kr2, and the number "2" indicating the second cloud 3B including the physical address PBi that are mapped to each other into the table in the file management table 475 illustrated in FIG. 12 and stores the items in the terminal storage 47 illustrated in FIG. 4B (Step S14).

The terminal controller 48 in the first terminal 4A determines whether saving of every cluster is completed (Step S15). When saving of every cluster is not completed (Step S15: NO), the terminal controller 48 adds 1 to the logical address Li (Step S18). Next, the terminal controller 48 returns to Step S11 and processes the next cluster. Further, when saving of every cluster is determined to be completed in Step S15 (Step S15: YES), the terminal controller 48 in the first terminal 4A ends the file storage processing.

Figure 14:
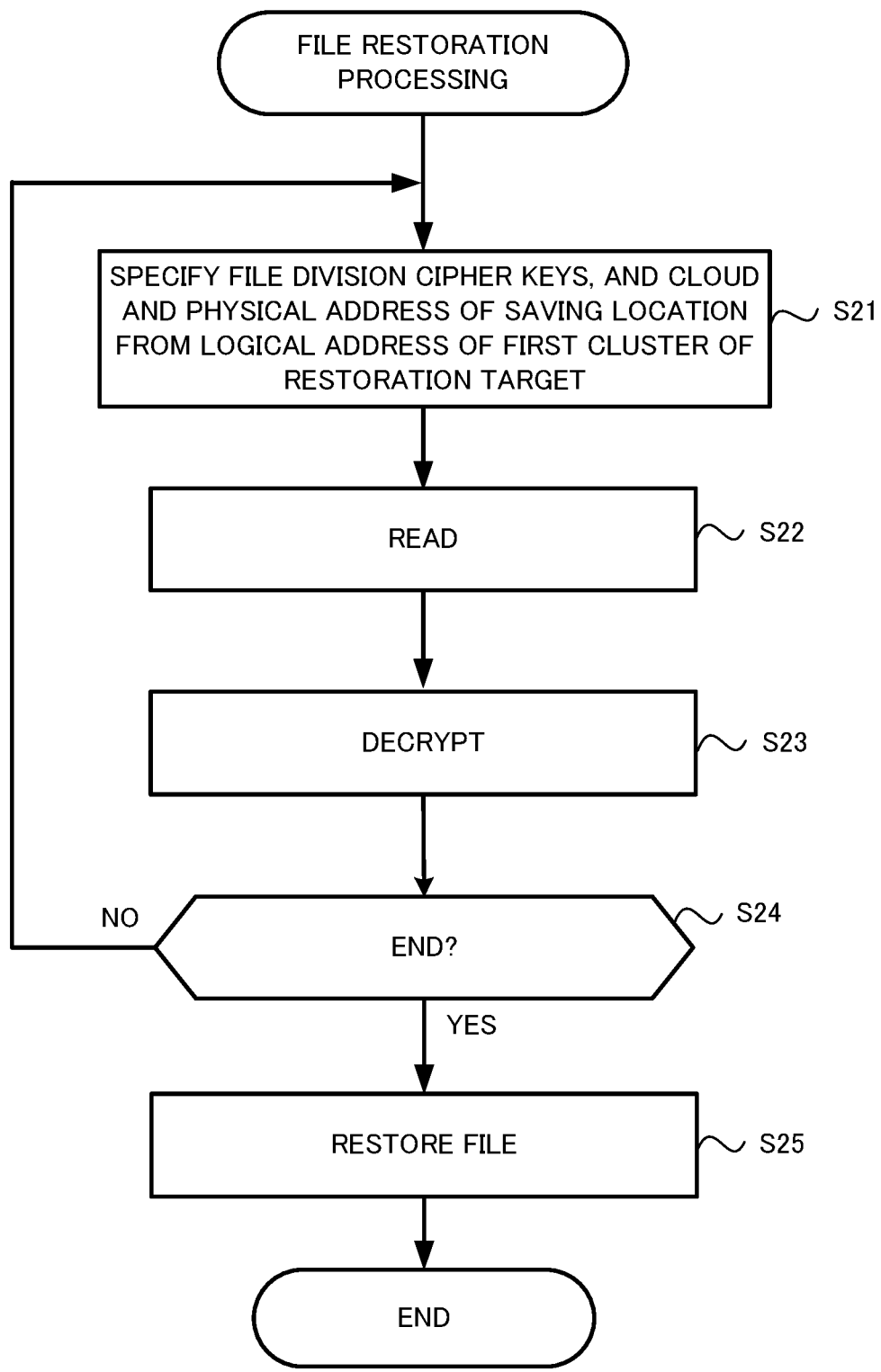
FIG. 14 is a flowchart of file restoration processing.

Next, the file restoration processing of restoring a user deposit file from divided files stored in clouds in a distributed manner will be described referring to a flowchart illustrated in FIG. 14. The file restoration processing will be described as processing executed by the terminal controller 48 in the second terminal 4B illustrated in FIG. 4B.

The terminal controller 48 in the second terminal 4B illustrated in FIG. 4B acquires, from the server storage 12 in the authentication server 1, the file management table 475 previously saved in the server storage 12 in the authentication server 1 illustrated in FIG. 2 by the first terminal 4A. The terminal controller 48 in the second terminal 4B determines a logical address of the first cluster out of clusters constituting the user deposit file being a target of restoration from the acquired file management table 475. The terminal controller 48 specifies a cloud 3 and a physical address related to the logical address of the first cluster from the file management table 475. Next, the terminal controller 48 specifies a file division cipher key related to the logical address of the first cluster (Step S21).

The terminal controller 48 in the second terminal 4B reads data, based on the specified cloud 3 and the specified physical address (Step S22). The terminal controller 48 decrypts a cluster read from the specified cloud 3 and the specified physical address by using the specified file division cipher key (Step S23). Next, the terminal controller 48 determines whether reading of every cluster constituting the user deposit file is completed (Step S24).

When reading of every cluster constituting the user deposit file is not completed (Step S24: NO), the terminal controller 48 returns to Step S21 and executes Step S21 to Step S23 on the next cluster. Further, when reading of every cluster constituting the user deposit file is completed (Step S24: YES), the terminal controller 48 connects the decrypted clusters and restores the user deposit file (Step S25).

The information processing system 100 according to present Embodiment 1 is a system in which a second user authorized by a first user to use a file can acquire, restore, and use, by using the second terminal 4B, a user deposit file saved in a plurality of clouds 3 in a distributed manner by the first user by using the first terminal 4A, when the second user is authenticated as the second user himself or herself by the authentication server 1. Flows of processing executed in the information processing system 100 will be described below referring to flowcharts illustrated in FIG. 15 to FIG. 19.

Figure 15:
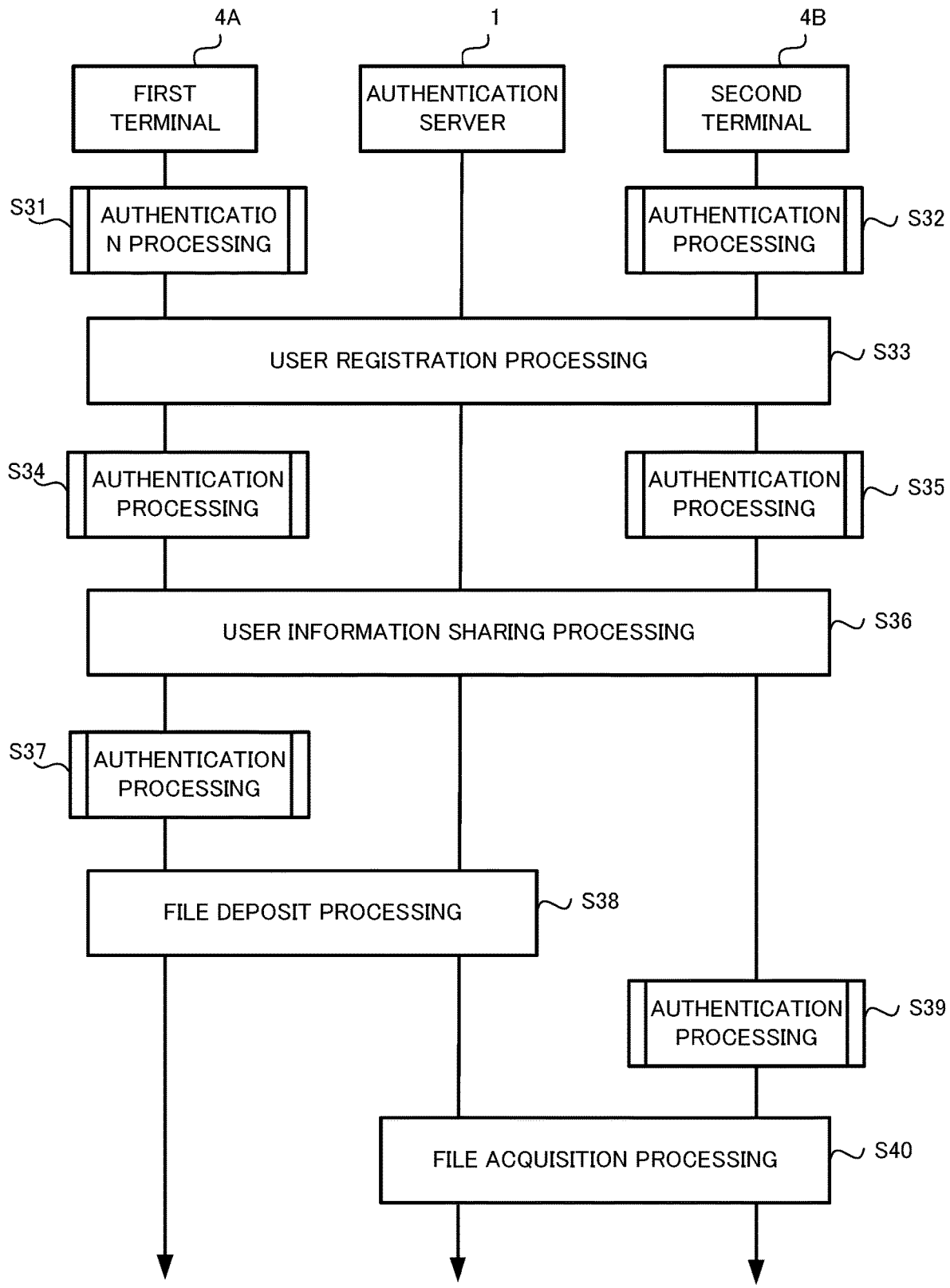
FIG. 15 is a flowchart of file deposit processing in Embodiment 1.
Figure 16:
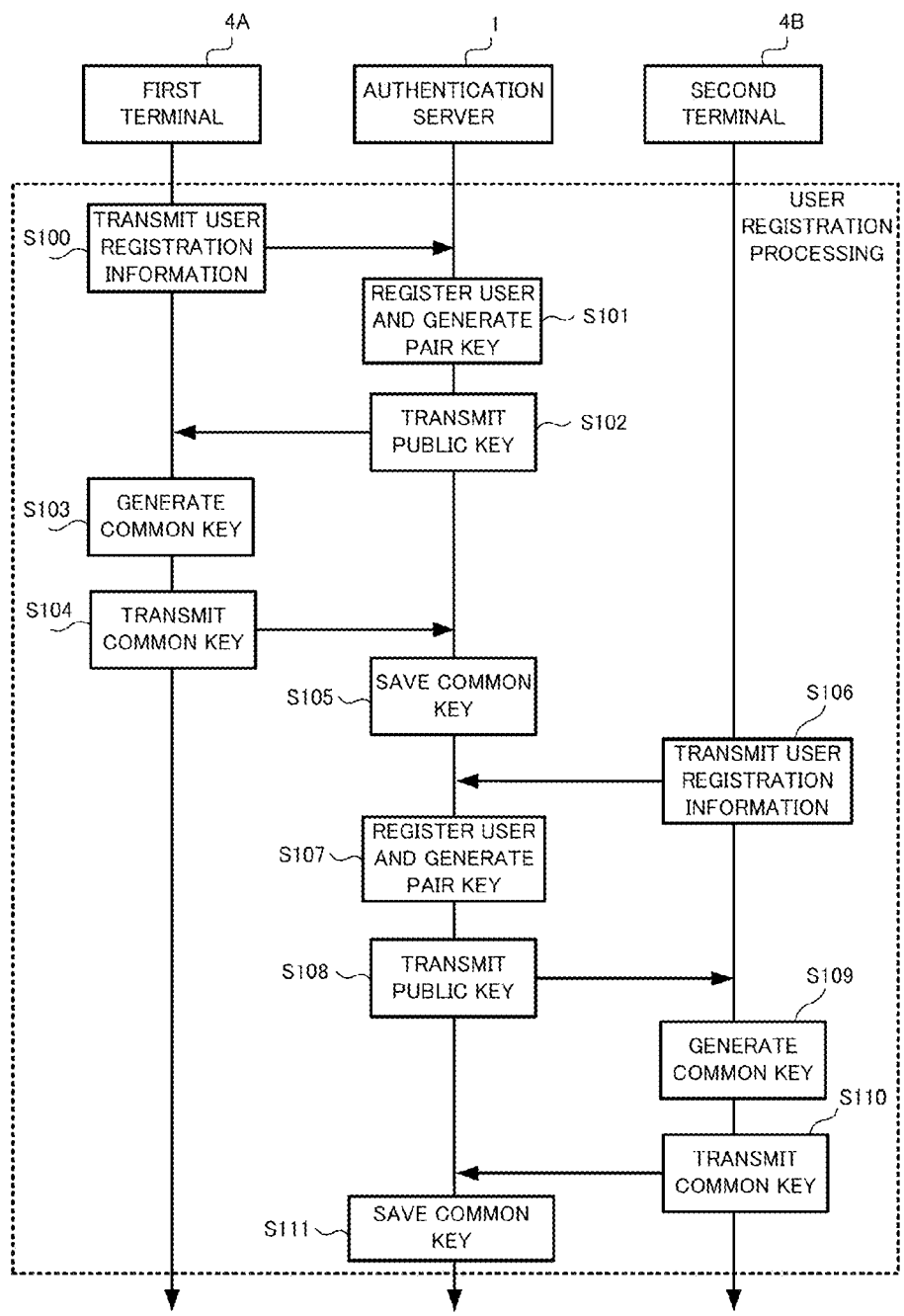
FIG. 16 is a flowchart of user registration processing in the file deposit processing illustrated in FIG. 15.

The flowchart illustrated in FIG. 15 illustrates an entire structure of processing executed in the information processing system 100. Each type of processing described in FIG. 15 is processing provided by the authentication server 1 illustrated in FIG. 2, the first terminal 4A illustrated in FIG. 4B, and the second terminal 4B illustrated in FIG. 4B executing the user authentication processing program 110 in the authentication server 1, the file deposit processing program 478 in the first terminal 4A, and the file acquisition processing program 480 in the second terminal 4B, respectively.

It is assumed here that a user deposit file caused to be stored in the clouds 3 illustrated in FIG. 1 by the first user is stored in the terminal storage 47 in the first terminal 4A illustrated in FIG. 4B. The first user selects, from the operation input device 44, an icon being displayed on the screen of the display 49 in the first terminal 4A illustrated in FIG. 4B and being associated with the file deposit processing program 478.

The terminal controller 48 in the first terminal 4A authenticates whether the first user currently using the first terminal 4A is valid (Step S31). The authentication is performed by the authentication processing illustrated in FIG. 6. The terminal controller 48 executes Step S1 to Step S7 in the authentication processing illustrated in FIG. 6 and, when the first user is authenticated to be the first user himself or herself, executes the file deposit processing program 478. Specifically, the first terminal 4A reads the file deposit processing program 478 stored in the storage equipment 56 illustrated in FIG. 4C into the memory 52 and executes the program by the processor 51. Further, when executing Step S1 to Step S6 in the authentication processing illustrated in FIG. 6 and not being able to determine the first user to be the first user himself or herself, the terminal controller 48 in the first terminal 4A executes Step S9 and causes the display 49 illustrated in FIG. 4B to display that the user is different.

Next, a second user selects, from the operation input device 44, an icon being displayed on the screen of the display 49 in the second terminal 4B illustrated in FIG. 4B and being associated with the file acquisition processing program 480. The terminal controller 48 in the second terminal 4B authenticates whether the second user currently using the second terminal 4B is valid (Step S32). The authentication is performed by the authentication processing illustrated in FIG. 6. The terminal controller 48 executes Step S1 to Step S7 in the authentication processing illustrated in FIG. 6 and, when the second user is authenticated to be the second user himself or herself, executes the file acquisition processing program 480. Specifically, the second terminal 4B reads the file acquisition processing program 480 stored in the storage equipment 56 illustrated in FIG. 4C into the memory 52 and executes the program by the processor 51. Further, when executing Step S1 to Step S6 in the authentication processing illustrated in FIG. 6 and not being able to determine the second user to be the second user himself or herself, the terminal controller 48 in the second terminal 4B executes Step S9 and causes the display 49 illustrated in FIG. 4B to display that the user is different.

The terminal controller 48 in the first terminal 4A and the terminal controller 48 in the second terminal 4B perform user registration processing (Step S33). The user registration processing will be described with reference to the flowchart illustrated in FIG. 16. The terminal controller 48 in the first terminal 4A transmits the name of the first user and information required for registration to the authentication server 1 (Step S100).

When receiving the name of the first user and the information required for registration from the first terminal 4A, the server controller 11 in the authentication server 1 illustrated in FIG. 2 executes the user authentication processing program 110. The server controller 11 in the authentication server 1 registers the name of the first user and the required information. The server controller 11 generates a pair key including a secret key and a public key used with the first user (Step S101). For example, the keys generated by the server controller 11 are assumed to be Ka1 as a secret key and Ka2 as a public key. The server controller 11 writes and saves the generated pair key mapped to the user name into the table in the cipher key information database 120 illustrated in FIG. 8.

The server controller 11 transmits the public key Ka2 in the generated pair key to the first terminal 4A (Step S102). The terminal controller 48 in the first terminal 4A writes the received public key Ka2 into the table in the first cipher key database 476 illustrated in FIG. 7A in association with the name of a target using keys. For example, the terminal controller 48 writes "authentication server" into the name of a target using keys and "Ka2" into the public key, as illustrated in FIG. 7A. Next, the terminal controller 48 in the first terminal 4A generates a common key used with the authentication server 1 (Step S103). For example, the common key generated by the terminal controller 48 in the first terminal 4A is assumed to be KA. The terminal controller 48 in the first terminal 4A writes the common key KA mapped to the authentication server 1 being a target using the key into the first cipher key database 476 illustrated in FIG. 7A.

The terminal controller 48 in the first terminal 4A encrypts the common key KA by using the public key Ka2 received from the authentication server 1 in Step S103 and transmits the encrypted key to the authentication server 1 (Step S104). The server controller 11 in the authentication server 1 decrypts the common key KA received from the first terminal 4A with the secret key Ka1 generated in Step S101 and writes the decrypted key mapped to the first terminal 4A being a target using the key into the table in the cipher key information database 120 illustrated in FIG. 8. The server controller 11 saves the cipher key information database 120 in which the common key KA is written into the server storage 12 in the authentication server 1 illustrated in FIG. 2 (Step S105).

The terminal controller 48 in the second terminal 4B transmits the name of the second user and information required for registration to the authentication server 1 (Step S106). The server controller 11 in the authentication server 1 illustrated in FIG. 2 registers the name of the second user and the information required for registration received from the second terminal 4B. The server controller 11 generates a pair key including a secret key and a public key used with the second user (Step S107). For example, the keys generated by the server controller 11 are assumed to be Kb1 as the secret key and Kb2 as the public key. The server controller 11 writes the generated pair key mapped to the user name into the table in the cipher key information database 120 illustrated in FIG. 8.

The server controller 11 transmits the public key Kb2 in the generated pair key to the second terminal 4B (Step S108). The terminal controller 48 in the second terminal 4B writes the received public key Kb2 into the table in the second cipher key database 479 illustrated in FIG. 7B in association with a name of a target using keys. For example, the terminal controller 48 writes "authentication server" into the name of a target using keys and "Kb2" into the public key, as illustrated in FIG. 7B. Next, the terminal controller 48 in the second terminal 4B generates a common key used with the authentication server 1 (Step S109). For example, the common key generated by the terminal controller 48 in the second terminal 4B is assumed to be KB. The terminal controller 48 in the second terminal 4B writes the common key KB mapped to the authentication server 1 being a target using the key into the second cipher key database 479 illustrated in FIG. 7B.

The terminal controller 48 in the second terminal 4B encrypts the common key KB by using the public key Kb2 received from the authentication server 1 in Step S109 and transmits the encrypted key to the authentication server 1 (Step S110). The server controller 11 in the authentication server 1 decrypts the common key KB acquired from the second terminal 4B with the secret key Kb1 generated in Step S107 and writes the decrypted key mapped to the second terminal 4B being a target using the key into the table in the cipher key information database 120 illustrated in FIG. 8. The server controller 11 saves the cipher key information database 120 in which the common key KB is written into the server storage 12 in the authentication server 1 illustrated in FIG. 2 (Step S111).

The description returns to FIG. 15. When the first user wants to disclose a file distributed across the clouds 3 to the second user at a timing determined by the first user, the first user sets the distributed file in such a way that the file can be shared with the second user. First, the terminal controller 48 in the first terminal 4A used by the first user authenticates whether the first user currently using the first terminal 4A is valid (Step S34). Next, the second user sharing the distributed file authenticates whether the second user currently using the second terminal 4B is valid in the terminal controller 48 in the second terminal 4B used by the second user (Step S35).

Figure 6:
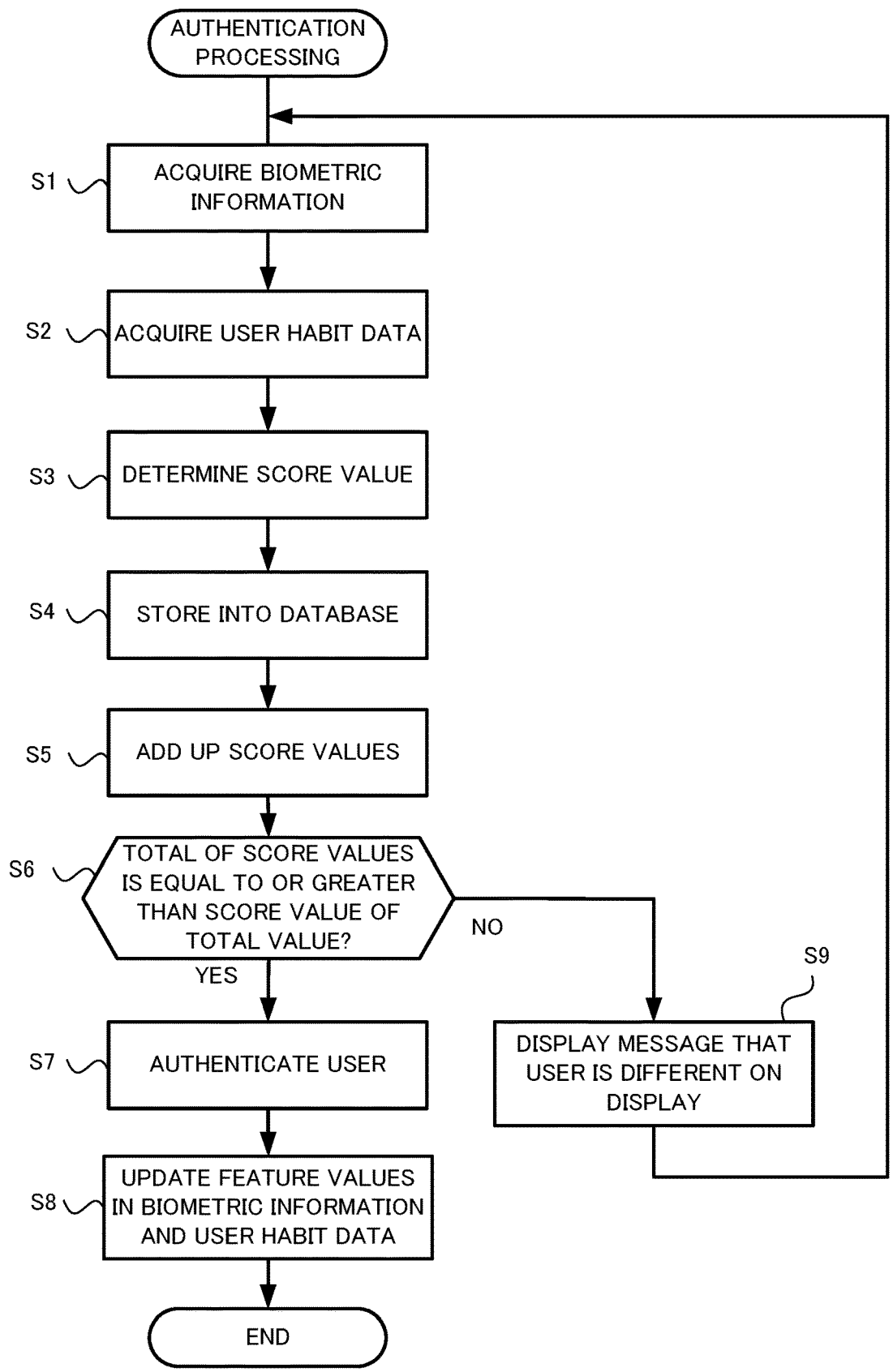
FIG. 6 is a flowchart of authentication processing of authenticating a user to be the user himself or herself in the terminal illustrated in FIG. 4A.

The terminal controller 48 in the first terminal 4A executes Step S1 to Step S7 in the authentication processing illustrated in FIG. 6 and, when the first user is authenticated to be the first user himself or herself, executes user information sharing processing (Step S36). Further, when executing Step S1 to Step S6 in the authentication processing illustrated in FIG. 6 and not being able to determine the first user to be the first user himself or herself, the terminal controller 48 in the first terminal 4A executes Step S9 and causes the display 49 illustrated in FIG. 4B to display that the user is different.

Similarly, the terminal controller 48 in the second terminal 4B executes Step S1 to Step S7 in the authentication processing illustrated in FIG. 6 and, when the second user is authenticated to be the second user himself or herself, executes the user information sharing processing (Step S36). Further, when executing Step S1 to Step S6 in the authentication processing illustrated in FIG. 6 and not being able to determine that the second user is the second user himself or herself, the terminal controller 48 in the second terminal 4B executes Step S9 and causes the display 49 illustrated in FIG. 4B to display that the user is different.

The user information sharing processing will be described below referring to the flowchart illustrated in FIG. 17. The terminal controller 48 in the first terminal 4A requests a public key from the second terminal 4B (Step S120). The terminal controller 48 in the second terminal 4B generates a pair key including a secret key and a public key (Step S121). For example, the pair key generated by the terminal controller 48 in the second terminal 4B is assumed to include Kf1 as a secret key and Kf2 as a public key. The terminal controller 48 in the second terminal 4B writes the name of a target using keys mapped to the pair key into the table in the second cipher key database 479 illustrated in FIG. 7B. For example, the terminal controller 48 writes "first terminal" into the name of a target using keys, "Kf1" into the secret key item, and "Kf2" into the public key item. The terminal controller 48 in the second terminal 4B saves the written second cipher key database 479 into the terminal storage 47 in the second terminal 4B illustrated in FIG. 4B.

The terminal controller 48 in the second terminal 4B transmits the public key Kf2 to the first terminal 4A (Step S122). When receiving the public key Kf2 from the second terminal 4B (Step S123), the terminal controller 48 in the first terminal 4A saves the key into the first cipher key database 476 illustrated in FIG. 4B. For example, the terminal controller 48 writes the name of a target using keys mapped to the public key Kf2 into the table in the first cipher key database 476 illustrated in FIG. 7A. For example, the terminal controller 48 writes "second terminal" into the name of a target using keys and "Kf2" into the public key item.

The terminal controller 48 in the first terminal 4A generates a common key used with the second terminal 4B. The terminal controller 48 in the first terminal 4A encrypts the common key with the public key Kf2 received from the second terminal 4B in Step S123 and transmits the encrypted key to the second terminal 4B (Step S124). For example, the common key generated by the terminal controller 48 in the first terminal 4A is assumed to be KF. The terminal controller 48 in the first terminal 4A saves the generated common key into the first cipher key database 476 illustrated in FIG. 4B. For example, the terminal controller 48 writes the name of a target using keys mapped to the common key KF into the table in the first cipher key database 476 illustrated in FIG. 7A. For example, the terminal controller 48 writes "second terminal" into the name of a target using keys and "KF" into the public key item.

The terminal controller 48 in the second terminal 4B receives the common key KF from the first terminal 4A (Step S125). The terminal controller 48 in the second terminal 4B decrypts the common key KF received from the first terminal 4A with the secret key Kf1 generated in Step S121 and saves the decrypted key mapped to the name of a target using keys into the second cipher key database 479 illustrated in FIG. 4B (Step S126). For example, the terminal controller 48 writes "first terminal" as the name of a target using keys and KF as a common key in the table in the second cipher key database 479 illustrated in FIG. 7B.

Next, the terminal controller 48 in the first terminal 4A requests biometric information of the second user from the second terminal 4B (Step S127). The biometric information of the second user may be either biometric information of the second user registered in the second terminal 4B or newly acquired biometric information of the second user.

The terminal controller 48 in the second terminal 4B encrypts the biometric information of the second user with the common key KF received from the first terminal 4A (Step S128). It is assumed here that the biometric information of the second user is an image of the face of the second user captured by the front-facing camera 41A on the second terminal 4B illustrated in FIG. 4A. The terminal controller 48 in the second terminal 4B transmits the encrypted biometric information of the second user to the first terminal 4A (Step S129).

The terminal controller 48 in the first terminal 4A receives the encrypted biometric information of the second user from the second terminal 4B (Step S130). The terminal controller 48 in the first terminal 4A saves the received biometric information of the second user into the terminal storage 47 illustrated in FIG. 4B (Step S131).

The description returns to FIG. 15. The first user saves a user deposit file including information which the first user wants to disclose to the second user, the information being generated by the first user, into the clouds 3 in a distributed manner. First, the terminal controller 48 in the first terminal 4A used by the first user authenticates whether the first user currently using the first terminal 4A is valid (Step S37). The terminal controller 48 in the first terminal 4A executes Step S1 to Step S7 in the authentication processing illustrated in FIG. 6 and, when the first user is authenticated to be the first user himself or herself, executes file check-in processing (Step S38). The file check-in processing will be described below referring to the flowchart illustrated in FIG. 18.

Figure 13:
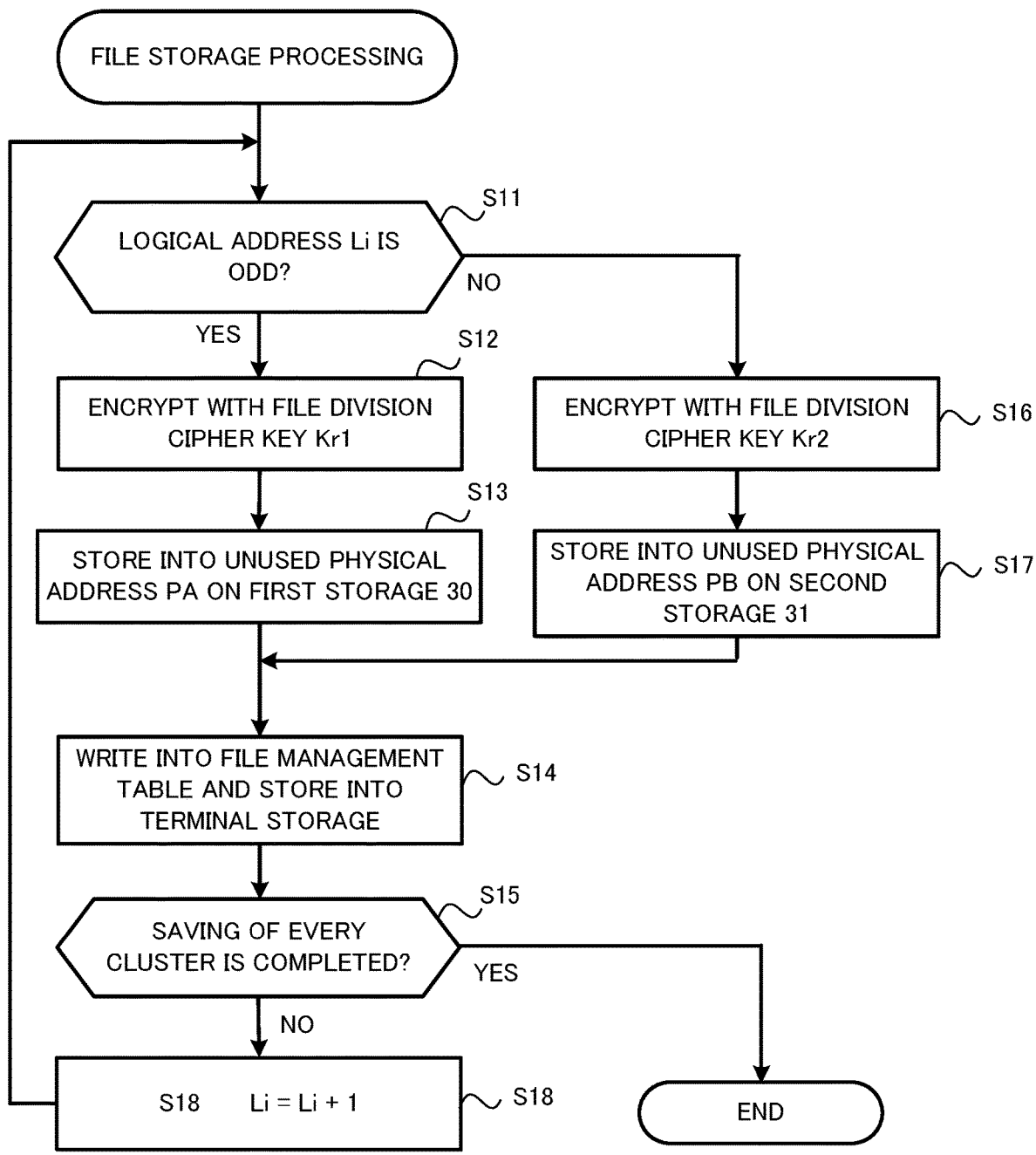
FIG. 13 is a flowchart of file storage processing.

The terminal controller 48 in the first terminal 4A executes Step S11 to Step S18 in the file storage processing illustrated in FIG. 13 on the user deposit file including the information generated by the first user (Step S141). Through the file storage processing, the user deposit file including the information generated by the first user is divided and is saved into the first cloud 3A and the second cloud 3B illustrated in FIG. 1 in a distributed manner.

The terminal controller 48 in the first terminal 4A encrypts information for accessing the first cloud 3A and the second cloud 3B, data in the file management table 475 illustrated in FIG. 4B, and file division cipher keys with the public key Kf2 for the second terminal 4B illustrated in FIG.

7A (Step S142). The file division cipher keys are keys with which the user deposit file saved in the first cloud 3A and the second cloud 3B in a distributed manner is encrypted and are saved in the file division cipher key table 477 in the terminal storage 47 in the first terminal 4A illustrated in FIG. 4B. For example, the keys are Kr1 and Kr2 written in the table in the file division cipher key table 477 illustrated in FIG. 7C. Further, the encrypted information for accessing the first cloud 3A and the second cloud 3B, the encrypted data in the file management table 475 illustrated in FIG. 4B, and the encrypted file division cipher keys are hereinafter referred to as encrypted access information.

The terminal controller 48 in the first terminal 4A adds a starting date and time of use of the user deposit file and biometric information of the second user to the encrypted access information (Step S143). The starting date and time of use of the user deposit file is a date and time from which the deposit file can be acquired by the second terminal 4B. Further, the biometric information of the second user is information received from the second terminal 4B in Step S130 described in FIG. 17. The terminal controller 48 in the first terminal 4A encrypts the encrypted access information, the starting date and time of use of the user deposit file, and the biometric information of the second user with the common key KA for the authentication server 1 stored in the first cipher key database 476 illustrated in FIG. 7A and transmits the encrypted information to the authentication server 1 (Step S144).

The authentication server 1 receives the encrypted access information, the starting date and time of use of the user deposit file, and the biometric information of the second user from the terminal controller 48 in the first terminal 4A (Step S145). The authentication server 1 saves the received encrypted access information, the received starting date and time of use of the user deposit file, and the received biometric information of the second user into the server storage 12 illustrated in FIG. 2 (Step S146). The terminal controller 48 in the first terminal 4A newly generates file division cipher keys. For example, the generated keys are assumed to be Kr3 and Kr4.

The terminal controller 48 in the first terminal 4A writes and saves the newly generated file division cipher keys Kr3 and Kr4 into a row following the file division cipher keys Kr1 and Kr2 saved in the file division cipher key table 477 in the terminal storage 47 (Step S147). Thus, file division cipher keys can be varied for each distribution time at which a user deposit file is distributed across the first cloud 3A and the second cloud 3B. Therefore, the first user can give permission for restoring and using a user deposit file to a different user for each distribution time. Accordingly, the first user can share required information for each user.

The description returns to FIG. 15. When the second user wants to acquire the user deposit file shared by the first user from the clouds 3, the second user acquires and restores the file saved in the clouds 3 in a distributed manner. The terminal controller 48 in the second terminal 4B executes Step S1 to Step S7 in the authentication processing illustrated in FIG. 6 (Step S39) and, when the second user is authenticated to be the second user himself or herself, executes file acquisition processing (Step S40). Further, when executing Step S1 to Step S6 in the authentication processing illustrated in FIG. 6 (Step S39) and not being able to determine the second user to be the second user himself or herself, the terminal controller 48 in the second terminal 4B executes Step S9 and causes the display 49 illustrated in FIG. 4B to display that the user is different. The file acquisition processing will be described below referring to the flowchart illustrated in FIG. 19.

The second terminal 4B makes a request for acquisition of the user deposit file including the information generated by the first user to the authentication server 1 (Step S151). The server controller 11 in the authentication server 1 illustrated in FIG. 2 requests biometric information of the second user from the second terminal 4B (Step S152). The biometric information of the second user stored in the server storage 12 in the authentication server 1 is the information received from the first terminal 4A in Step S145 in FIG. 18. Then, the biometric information of the second user transmitted from the first terminal 4A to the authentication server 1 is a face image of the second user transmitted from the second terminal 4B to the first terminal 4A in Step S129 described in FIG. 17. Therefore, the server controller 11 in the authentication server 1 specifically requests a face image of the second user from the second terminal 4B in Step S152.

The terminal controller 48 in the second terminal 4B encrypts a face image of the second user with a common key for the authentication server 1 and transmits the encrypted image to the authentication server 1 (Step S153). The common key with which the terminal controller 48 encrypts the face image of the second user is the common key KB for the authentication server 1 described in the second cipher key database 479 in FIG. 7B.

The server controller 11 in the authentication server 1 authenticates the second user, based on the face image of the second user being received from the first terminal 4A and being saved in the server storage 12, and the face image of the second user received from the second terminal 4B (Step S154). The server controller 11 determines whether the second user can be authenticated to be the second user himself or herself (Step S155). When the second user can be authenticated to be the second user himself or herself (Step S155: YES), the server controller 11 determines whether the starting date and time of use of the user deposit file is passed (Step S156). Further, when the second user cannot be authenticated to be the second user himself or herself (Step S155: NO), the server controller 11 skips processing from there onward. Thus, disclosure of the user deposit file deposited in the authentication server 1 by the first user by using the first terminal 4A to the second user being a third party can be prevented.

When the starting date and time of use of the user deposit file is passed (Step S156: YES), the server controller 11 in the authentication server 1 encrypts the information received from the first terminal 4A in Step S145 illustrated in FIG. 18 with the common key KB for the second terminal 4B. Further, when the starting date and time of use of the user deposit file is not passed (Step S156: NO), the server controller 11 in the authentication server 1 skips processing from here onward. Thus, disclosure of the user deposit file deposited in the authentication server 1 by the first user by using the first terminal 4A to the second user being a third party can be prevented.

Figure 18:
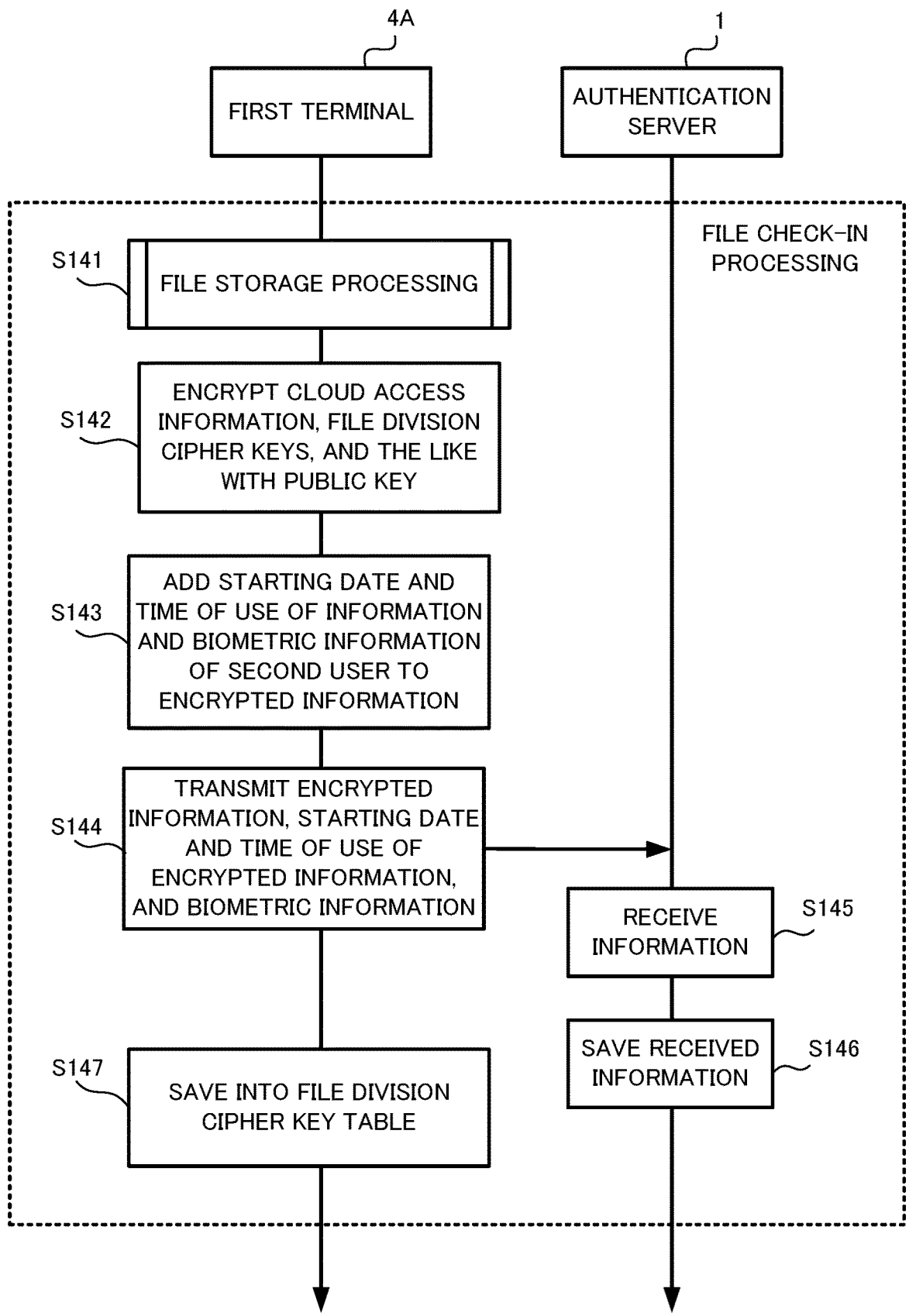
FIG. 18 is a flowchart of file check-in processing in the file deposit processing illustrated in FIG. 15.
Figure 19:
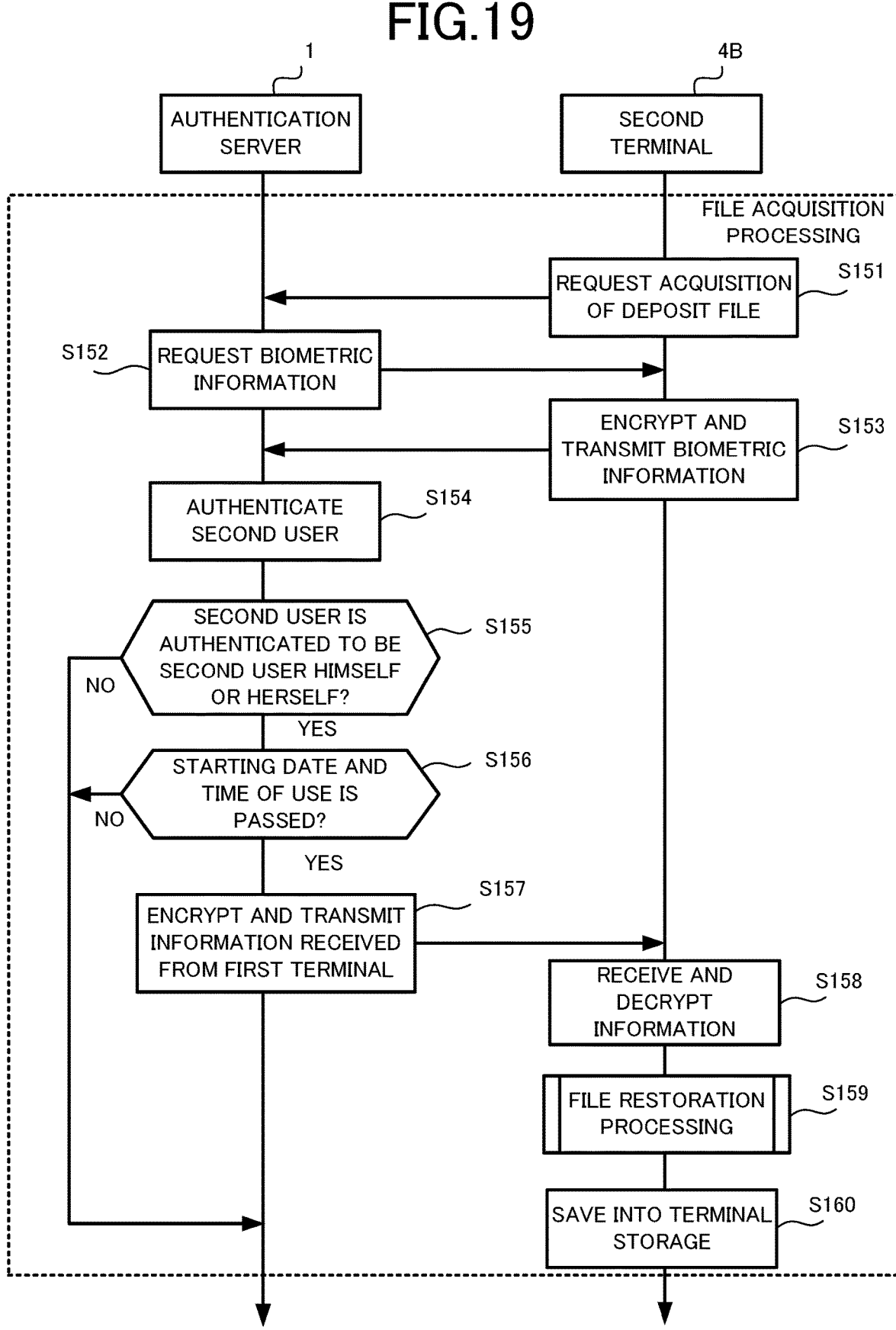
FIG. 19 is a flowchart of file acquisition processing in the file deposit processing illustrated in FIG. 15.

The server controller 11 in the authentication server 1 transmits the encrypted information received from the first terminal 4A in Step S145 described in FIG. 18 to the second terminal 4B (Step S157). The encrypted information includes the information for accessing the first cloud 3A and the second cloud 3B, the information being saved in the server storage 12 illustrated in FIG. 2, the data in the file management table 475, and the file division cipher keys.

First, the terminal controller 48 in the second terminal 4B decrypts the information received from the authentication server 1 with a common key for the authentication server 1.

The common key for decryption is the common key KB stored in the second cipher key database 479 in the terminal storage 47 in the second terminal 4B illustrated in FIG. 4B. Next, the terminal controller 48 in the second terminal 4B decrypts the information decrypted with the common key KB for the authentication server 1 with a secret key for the first terminal 4A. The secret key for decryption is the secret key Kf1 stored in the second cipher key database 479 in the terminal storage 47 in the second terminal 4B illustrated in FIG. 4B (Step S158).

The terminal controller 48 in the second terminal 4B executes the file restoration processing by using the decrypted information (Step S159). As for the file restoration processing, Step S21 to Step S25 described in FIG. 14 are executed. The terminal controller 48 in the second terminal 4B saves the restored user deposit file into the terminal storage 47 in the second terminal 4B illustrated in FIG. 4B (Step S160).

The description returns to FIG. 15. The terminal controller in the first terminal 4A ends the file deposit processing program 478 in the terminal storage 47 illustrated in FIG. 4B. The server controller 11 in the authentication server 1 ends the user authentication processing program 110 illustrated in FIG. 2. The terminal controller in the second terminal 4B ends the file acquisition processing program 480 in the terminal storage 47 illustrated in FIG. 4B.

As described above, in the information processing system 100 according to Embodiment 1, a file generated by a first user is saved in a plurality of clouds in a distributed manner by using a first terminal, and when a second user given permission by the first user to browse a file is authenticated to be the second user himself or herself by the authentication server, the second user can acquire, restore, and use the file saved in the plurality of clouds in a distributed manner, by using a second terminal. Thus, a file including information generated by the first user can be acquired and used by the second user being given permission by the first user, in other words, being authorized.

Further, in the information processing system 100 according to Embodiment 1, after a file generated by a first user is saved in a plurality of clouds in a distributed manner, file division cipher keys for encrypting a divided file saved in each cloud is added at the end of the file division cipher key table 477. Thus, file division cipher keys can be varied for each distribution time at which a file is distributed across a plurality of clouds. Therefore, the first user can give permission to restore and use a file including information generated by the first user to a different user for each distribution time. Thus, the first user can share required information for each user being a third party.

Embodiment 2

An information processing system 100 according to Embodiment 2 is a system not only executing the processing executed in the information processing system 100 according to aforementioned Embodiment 1 but also allowing a first user to update a content of a user deposit file after depositing the user deposit file in clouds 3 illustrated in FIG. 1. Thus, the system can cope with, after depositing the user deposit file in the clouds 3, a case that the first user notices that a user deposit file includes information that should not be viewed by a second user and a case that a first user wants to add an additional content to information disclosed to a second user.

Figure 20:
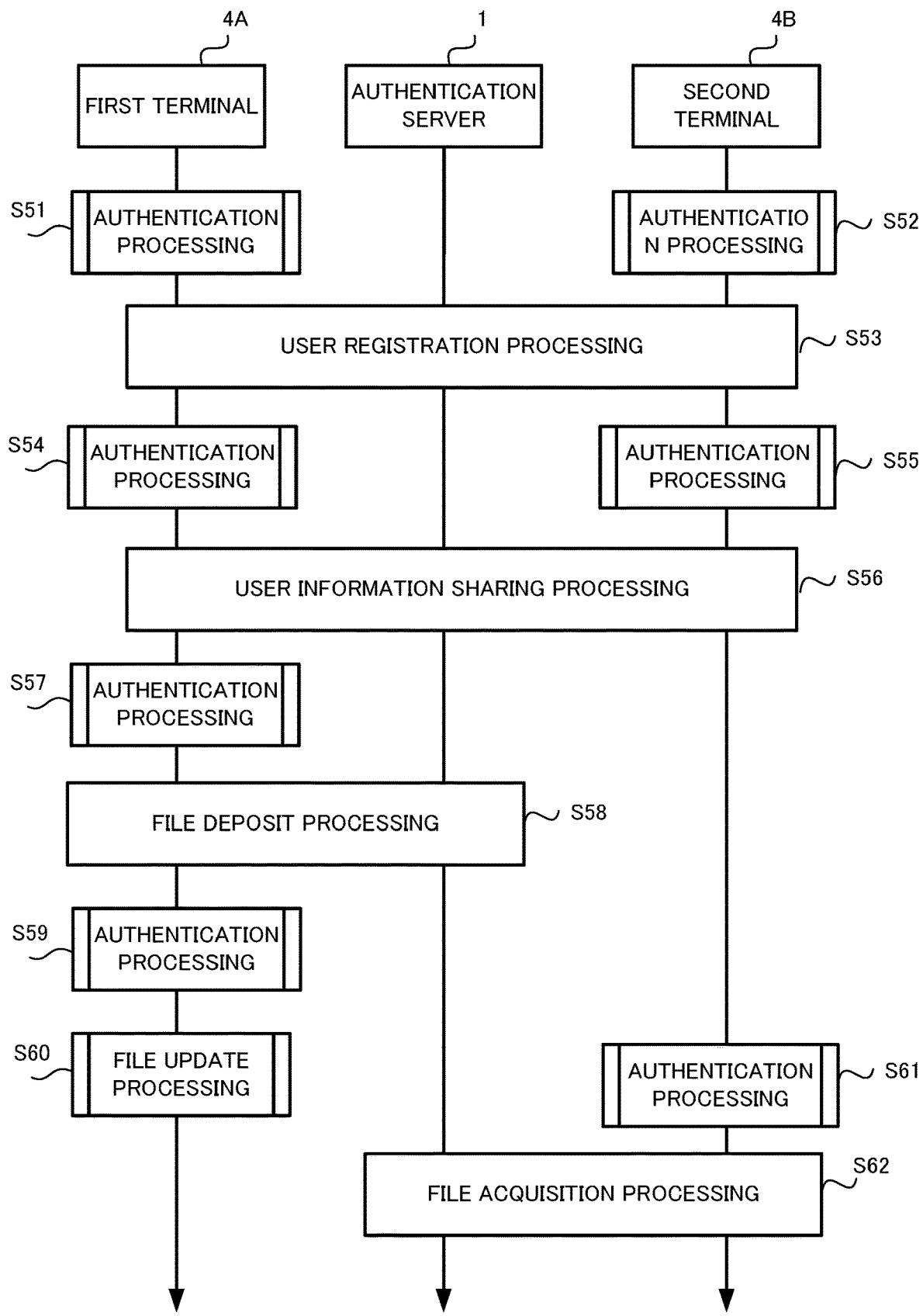
FIG. 20 is a flowchart of file deposit processing in Embodiment 2.

Flows of processing executed in the information processing system 100 according to Embodiment 2 will be described below referring to flowcharts illustrated in FIG. 20 and FIG. 21. The flowchart illustrated in FIG. 20 illustrates an entire structure of processing executed in the information processing system 100 according to Embodiment 2. Each type of processing described in FIG. 20 is processing provided by an authentication server 1 illustrated in FIG. 2, a first terminal 4A illustrated in FIG. 4B, and a second terminal 4B illustrated in FIG. 4B executing a user authentication processing program 110 in the authentication server 1, a file deposit processing program 478 in the first terminal 4A, and a file acquisition processing program 480 in the second terminal 4B, respectively.

The file deposit processing program 478 in the first terminal 4A is executed by a first user selecting, from an operation input device 44, an icon being displayed on a screen of a display 49 in the first terminal 4A illustrated in FIG. 4B and being associated with the file deposit processing program 478. Further, the file acquisition processing program 480 in the second terminal 4B is executed by a second user selecting, from the operation input device 44, an icon being displayed on the screen of the display 49 in the second terminal 4B illustrated in FIG. 4B and being associated with the file acquisition processing program 480. The user authentication processing program 110 in the authentication server 1 is executed by a server controller 11 in the authentication server 1 illustrated in FIG. 2 receiving a name of the first user and information required for registration from the first terminal 4A.

Step S51 to Step S58 in the flowchart illustrated in FIG. 20 are processing similar to Step S31 to Step S38 in the flowchart illustrated in FIG. 15 described in aforementioned Embodiment 1. When file check-in processing in Step S58 ends, a terminal controller 48 in the first terminal 4A authenticates whether the first user currently using the first terminal 4A is valid (Step S59). The authentication is performed by authentication processing illustrated in FIG. 6. The terminal controller 48 executes Step S1 to Step S7 in the authentication processing illustrated in FIG. 6 and, when the first user is authenticated to be the first user himself or herself, executes file update processing (Step S60). The file update processing will be described with reference to the flowchart illustrated in FIG. 21. Further, when executing Step S1 to Step S6 in the authentication processing illustrated in FIG. 6 and not being able to determine the first user to be the first user himself or herself, the terminal controller 48 in the first terminal 4A executes Step S9 and causes the display 49 illustrated in FIG. 4B to display that the user is different.

Figure 21:
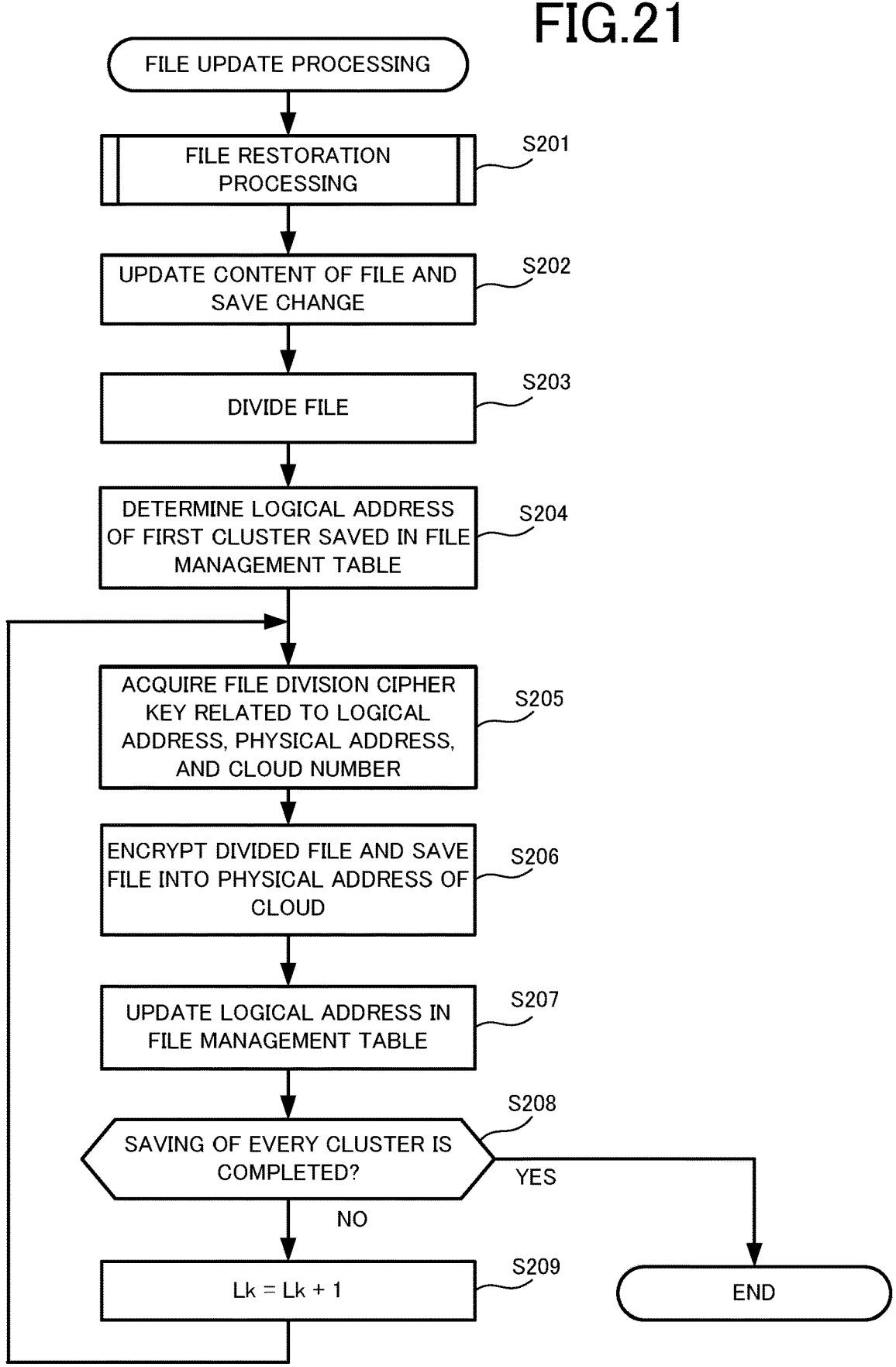
FIG. 21 is a flowchart of file update processing in the file deposit processing illustrated in FIG. 20.

The terminal controller 48 in the first terminal 4A executes file restoration processing in the file update processing illustrated in FIG. 21 (Step S201). As for the file restoration processing, Step S21 to Step S25 described in FIG. 14 are executed. The terminal controller 48 in the first terminal 4A saves a restored user deposit file into a terminal storage 47 in the first terminal 4A illustrated in FIG. 4B.

The first user updates a content of the user deposit file saved in the terminal storage 47 by the terminal controller 48 in the first terminal 4A and saves the change (Step S202). The first user causes the terminal controller 48 in the first terminal 4A to divide the user deposit file into clusters being minimum units of disk access in a computer, as illustrated in FIG. 9 (Step S203). The cluster is managed by a logical address. The logical address is hereinafter referred to as a logical address Lk.

The terminal controller 48 in the first terminal 4A determines a logical address of the first cluster out of clusters constituting the user deposit file saved in the clouds 3 from a file management table 475 saved in the terminal storage 47 (Step S204). The terminal controller 48 in the first terminal 4A acquires, from the file management table 475, a file division cipher key related to the determined logical address of the first cluster, a physical address of an area in which the first cluster is stored, and a number indicating a cloud 3 including the physical address of the area in which the first cluster is stored (Step S205).

The terminal controller 48 in the first terminal 4A encrypts the first cluster of the user deposit file divided into clusters in Step S203 with the acquired file division cipher key. Next, the terminal controller 48 in the first terminal 4A determines a cloud 3 and a physical address being a storage destination, based on the physical address and the number indicating the cloud 3 including the physical address that are acquired in Step S205 and saves the encrypted first cluster (Step S206).

The terminal controller 48 in the first terminal 4A overwrites and updates the logical address of the first cluster saved in the file management table 475 in the terminal storage 47 with a logical address Lk of the first cluster of the user deposit file divided into clusters in Step S203 (Step S207). The terminal controller 48 in the first terminal 4A determines whether saving of every cluster divided in Step S203 is completed (Step S208). When saving of every cluster is not completed (Step S208: NO), the terminal controller 48 adds 1 to the logical address Lk (Step S209).

Next, the terminal controller 48 in the first terminal 4A returns to Step S205 and processes the next cluster. Further, when saving of every cluster is determined to be completed in Step S208 (Step S208: YES), the terminal controller 48 in the first terminal 4A ends the file update processing.

The description returns to FIG. 20. When the second user wants to acquire a user deposit file shared by the first user from the clouds 3, the second user executes authentication processing in Step S61 and file acquisition processing in Step S62 by the terminal controller 48 in the second terminal 4B. Each of the authentication processing in Step S61 and the file acquisition processing in Step S62 is processing similar to each of Step S39 and Step S40 in the flowchart illustrated in FIG. 15.

As described above, in Embodiment 2, not only the processing executed in the information processing system 100 according to aforementioned Embodiment 1 but also update of a content of a user deposit file by a first user after the first user deposits the user deposit file in the clouds 3 illustrated in FIG. 1 can be performed. Thus, for example, a case that the first user notices that a user deposit file includes information that should not be viewed by the second user and a case that the first user wants to add an additional content to information disclosed to the second user can be coped with after the user deposit file is deposited in the clouds 3.

Embodiment 3

An information processing system 100 according to Embodiment 3 is a system not only executing the processing executed in the information processing system 100 according to aforementioned Embodiment 1 but also allowing a first user to change information disclosed to a second user after depositing a user deposit file in clouds 3 illustrated in FIG. 1. Thus, for example, a case that the first user wants to change a starting date and time of use from which the second user can start using a user deposit file and a case that the first user notices that a mistake is made in access information to the clouds 3, biometric information of the second user, or the like can be coped with after the user deposit file is deposited in the clouds 3.

Figure 22:
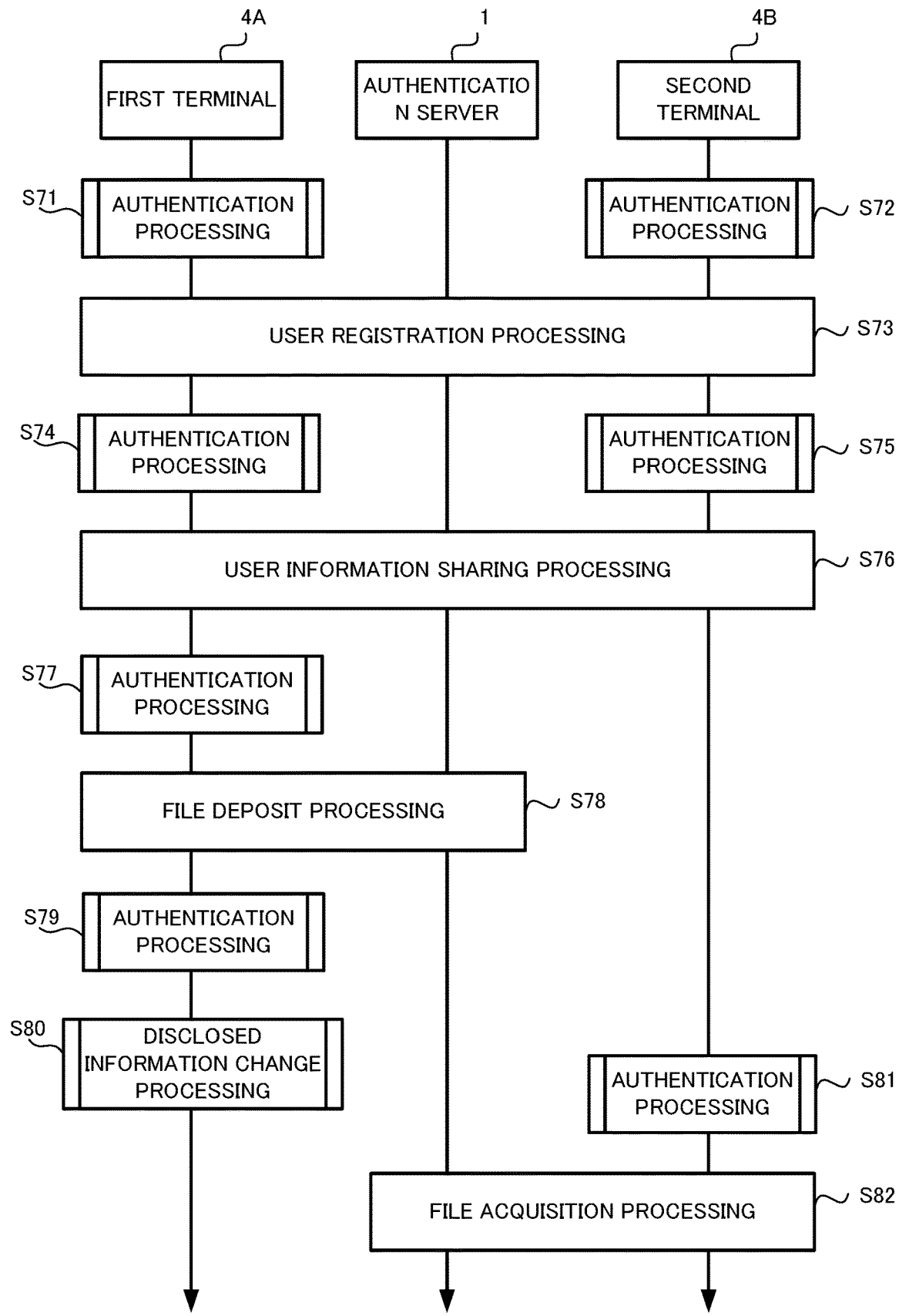
FIG. 22 is a flowchart of file deposit processing in Embodiment 3.

Flows of processing executed in the information processing system 100 according to Embodiment 3 will be described below referring to flowcharts illustrated in FIG. 22 and FIG. 23. The flowchart illustrated in FIG. 22 illustrates an entire structure of processing executed in the information processing system 100 according to Embodiment 3. Each type of processing described in FIG. 22 is processing provided by an authentication server 1 illustrated in FIG. 2, a first terminal 4A illustrated in FIG. 4B, and a second terminal 4B illustrated in FIG. 4B executing a user authentication processing program 110 in the authentication server 1, a file deposit processing program 478 in the first terminal 4A, and a file acquisition processing program 480 in the second terminal 4B, respectively.

The file deposit processing program 478 in the first terminal 4A is executed by the first user selecting, from an operation input device 44, an icon being displayed on a screen of a display 49 in the first terminal 4A illustrated in FIG. 4B and being associated with the file deposit processing program 478. Further, the file acquisition processing program 480 in the second terminal 4B is executed by the second user selecting, from the operation input device 44, an icon being displayed on the screen of the display 49 in the second terminal 4B illustrated in FIG. 4B and being associated with the file acquisition processing program 480. The user authentication processing program 110 in the authentication server 1 is executed by a server controller 11 in the authentication server 1 illustrated in FIG. 2 receiving a name of the first user and information required for registration from the first terminal 4A.

Each of Step S71 to Step S78 in the flowchart illustrated in FIG. 22 is processing similar to each of Step S31 to Step S38 in the flowchart illustrated in FIG. 15 described in aforementioned Embodiment 1. When file check-in processing in Step S78 ends, a terminal controller 48 in the first terminal 4A authenticates whether the first user currently using the first terminal 4A is valid (Step S79). The authentication is performed by authentication processing illustrated in FIG. 6. The terminal controller 48 executes Step S1 to Step S7 in the authentication processing illustrated in FIG. 6 and, when the first user is authenticated to be the first user himself or herself, executes disclosed information change processing (Step S80). The disclosed information change processing will be described with reference to the flowchart illustrated in FIG. 23. Further, when executing Step S1 to Step S6 in the authentication processing illustrated in FIG. 6 and not being able to determine the first user to be the first user himself or herself, the terminal controller 48 in the first terminal 4A executes Step S9 and causes the display 49 illustrated in FIG. 4B to display that the user is different.

When executing the disclosed information change processing illustrated in FIG. 23, the terminal controller 48 in the first terminal 4A first requests encrypted information deposited in the authentication server 1 and a starting date and time of use of the information (Step S301). The encrypted information is information acquired by encrypting information for accessing a first cloud 3A and a second cloud 3B, data in a file management table 475 illustrated in FIG. 4B, and file division cipher keys with a public key Kf2 for the first terminal 4A and the second terminal 4B, the key being described in FIG. 7A.

The server controller 11 in the authentication server 1 requests user authentication information for authenticating the first user to be a valid user from the first terminal 4A

(Step S302). The user authentication information is a name of the first user and information required for registration that are used at the time of registering the first user in the authentication server 1.

The terminal controller 48 in the first terminal 4A transmits the name of the first user and the information required for registration that are used at the time of registering the first user in the authentication server 1 to the authentication server 1 as user authentication information (Step S303). When being able to authenticate the first user to be the first user himself or herself (Step S304: YES), the server controller 11 in the authentication server 1 transmits the encrypted information and the starting date and time of use of the information that are requested by the first terminal 4A to the first terminal 4A (Step S305). Further, when not being able to authenticate the first user to be the first user himself or herself (Step S304: NO), the server controller 11 in the authentication server 1 skips subsequent processing and returns to FIG. 22.

The terminal controller 48 in the first terminal 4A receives the requested encrypted information and the requested starting date and time of use of the information from the authentication server 1 (Step S306). The first user changes the received encrypted information and the received starting date and time of use of the information by the terminal controller 48 in the first terminal 4A (Step S307). For example, when changing the encrypted information, the first user decrypts the encrypted information by the terminal controller 48 in the first terminal 4A with the public key Kf2 for the first terminal 4A and the second terminal 4B and changes the information for accessing the first cloud 3A and the second cloud 3B, and the data in the file management table 475 illustrated in FIG. 4B. Then, the first user encrypts the changed information by the terminal controller 48 in the first terminal 4A with the public key Kf2 for the first terminal 4A and the second terminal 4B. Further, when changing the starting date and time of use of the encrypted information, the first user changes the starting date and time of use by the terminal controller 48 in the first terminal 4A.

The terminal controller 48 in the first terminal 4A transmits the changed encrypted information and the changed starting date and time of use of the information to the authentication server 1 (Step S308). The server controller 11 in the authentication server 1 receives the changed encrypted information and the changed starting date and time of use of the information (Step S309). The server controller 11 in the authentication server 1 saves the received encrypted information and the received starting date and time of use of the information into a server storage 12 illustrated in FIG. 2 (Step S310).

The description returns to FIG. 22. When the second user wants to acquire the user deposit file shared by the first user from the clouds 3, the second user executes authentication processing in Step S81 and file acquisition processing in Step S82 by the terminal controller 48 in the second terminal 4B. Each of the authentication processing in Step S81 and the file acquisition processing in Step S82 is processing similar to each of Step S39 and Step S40 in the flowchart illustrated in FIG. 15.

As described above, the system according to Embodiment 3 not only executes the processing executed in the information processing system 100 according to aforementioned Embodiment 1 but also allows a first user to change information disclosed to a second user after depositing a user deposit file in the clouds 3 illustrated in FIG. 1. Thus, for example, a case that the first user wants to change a starting date and time of use from which the second user can start using a user deposit file and a case that the first user notices that a mistake is made in access information to the clouds 3, biometric information of the second user, or the like can be coped with after the first user deposits the user deposit file in the clouds 3.

Embodiment 4

In an information processing system 100 according to Embodiment 4, user authentication is performed by coordinating user authentication processing in a terminal 4 with public key authentication performed between the terminal 4 and an authentication server 1 unlike the processing executed in the information processing systems 100 according to aforementioned Embodiments 1 to 3. Thus, a user can be specified without transmission of biometric information of the user to an authentication server 1, and therefore user authentication can be performed while preventing a leak of biometric information of the user.

Processing executed in the information processing system 100 according to Embodiment 4 will be described below referring to FIG. 24A to FIG. 34. In Embodiment 4, a first cipher key database 476A illustrated in FIG. 24A is used in place of the first cipher key database 476 illustrated in FIG. 7A used in Embodiments 1 to 3, a second cipher key database 479A illustrated in FIG. 24B in place of the second cipher key database 479 illustrated in FIG. 7B, and a cipher key information database 120A illustrated in FIG. 25 in place of the cipher key information database 120 illustrated in FIG. 8.

First, cipher keys written in the first cipher key database 476A will be described. FIG. 24A illustrates an example of a table in the first cipher key database 476A. A name of a target using keys, a secret key, a public key, and a common key are set in the table as items. The secret key and the public key are keys constituting a pair key. A secret key, a public key, and a common key mapped to "authentication server" being a name of a target using keys are keys used between a first terminal 4A used by the first user and the authentication server 1. The secret key and the public key are keys generated by the first terminal 4A. Further, the common key is a key generated by the authentication server 1.

A public key and a common key mapped to "second terminal" being a name of a target using keys are keys used between the first terminal 4A used by the first user and a second terminal 4B used by the second user. The public key is a key generated by the second terminal 4B. Further, the common key is a key generated by the first terminal 4A.

For example, Kp1 as a secret key, Kp2 as a public key, and KC as a common key are stored for "authentication server" being a name of a target using keys in FIG. 24A. Further, Kh2 as a public key and KE as a common key are stored for "second terminal" being a name of a target using keys.

Next, cipher keys written in the second cipher key database 479A will be described. FIG. 24B illustrates an example of a table in the second cipher key database 479A. A name of a target using keys, a secret key, a public key, and a common key are set in the table as items. The secret key and the public key are keys constituting a pair key. A secret key, a public key, and a common key mapped to "authentication server" being a name of a target using keys are keys used between the second terminal 4B used by the second user and the authentication server 1. The secret key and the public key are keys generated by the second terminal 4B. Further, the common key is a key generated by the authentication server 1.

A secret key, a public key, and a common key mapped to "first terminal" being a name of a target using keys are keys used between the first terminal 4A used by the first user and the second terminal 4B used by the second user. The secret key and the public key are keys generated by the second terminal 4B. Further, the common key is a key generated by the first terminal 4A.

For example, Kg1 as a secret key, Kg2 as a public key, and KD as a common key are stored for "authentication server" being a name of a target using keys in FIG. 24B. Further, Kh1 as a secret key, Kh2 as a public key, and KE as a common key are stored for "first terminal" being a name of a target using keys.

Next, cipher keys written in the cipher key information database 120A will be described. FIG. 25 illustrates an example of a table in the cipher key information database 120A. A name of a target using keys, a public key, and a common key are set in the table as items. The public key is a key paired with a secret key. A public key and a common key mapped to "first terminal" being a name of a target using keys are keys used between the first terminal 4A used by the first user and the authentication server 1. The public key is a key generated by the first terminal 4A. Further, the common key is a key generated by the authentication server 1.

A public key and a common key mapped to "second terminal" being a name of a target using keys are keys used between the second terminal 4B used by the second user and the authentication server 1. The public key is a key generated by the second terminal 4B. Further, the common key is a key generated by the authentication server 1.

For example, Kp2 as a public key and KC as a common key are stored for "first terminal" being a name of a target using keys in FIG. 25. Further, Kg2 as a public key and KD as a common key are stored for "second terminal" being a name of a target using keys.

Figure 26:
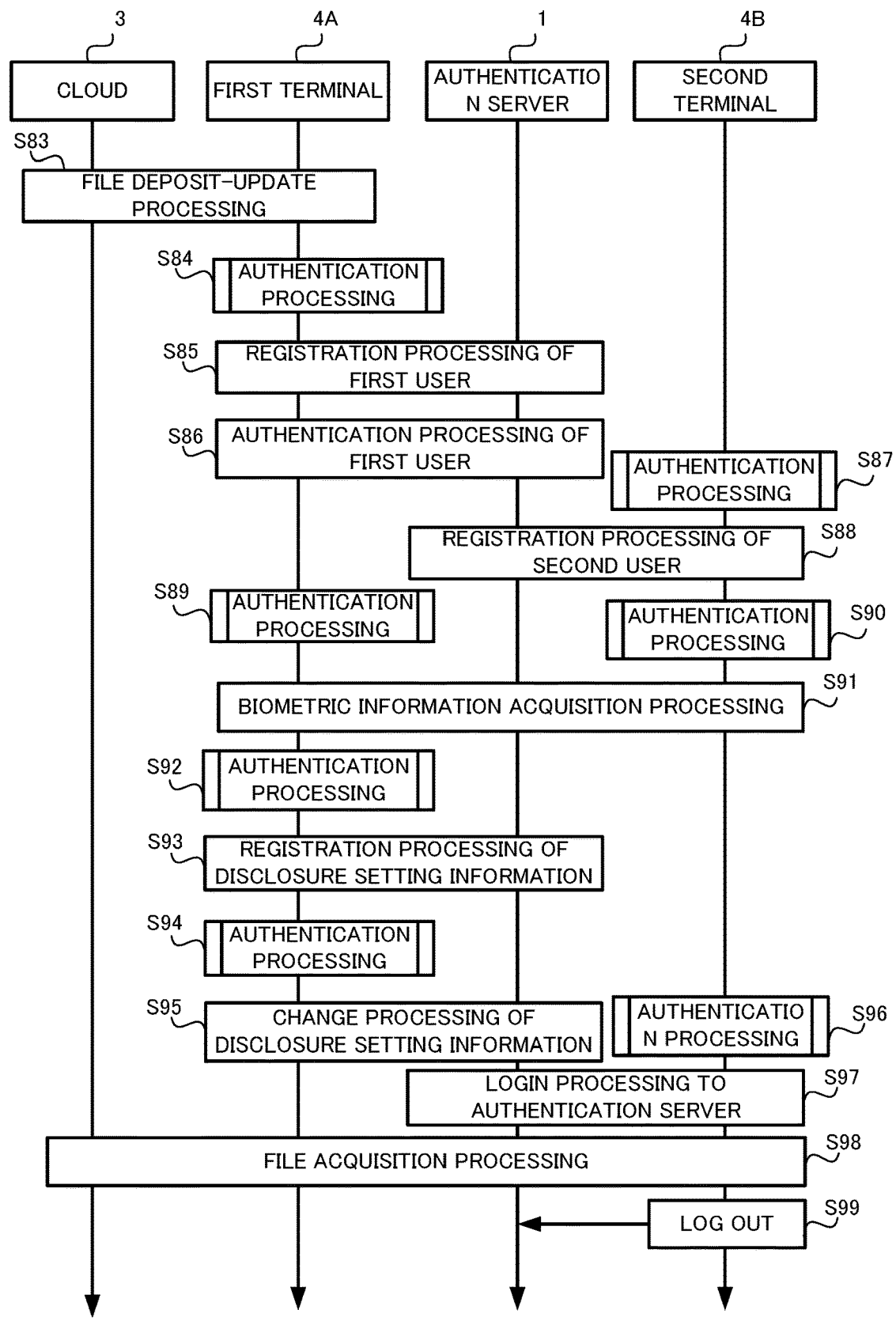
FIG. 26 is a flowchart of file deposit processing in Embodiment 4.
Figure 27:
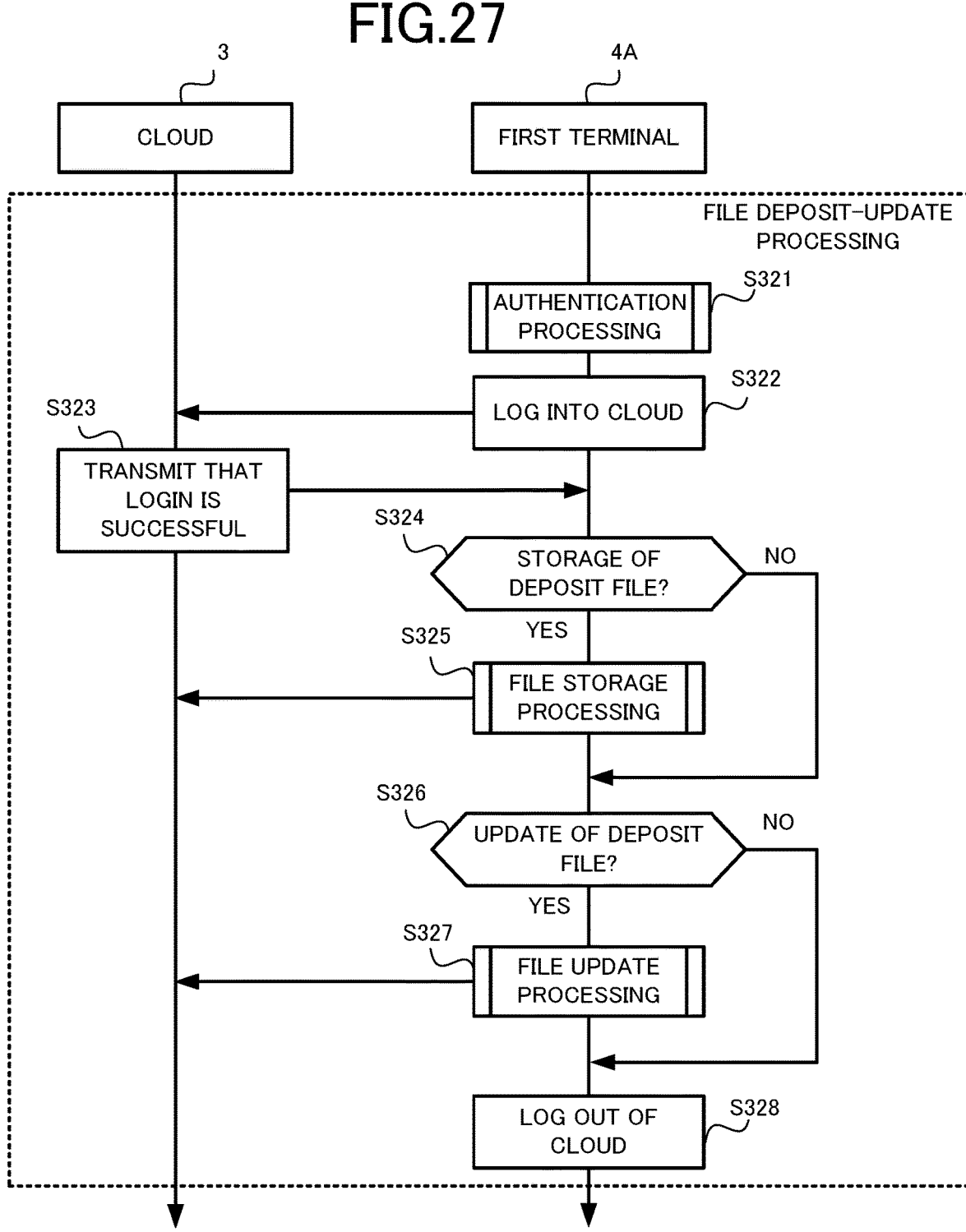
FIG. 27 is a flowchart of file deposit-update processing in the file deposit processing illustrated in FIG. 26.
Figure 28:
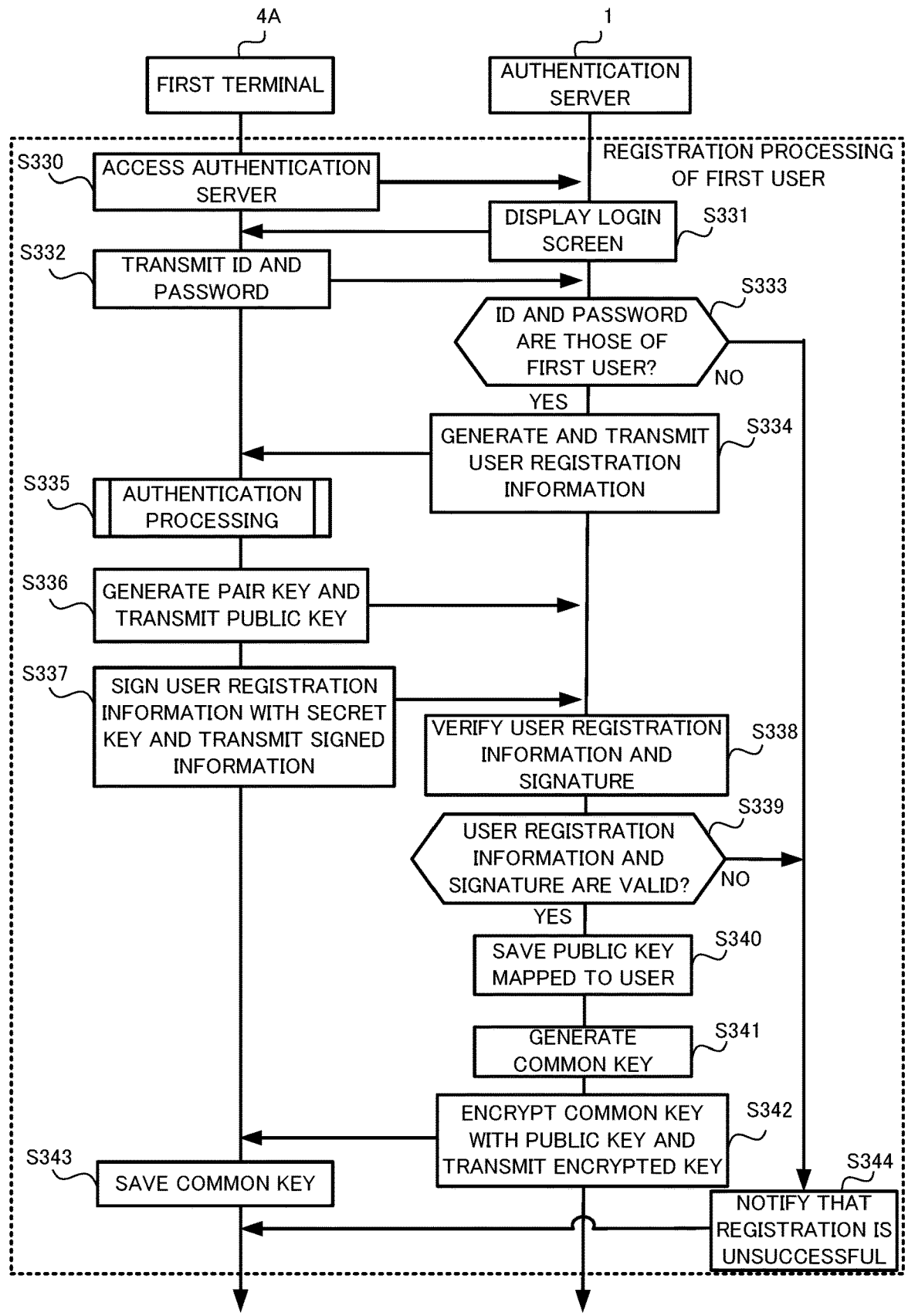
FIG. 28 is a flowchart of registration processing of a first user in the file deposit processing illustrated in FIG. 26.
Figure 29:
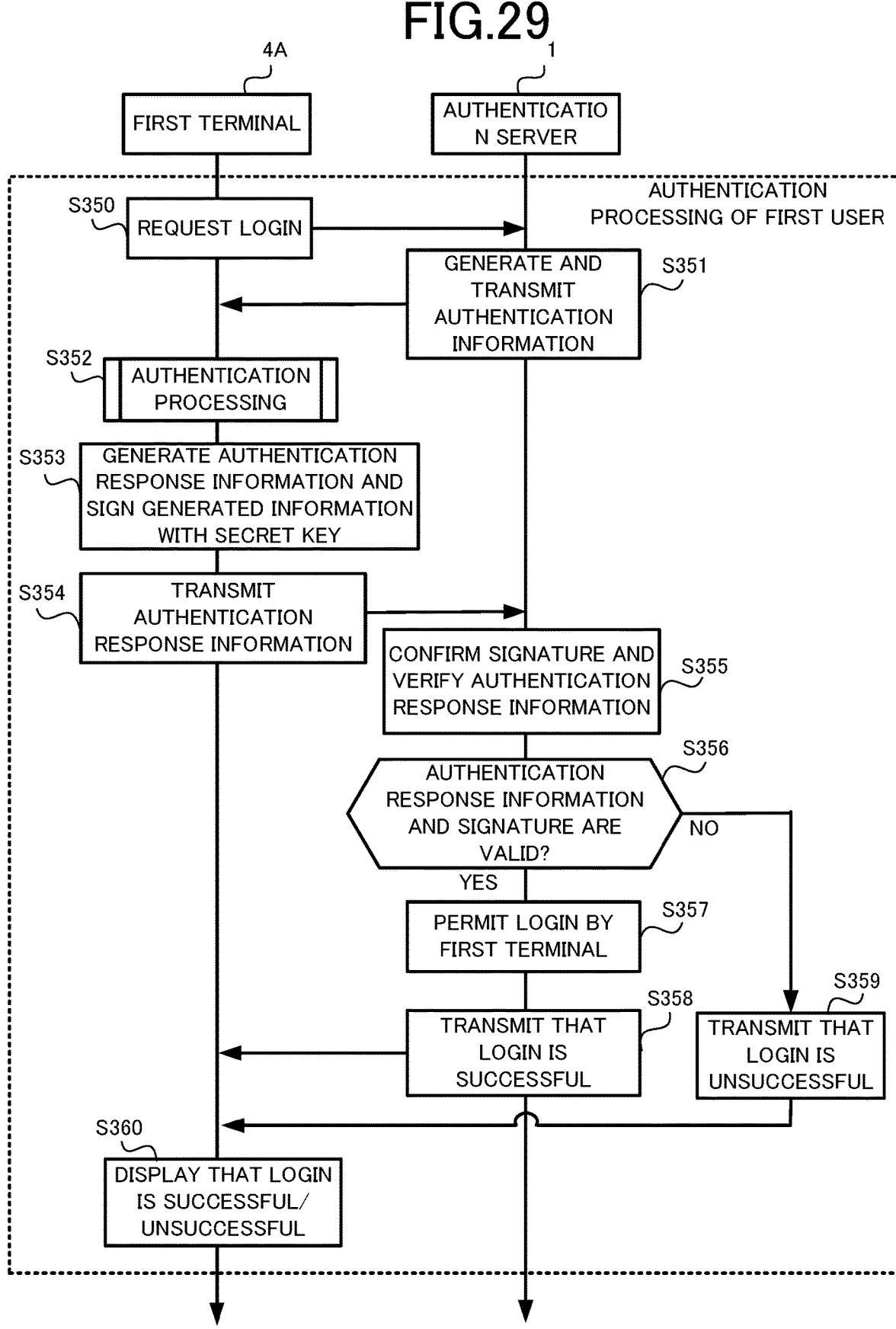
FIG. 29 is a flowchart of authentication processing of the first user in the file deposit processing illustrated in FIG. 26.
Figure 30:
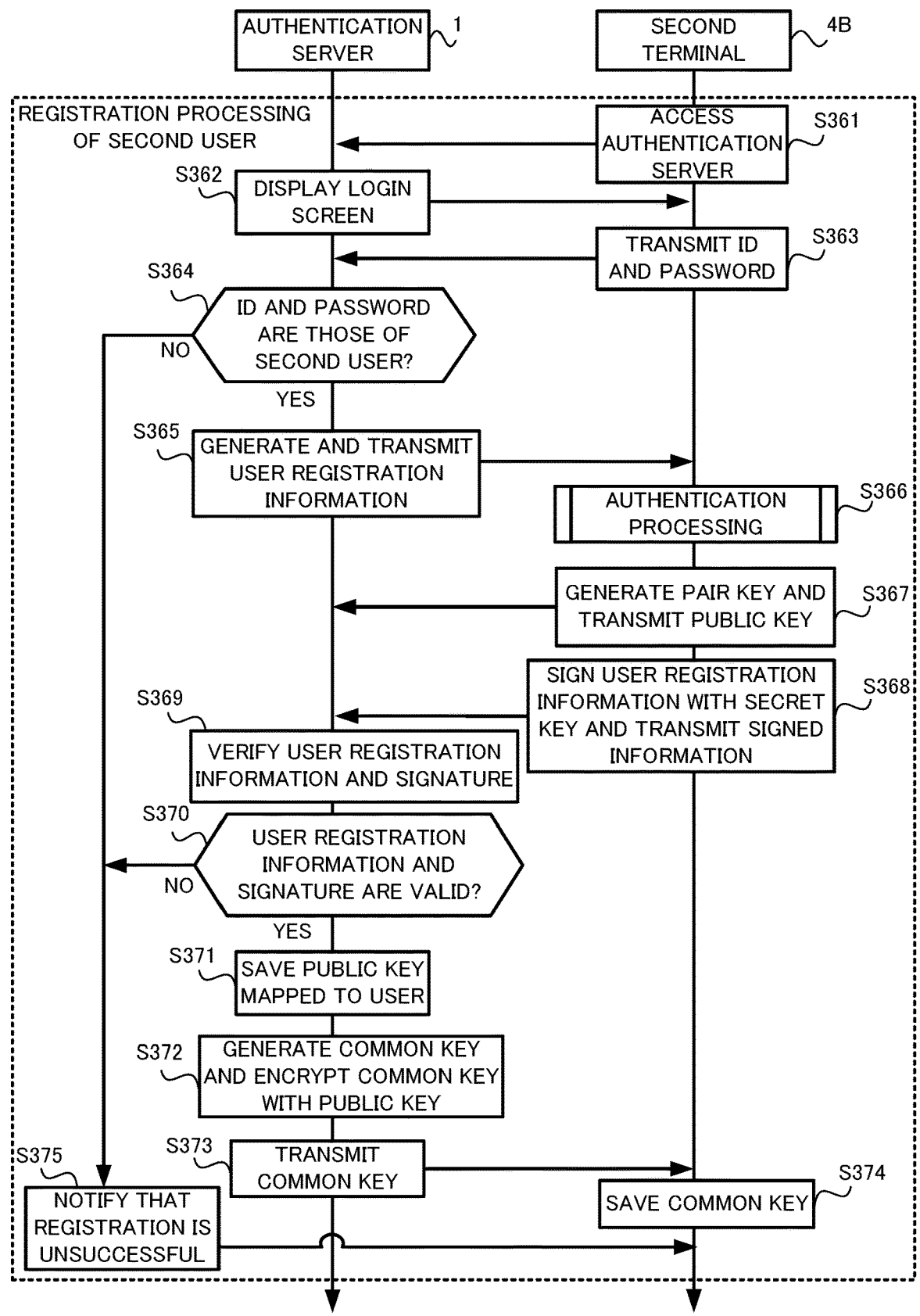
FIG. 30 is a flowchart of registration processing of a second user in the file deposit processing illustrated in FIG. 26.

Next, flows of processing executed in the information processing system 100 according to present Embodiment 4 will be described below referring to flowcharts illustrated in FIG. 26 to FIG. 35. The flowchart illustrated in FIG. 26 illustrates an entire structure of processing executed in the information processing system 100. Each type of processing described in FIG. 26 is processing provided by the authentication server 1 illustrated in FIG. 2, the first terminal 4A illustrated in FIG. 4B, and the second terminal 4B illustrated in FIG. 4B executing a user authentication processing program 110 in the authentication server 1, a file deposit processing program 478 in the first terminal 4A, and a file acquisition processing program 480 in the second terminal 4B, respectively.

First, the first user executes file deposit-update processing and causes clouds 3 illustrated in FIG. 1 to store a user deposit file generated by the first user (Step S83). Details of the file deposit-update processing will be described referring to FIG. 27.

The first user using the first terminal 4A is authenticated to be the first user himself or herself by execution of authentication processing illustrated in FIG. 6 (Step S321). When the first user using the first terminal 4A is authenticated to be the first user himself or herself, the first user selects, from an operation input device 44, an icon being displayed on a screen of a display 49 in the first terminal 4A illustrated in FIG. 4B and being associated with the file deposit processing program 478. The first user logs into the cloud 3 by inputting a user name, a password, and the like through a login screen displayed on the screen of the display 49 (Step S322). When the login is successful, the cloud 3 transmits to the first terminal 4A that the login is successful (Step S323).

The first user selects storage or update of a user deposit file generated by the first user from an operation menu displayed on the screen of the display 49. When the first user selects storage of the user deposit file from the operation menu (Step S324: YES), file storage processing illustrated in FIG. 13 is executed, and the user deposit file is distributed across the clouds 3 (Step S325). When the first user does not select storage of the user deposit file from the operation menu (Step S324: NO) and selects update of the deposit file (Step S326: YES), file update processing illustrated in FIG. 21 is executed, and a content of the user deposit file deposited in the cloud 3 is updated (Step S327). When update of the deposit file is not selected (Step S326: NO) or the file update processing in Step S327 is completed, the first user selects logout from the operation menu displayed on the screen of the display 49 in the first terminal 4A and causes the first terminal 4A to log out of the cloud 3 (Step S328).

The description returns to FIG. 26. When the authentication processing illustrated in FIG. 6 is executed in the first terminal 4A and the person using first terminal 4A is authenticated to be the first user himself or herself (Step S84), a terminal controller 48 in the first terminal 4A performs registration processing of the first user (Step S85). The registration processing of the first user will be described with reference to the flowchart illustrated in FIG. 28. The terminal controller 48 in the first terminal 4A accesses the authentication server 1 (Step S330). A server controller 11 in the authentication server 1 causes the terminal controller 48 in the first terminal 4A to display a login screen on the screen of the display 49 of the first terminal 4A (Step S331). The first user inputs an ID and a password of the first user from the login screen displayed on the screen of the display 49. The terminal controller 48 in the first terminal 4A transmits the ID and the password input by the first user to the authentication server 1 (Step S332).

The server controller 11 in the authentication server 1 determines whether the ID and the password received from the first terminal 4A match those of the first user preregistered in the authentication server 1 (Step S333). When the ID and the password received from the first terminal 4A are those of the first user (Step S333: YES), the server controller 11 in the authentication server 1 generates user registration information required for registering the first user, such as challenge data, an authentication proxy, and an application ID, and transmits the generated information to the first terminal 4A (Step S334). Further, when the ID and the password received from the first terminal 4A are not those of the first user (Step S333: NO), the server controller 11 in the authentication server 1 transmits to the first terminal 4A that the registration is unsuccessful (Step S344).

When the authentication processing illustrated in FIG. 6 is executed in the first terminal 4A and the person using the first terminal 4A is authenticated to be the first user himself or herself (Step S335), the terminal controller 48 in the first terminal 4A generates a pair key including a secret key and a public key used with the authentication server 1. For example, the keys generated by the terminal controller 48 in the first terminal 4A are assumed to be Kp1 as a secret key and Kp2 as a public key. The terminal controller 48 in the first terminal 4A writes the generated pair key mapped to the name "authentication server" into the table in the first cipher key database 476A illustrated in FIG. 24A. Next, the terminal controller 48 in the first terminal 4A transmits the public key in the generated pair key to the authentication server 1 (Step S336).

The terminal controller 48 in the first terminal 4A signs the user registration information transmitted from the authentication server 1 in Step S334 with a secret key and transmits the signed information to the authentication server 1 (Step S337). The server controller 11 in the authentication server 1 verifies whether the user registration information and the signature placed with the secret key that are transmitted from the first terminal 4A are valid (Step S338). Specifically, the server controller 11 in the authentication server 1 compares the user registration information transmitted to the first terminal 4A by the authentication server 1 with the user registration information received from the first terminal 4A and determines whether the two match. Further, the server controller 11 in the authentication server 1 verifies the signature placed with the secret key by using the public key transmitted from the first terminal 4A Step S336.

When the user registration information and the signature placed with the secret key that are transmitted from the first terminal 4A are valid (Step S339: YES), the server controller 11 in the authentication server 1 writes and saves the public key transmitted from the first terminal 4A mapped to the name "first terminal" into the table in the cipher key information database 120A illustrated in FIG. 25 (Step S340). Further, when the user registration information and the signature placed with the secret key that are transmitted from the first terminal 4A are not valid (Step S339: NO), the server controller 11 in the authentication server 1 transmits to the first terminal 4A that the registration is unsuccessful (Step S344).

The server controller 11 in the authentication server 1 generates a common key used with the first terminal 4A (Step S341). For example, the common key generated by the server controller 11 is assumed to be KC. The server controller 11 writes and saves the generated common key mapped to the name "first terminal" into the table in the cipher key information database 120A illustrated in FIG. 25. Next, the server controller 11 encrypts the generated common key with the public key transmitted from the first terminal 4A and transmits the encrypted key to the first terminal 4A (Step S342). The terminal controller 48 in the first terminal 4A decrypts the common key transmitted from the authentication server 1 with a secret key generated by the first terminal 4A and writes and saves the decrypted key mapped to the name "authentication server" into the first cipher key database 476A illustrated in FIG. 24A (Step S343).

The description returns to FIG. 26. The terminal controller 48 in the first terminal 4A executes authentication processing of the first user (Step S86). The authentication processing of the first user will be described referring to the flowchart illustrated in FIG. 29. The terminal controller 48 in the first terminal 4A requests login from the authentication server 1 (Step S350). The server controller 11 in the authentication server 1 generates authentication information required for authenticating the first user, such as challenge data, an authentication proxy, and an application ID, and transmits the generated information to the first terminal 4A (Step S351).

When the authentication processing illustrated in FIG. 6 is executed in the first terminal 4A and the person using the first terminal 4A is authenticated to be the first user himself or herself (Step S352), the terminal controller 48 in the first terminal 4A generates authentication response information such as the hash value of the challenge data, a server address of the authentication proxy, and an application ID. The terminal controller 48 in the first terminal 4A signs the generated authentication response information with a secret key (Step S353). The secret key used for the signature is the secret key Kp1 mapped to the name "authentication server" written in the table in the first cipher key database 476A illustrated in FIG. 24A. The terminal controller 48 in the first terminal 4A transmits the authentication response information signed with the secret key to the authentication server 1 (Step S354).

The server controller 11 in the authentication server 1 verifies whether the authentication response information and the signature placed with the secret key that are transmitted from the first terminal 4A are valid (Step S355). Specifically, the server controller 11 in the authentication server 1 determines validity by comparing the authentication information transmitted to the first terminal 4A by the authentication server 1 with the authentication response information received from the first terminal 4A (Step S356). Further, the server controller 11 in the authentication server 1 verifies the signature placed with the secret key by using the public key transmitted from the first terminal 4A in Step S336 described in the flowchart in FIG. 28.

When the authentication response information and the signature placed with the secret key that are transmitted from the first terminal 4A are valid (Step S356: YES), the server controller 11 permits the login by the first terminal 4A (Step S357). Next, the server controller 11 transmits to the first terminal 4A that the login is successful (Step S358). Further, when the authentication response information and the signature placed by the secret key that are transmitted from the first terminal 4A are not valid (Step S356: NO), the server controller 11 transmits to the first terminal 4A that the login is unsuccessful (Step S359). The terminal controller 48 in the first terminal 4A causes the screen of the display 49 to display that the login is successful or unsuccessful, based on information transmitted from the authentication server 1 (Step S360).

The description returns to FIG. 26. When the authentication processing illustrated in FIG. 6 is executed in the second terminal 4B and the person using the second terminal 4B is authenticated to be the second user himself or herself (Step S87), the terminal controller 48 in the second terminal 4B performs registration processing of the second user (Step S88). The registration processing of the second user will be described with reference to the flowchart illustrated in FIG. 30. The terminal controller 48 in the second terminal 4B accesses the authentication server 1 (Step S361). The server controller 11 in the authentication server 1 causes the terminal controller 48 in the second terminal 4B to display a login screen on the screen of the display 49 in the second terminal 4B (Step S362). The second user inputs an ID and a password of the second user from the login screen displayed on the screen of the display 49. The terminal controller 48 in the second terminal 4B transmits the ID and the password input by the second user to the authentication server 1 (Step S363).

The server controller 11 in the authentication server 1 determines whether the ID and the password received from the second terminal 4B match those of the second user preregistered in the authentication server 1 (Step S364). When the ID and the password received from the second terminal 4B are those of the second user (Step S364: YES), the server controller 11 in the authentication server 1 generates user registration information required for registering the second user, such as challenge data, an authentication proxy, and an application ID, and transmits the generated information to the second terminal 4B (Step S365). Further, when the ID and the password received from the second terminal 4B are not those of the second user (Step S364: NO), the server controller 11 in the authentication server 1 transmits to the second terminal 4B that the registration is unsuccessful (Step S375).

When the authentication processing illustrated in FIG. 6 is executed in the second terminal 4B and the person using the second terminal 4B is authenticated to be the second user himself or herself (Step S366), the terminal controller 48 in the second terminal 4B generates a pair key including a secret key and a public key used with the authentication server 1. For example, the keys generated by the terminal controller 48 in the second terminal 4B are assumed to be Kg1 as a secret key and Kg2 as a public key. The terminal controller 48 in the second terminal 4B writes the generated pair key mapped to the name "authentication server" into the table in the second cipher key database 479A illustrated in FIG. 24B. Next, the terminal controller 48 in the second terminal 4B transmits the public key in the generated pair key to the authentication server 1 (Step S367).

The terminal controller 48 in the second terminal 4B signs the user registration information transmitted from the authentication server 1 in Step S365 with the secret key and transmits the signed information to the authentication server 1 (Step S368). The server controller 11 in the authentication server 1 verifies whether the user registration information and the signature placed by the secret key that are transmitted from the second terminal 4B are valid (Step S369). Specifically, the server controller 11 in the authentication server 1 determines a match by comparing the user registration information transmitted to the second terminal 4B by the authentication server 1 with the user registration information received from the second terminal 4B. Further, the server controller 11 in the authentication server 1 verifies the signature placed by the secret key by using the public key transmitted from the second terminal 4B in Step S367 described in the flowchart in FIG. 30.

When the user registration information and the signature placed by the secret key that are transmitted from the second terminal 4B are valid (Step S370: YES), the server controller 11 in the authentication server 1 writes and saves the public key transmitted from the second terminal 4B mapped to the name "second terminal" into the table in the cipher key information database 120A illustrated in FIG. 25 (Step S371). Further, when the user registration information and the signature placed by the secret key that are transmitted from the second terminal 4B are not valid (Step S370: NO), the server controller 11 in the authentication server 1 transmits to the second terminal 4B that the registration is unsuccessful (Step S375).

The server controller 11 in the authentication server 1 generates a common key used with the second user (Step S372). For example, the common key generated by the server controller 11 is assumed to be KD. The server controller 11 writes and saves the generated common key mapped to the name "second terminal" into the table in the cipher key information database 120A illustrated in FIG. 25. Next, the server controller 11 encrypts the generated common key with the public key transmitted from the second terminal 4B and transmits the encrypted key to the second terminal 4B (Step S373). The terminal controller 48 in the second terminal 4B decrypts the common key transmitted from the authentication server 1 with the secret key generated by the second terminal 4B and writes and saves the decrypted key mapped to the name "authentication server" into the second cipher key database 479A illustrated in FIG. 24B (Step S374).

The description returns to FIG. 26. When the person using the first terminal 4A is authenticated to be the first user himself or herself through the authentication processing illustrated in FIG. 6 (Step S89) and the person using the second terminal 4B is authenticated to be the second user himself or herself through the authentication processing illustrated in FIG. 6 (Step S90), the terminal controllers 48 in the first terminal 4A and the second terminal 4B perform biometric information acquisition processing (Step S91). The biometric information acquisition processing will be described below referring to the flowchart illustrated in FIG. 31.

The terminal controller 48 in the first terminal 4A requests a public key from the second terminal 4B (Step S380). The terminal controller 48 in the second terminal 4B generates a pair key including a secret key and a public key. For example, the pair key generated by the terminal controller 48 in the second terminal 4B is assumed to include Kh1 as a secret key and Kh2 as a public key. The terminal controller 48 in the second terminal 4B writes the name of a target using keys and the pair key mapped to each other into the table in the second cipher key database 479A illustrated in FIG. 24B. For example, the terminal controller 48 writes "first terminal" into the name of a target using keys, "Kh1" into the secret key item, and "Kh2" into the public key item. The terminal controller 48 in the second terminal 4B saves the written second cipher key database 479 into a terminal storage 47 in the second terminal 4B illustrated in FIG. 4B. Next, the terminal controller 48 in the second terminal 4B transmits the public key Kh2 to the first terminal 4A (Step S381).

When receiving the public key Kh2 from the second terminal 4B, the terminal controller 48 in the first terminal 4A saves the received key into the table in the first cipher key database 476A illustrated in FIG. 24A (Step S382). For example, the terminal controller 48 writes the name of a target using keys and the public key Kh2 mapped to each other into the table in the first cipher key database 476A illustrated in FIG. 24A. For example, the terminal controller 48 writes "second terminal" into the name of a target using keys and "Kh2" into the public key item.

The terminal controller 48 in the first terminal 4A generates a common key used with the second terminal 4B (Step S383). The terminal controller 48 in the first terminal 4A encrypts the generated common key and a user name of the first user with the public key transmitted from the second terminal 4B in Step S381 (Step S384). For example, the common key generated by the terminal controller 48 in the first terminal 4A is assumed to be KE. The terminal controller 48 in the first terminal 4A writes the generated common key mapped to the name of a target using keys and the common key KE into the table in the first cipher key database 476A illustrated in FIG. 24A. For example, the terminal controller 48 writes "second terminal" into the name of a target using keys and "KE" into the public key item.

The terminal controller 48 in the first terminal 4A generates challenge data for authenticating the second user (Step S385). The terminal controller 48 in the first terminal 4A transmits the generated challenge data, the common key, and a terminal name to the second terminal 4B (Step S386). The terminal controller 48 in the second terminal 4B saves the common key and the terminal name that are received from the first terminal 4A, the key and the name being mapped to each other (Step S387). Specifically, the terminal controller 48 writes the terminal name into the name of a target using keys and the common key KE received from the first terminal 4A into the common key item, the key and the name being mapped to each other, into the table in the second cipher key database 479A illustrated in FIG. 24B. For example, the terminal controller 48 writes "first terminal" into the name of a target using keys and "KE" into the public key item.

The terminal controller 48 in the first terminal 4A requests biometric information of the second user from the second terminal 4B (Step S388). The terminal controller 48 in the second terminal 4B acquires biometric information of the second user (Step S389). The biometric information of the second user acquired by the terminal controller 48 in the second terminal 4B may be either biometric information of the second user registered in the second terminal 4B or newly acquired biometric information of the second user. It is assumed here that the biometric information of the second user is a face image of the second user captured by a front-facing camera 41A in the second terminal 4B illustrated in FIG. 4A.

The terminal controller 48 in the second terminal 4B encrypts the acquired biometric information of the second user with the common key KE received from the first terminal 4A. Next, the terminal controller 48 signs the hash value of the challenge data acquired from the first terminal 4A in Step S386 with a secret key (Step S390). The secret key is the secret key Kh1 being written in the second cipher key database 479A in FIG. 24B and being mapped to the name "first terminal."

The terminal controller 48 in the second terminal 4B transmits the biometric information of the second user encrypted with the common key KE and the hash value of the challenge data signed with the secret key Kh1 to the first terminal 4A (Step S391). The terminal controller 48 in the first terminal 4A decrypts the encrypted biometric information of the second user received from the second terminal 4B with the common key KE. Next, the terminal controller 48 in the first terminal 4A verifies the hash value of the challenge data signed with the secret key Kh1 (Step S392). Specifically, the terminal controller 48 in the first terminal 4A verifies the signature placed with the secret key Kh1 by using the public key Kh2 mapped to the name "second terminal" written in the table in the first cipher key database 476A illustrated in FIG. 24A. Next, the terminal controller 48 in the first terminal 4A verifies whether the hash value of the challenge data generated by the first terminal 4A matches the hash value of the challenge data received from the second terminal 4B. The terminal controller 48 in the first terminal 4A saves the received biometric information of the second user into the terminal storage 47 illustrated in FIG. 4B (Step S393).

The description returns to FIG. 26. When the authentication processing illustrated in FIG. 6 is executed in the first terminal 4A and the person using the first terminal 4A is authenticated to be the first user himself or herself (Step S92), the terminal controller 48 in the first terminal 4A performs registration processing of disclosure setting information (Step S93). The registration processing of disclosure setting information will be described with reference to the flowchart illustrated in FIG. 32.

The terminal controller 48 in the first terminal 4A generates disclosure setting information, based on information for accessing the first cloud 3A and the second cloud 3B across which the user deposit file is distributed, data in a file management table 475 illustrated in FIG. 4B, and file division cipher keys (Step S393). The file division cipher keys are keys with which the user deposit file saved in the first cloud 3A and the second cloud 3B in a distributed manner is encrypted and are saved in a file division cipher key table 477 in the terminal storage 47 in the first terminal 4A illustrated in FIG. 4B. For example, the file division cipher keys are Kr1 and Kr2 written in the table in the file division cipher key table 477 illustrated in FIG. 7C.

The terminal controller 48 in the first terminal 4A encrypts data of the generated disclosure setting information with the common key KE for the second terminal 4B (Step S394). The terminal controller 48 in the first terminal 4A adds biometric information of the second user and a starting date and time of use of the user deposit file to the encrypted data of the disclosure setting information (Step S395). The biometric information of the second user is transmitted from the second terminal 4B in Step S391 described in FIG. 31. Further, the starting date and time of use of the user deposit file is a date and time from which the deposit file can be acquired from the clouds 3 by the second terminal 4B.

Further, the terminal controller 48 in the first terminal 4A encrypts the data of the generated disclosure setting information with the common key KC for the authentication server 1 stored in the first cipher key database 476A illustrated in FIG. 24A (Step S396). The terminal controller 48 in the first terminal 4A transmits the encrypted data of the disclosure setting information to the authentication server 1 (Step S397). The authentication server 1 receives the encrypted disclosure setting information, the starting date and time of use of the user deposit file, and the biometric information of the second user from the terminal controller 48 in the first terminal 4A. The authentication server 1 saves the received encrypted data of the disclosure setting information tied to the first user and the second user into a server storage 12 in the authentication server 1 illustrated in FIG. 2 (Step S398).

The terminal controller 48 in the first terminal 4A newly generates file division cipher keys. For example, the generated keys are assumed to be Kr3 and Kr4. The terminal controller 48 in the first terminal 4A writes and saves the newly generated file division cipher keys Kr3 and Kr4 into a row following the file division cipher keys Kr1 and Kr2 saved in the file division cipher key table 477 in the terminal storage 47 (Step S399). Thus, file division cipher keys can be varied for each distribution time at which the user deposit file is distributed across the first cloud 3A and the second cloud 3B. Therefore, the first user can give permission to restore and use the user deposit file to a different user for each distribution time. Accordingly, the first user can share required information for each user.

The description returns to FIG. 26. When the first user wants to change data of the disclosure setting information before the starting date and time of use of the user deposit file by the second user, the first user executes disclosure setting information change processing in Step S95. When the authentication processing illustrated in FIG. 6 is executed in the first terminal 4A and the person using the first terminal 4A is authenticated to be the first user himself or herself (Step S94), the terminal controller 48 in the first terminal 4A performs the disclosure setting information change processing (Step S95). The disclosure setting information change processing will be described with reference to the flowchart illustrated in FIG. 33. The terminal controller 48 in the first terminal 4A requests disclosure setting information from the authentication server 1 (Step S401).

The server controller 11 in the authentication server 1 generates user authentication information required for authenticating the first user to be a valid user, such as challenge data, an authentication proxy, and an application ID and transmits the generated information to the first terminal 4A (Step S402). When the authentication processing illustrated in FIG. 6 is executed in the first terminal 4A and the person using the first terminal 4A is authenticated to be the first user himself or herself (Step S403), the terminal controller 48 in the first terminal 4A generates authentication response information such as the hash value of the challenge data, a server address of the authentication proxy, an application ID, and signature information using the secret key Kp1 illustrated in FIG. 24A. The terminal controller 48 in the first terminal 4A transmits the generated authentication response information to the authentication server 1 (Step S404).

The server controller 11 in the authentication server 1 verifies the authentication response information received from the first terminal 4A (Step S405). Specifically, the server controller 11 in the authentication server 1 determines whether the hash value of the challenge data generated by the authentication server 1 matches the hash value of the challenge data received from the first terminal 4A. Further, the server controller 11 in the authentication server 1 determines whether the server address of the authentication proxy, the application ID, and the like that are received from the first terminal 4A match data registered in the authentication server 1. Furthermore, the server controller 11 in the authentication server 1 verifies a signature in the signature information using the secret key Kp1 described in FIG. 24A, the signature information being received from the first terminal 4A, and determines validity.

When the first user is authenticated to be the first user himself or herself as a result of verification of the authentication response information received from the first terminal 4A by the server controller 11 in the authentication server 1 (Step S406: YES), the server controller 11 in the authentication server 1 encrypts the disclosure setting information requested by the first terminal 4A, the biometric information of the second user, and a starting date and time of use of the above information with the common key KC for the first terminal 4A. The server controller 11 in the authentication server 1 transmits the encrypted information to the first terminal 4A (Step S407). Further, when the first user is not authenticated to be the first user himself or herself as a result of verification of the authentication response information received from the first terminal 4A by the server controller 11 in the authentication server 1 (Step S406: NO), the server controller 11 skips subsequent processing and returns to FIG. 26.

The terminal controller 48 in the first terminal 4A decrypts the encrypted information received from the authentication server 1 with the common key KC for the authentication server 1. The terminal controller 48 in the first terminal 4A changes the decrypted disclosure setting information, the biometric information of the second user, and the starting date and time of use of the above information in accordance with an instruction from the first user (Step S408). The terminal controller 48 in the first terminal 4A encrypts the changed disclosure setting information, the changed biometric information of the second user, and the changed starting date and time of use of the above information with the common key KC for the authentication server 1. The terminal controller 48 in the first terminal 4A transmits the encrypted information to the authentication server 1 (Step S409).

The server controller 11 in the authentication server 1 receives the encrypted information from the first terminal 4A. The server controller 11 in the authentication server 1 decrypts the encrypted information with the common key KC for the first terminal 4A and changes information saved in the server storage 12 illustrated in FIG. 2, based on the changed disclosure setting information, the changed biometric information of the second user, and the changed starting date and time of use of the above information (Step S410). The server controller 11 in the authentication server 1 transmits to the first terminal 4A that the information saved in the server storage 12 is changed (Step S411).

The description returns to FIG. 26. When the second user wants to acquire the user deposit file shared by the first user from the clouds 3, the second user acquires and restores the file saved in the clouds 3 in a distributed manner. When the authentication processing illustrated in FIG. 6 is executed in the second terminal 4B and the person using the second terminal is authenticated to be the second user himself or herself (Step S96), the terminal controller 48 in the second terminal 4B executes login processing to the authentication server (Step S97). The login processing to the authentication server will be described below referring to the flowchart illustrated in FIG. 34.

The terminal controller 48 in the second terminal 4B requests login from the authentication server 1 (Step S421). The server controller 11 in the authentication server 1 generates authentication information required for authenticating the second user, such as challenge data, an authentication proxy, and an application ID and transmits the generated information to the second terminal 4B (Step S422).

When the authentication processing illustrated in FIG. 6 is executed in the second terminal 4B and the person using the second terminal 4B is authenticated to be the second user himself or herself (Step S423), the terminal controller 48 in the second terminal 4B generates authentication response information such as the hash value of the challenge data, a server address of the authentication proxy, and an application ID. The terminal controller 48 in the second terminal 4B signs the generated authentication response information with a secret key (Step S424). The secret key used for the signature is the secret key Kg1 mapped to the name "authentication server" written in the table in the second cipher key database 479A illustrated in FIG. 24B. The terminal controller 48 in the second terminal 4B transmits the authentication response information signed with the secret key to the authentication server 1 (Step S425).

The server controller 11 in the authentication server 1 verifies whether the authentication response information and the signature placed by the secret key that are transmitted from the second terminal 4B are valid (Step S426). Specifically, the server controller 11 in the authentication server 1 determines a match by comparing the authentication information transmitted to the second terminal 4B by the authentication server 1 with the authentication response information received from the second terminal 4B. Further, the server controller 11 in the authentication server 1 verifies the signature placed by the secret key by using the public key transmitted from the second terminal 4B in Step S367 described in the flowchart in FIG. 30.

When the authentication response information and the signature placed by the secret key that are transmitted from the second terminal 4B are valid (Step S427: YES), the server controller 11 permits the login by the second terminal 4B (Step S428). Next, the server controller 11 transmits to the second terminal 4B that the login is successful (Step S429). Further, when the authentication response information and the signature placed by the secret key transmitted from the second terminal 4B are not valid (Step S427: NO), the server controller 11 transmits to the second terminal 4B that the login is unsuccessful (Step S430). The terminal controller 48 in the second terminal 4B causes the screen of the display 49 to display that the login is successful or unsuccessful, based on information transmitted from the authentication server 1 (Step S431).

The description returns to FIG. 26. When the login to the server controller 11 by the second terminal 4B is successful, the second user acquires the user deposit file shared by the first user from the clouds 3 and restores the file. The terminal controller 48 in the second terminal 4B executes file acquisition processing (Step S98). The file acquisition processing will be described below referring to the flowchart illustrated in FIG. 35.

The second terminal 4B requests information deposited from the first user from the authentication server 1 (Step S431). The information deposited to the authentication server 1 from the first user is the disclosure setting information transmitted from the terminal controller 48 in the first terminal 4A to the authentication server 1 in Step S397 in the flowchart illustrated in FIG. 32. The disclosure setting information is information generated based on the information for accessing the first cloud 3A and the second cloud 3B across which the user deposit file is distributed, the data in the file management table 475 illustrated in FIG. 4B, and the file division cipher keys.

The server controller 11 in the authentication server 1 illustrated in FIG. 2 requests biometric information of the second user from the second terminal 4B (Step S432). The biometric information of the second user stored in the server storage 12 in the authentication server 1 is the information transmitted from the first terminal 4A in Step S397 in the flowchart illustrated in FIG. 32. Then, the biometric information of the second user transmitted from the first terminal 4A to the authentication server 1 is the face image of the second user transmitted from the second terminal 4B to the first terminal 4A in Step S391 in the flowchart illustrated in FIG. 31. Therefore, the server controller 11 in the authentication server 1 specifically requests a face image of the second user from the second terminal 4B in Step S432.

Figure 31:
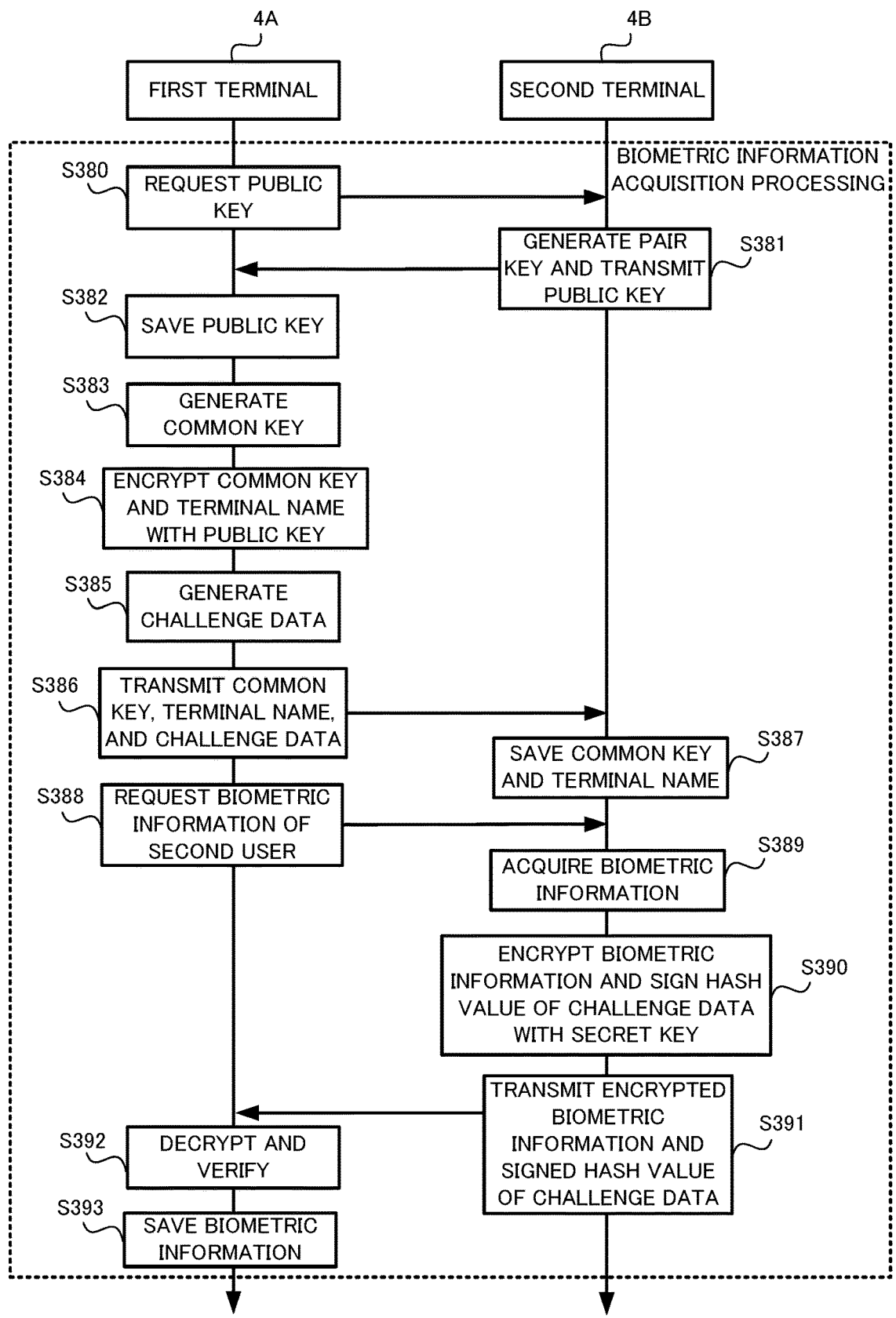
FIG. 31 is a flowchart of biometric information acquisition processing in the file deposit processing illustrated in FIG. 26.

The terminal controller 48 in the second terminal 4B acquires biometric information of the second user (Step S433). The biometric information of the second user acquired by the terminal controller 48 in the second terminal 4B is a face image of the second user captured by the front-facing camera 41A in the second terminal 4B illustrated in FIG. 4A. The terminal controller 48 in the second terminal 4B determines whether the acquired biometric information of the second user and the biometric information transmitted from the second terminal 4B to the first terminal 4A in Step S391 in the flowchart illustrated in FIG. 31 are the same (Step S434). When the acquired biometric information of the second user and the biometric information transmitted from the second terminal 4B to the first terminal 4A are the same (Step S434: YES), the terminal controller 48 in the second terminal 4B encrypts the acquired biometric information with a common key and transmits the encrypted information to the authentication server 1 (Step S435). The common key used for encrypting the acquired biometric information by the terminal controller 48 in the second terminal 4B is the common key KD mapped to the name "authentication server" described in the second cipher key database 479A illustrated in FIG. 24B. Further, when the acquired biometric information of the second user and the biometric information transmitted from the second terminal 4B to the first terminal 4A are not the same (Step S434: NO), the terminal controller 48 skips subsequent processing and returns to FIG. 26.

The server controller 11 in the authentication server 1 decrypts the biometric information of the second user received from the second terminal 4B with a common key. The common key used for decrypting the biometric information acquired from the second terminal 4B by the server controller 11 in the authentication server 1 is the common key KD mapped to the name "second terminal" described in the cipher key information database 120A illustrated in FIG. 25. Next, the server controller 11 in the authentication server 1 compares a face image of the second user being the biometric information being received from the first terminal 4A and being saved in the server storage 12 with a face image of the second user being the biometric information received from the second terminal 4B (Step S436). The server controller 11 in the authentication server 1 determines whether the pieces of biometric information compared in Step S436 match (Step S437). When the determination result is a match (Step S437: YES), the server controller 11 determines whether the starting date and time of use of the user deposit file is passed, assuming that the second user is authenticated to be the second user himself or herself (Step S438). Further, when the determination result is not a match (Step S437: NO) the server controller 11 skips processing from there onward and returns to FIG. 26. Thus, disclosure of the user deposit file deposited in the clouds 3 by the first user by using the first terminal 4A to the second user being a third party can be prevented.

When the starting date and time of use of the user deposit file is passed (Step S438: YES), the server controller 11 in the authentication server 1 encrypts the disclosure setting information transmitted from the terminal controller 48 in the first terminal 4A in Step S397 in the flowchart illustrated in FIG. 32 with the common key KD for the second terminal 4B. The server controller 11 in the authentication server 1 transmits the encrypted disclosure setting information to the second terminal 4B (Step S439). Further, when the starting date and time of use of the user deposit file is not passed (Step S438: NO), the server controller 11 in the authentication server 1 skips processing from here onward and returns to FIG. 26.

The terminal controller 48 in the second terminal 4B first decrypts the disclosure setting information received from the authentication server 1 with the common key KD for the authentication server 1. Next, the terminal controller 48 in the second terminal 4B decrypts the disclosure setting information decrypted with the common key KD for the authentication server 1 with a secret key for the first terminal 4A. The secret key for decryption is the secret key Kh1 mapped to the name "first terminal" in the second cipher key database 479A illustrated in FIG. 24B. The terminal controller 48 in the second terminal 4B saves the decrypted disclosure setting information into the terminal storage 47 in the second terminal 4B illustrated in FIG. 4B (Step S440).

The terminal controller 48 in the second terminal 4B executes file restoration processing by using the decrypted disclosure setting information (Step S441). As for the file restoration processing, Step S21 to Step S25 described in FIG. 14 are executed. The terminal controller 48 in the second terminal 4B saves the restored user deposit file into the terminal storage 47 in the second terminal 4B illustrated in FIG. 4B (Step S442).

The description returns to FIG. 26. The terminal controller 48 in the second terminal 4B logs out from the authentication server 1 (Step S99). The terminal controller in the first terminal 4A ends the file deposit processing program 478 in the terminal storage 47 illustrated in FIG. 4B. The server controller 11 in the authentication server 1 ends the user authentication processing program 110 illustrated in FIG. 2. The terminal controller in the second terminal 4B ends the file acquisition processing program 480 in the terminal storage 47 illustrated in FIG. 4B.

As described above, in the information processing system 100 according to Embodiment 4, user authentication is performed by coordinating user authentication processing in the terminal 4 with public key authentication performed between the terminal 4 and the authentication server 1. Thus, a user can be specified without transmission of biometric information of the user to the authentication server 1, and therefore user authentication can be performed while preventing a leak of the biometric information of the user.

Embodiment 5

Unlike the authentication processing executed by the terminals 4 in the information processing systems 100 according to aforementioned Embodiments 1 to 4, a terminal 4 in an information processing system 100 according to Embodiment 5 performs authentication by using user habit data in a gray situation in which an authentication result with biometric information of a user using the terminal 4 does not allow the user to be clearly determined to be the user himself or herself. Thus, even in the gray situation in which a user using a terminal 4 cannot be clearly determined to be the user himself or herself by authentication with biometric information, the user himself or herself can be authenticated by using user habit data.

Figure 36:
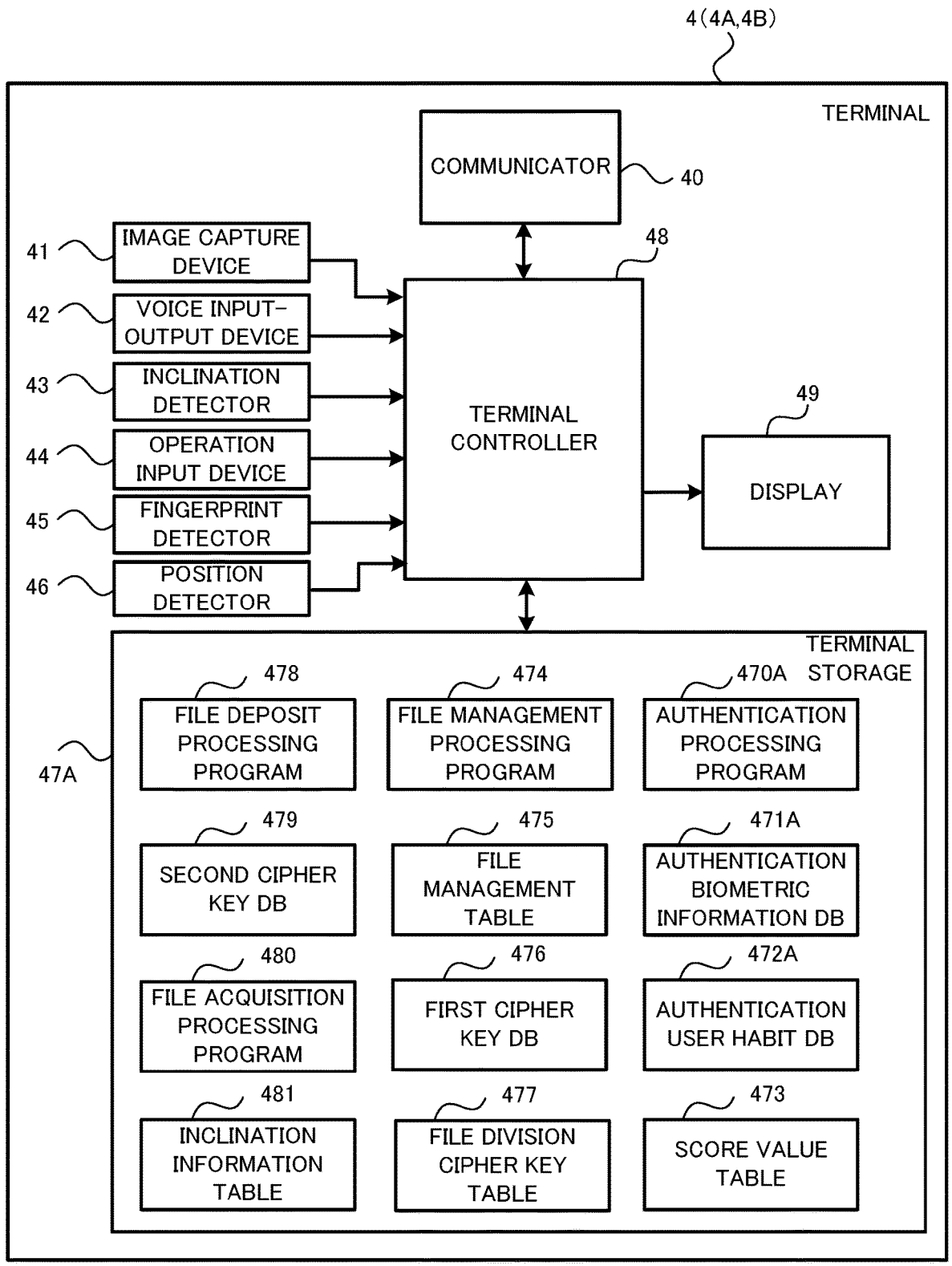
FIG. 36 is a block diagram of a terminal according to Embodiment 5.

FIG. 36 is a block diagram illustrating a configuration of the terminal 4 according to Embodiment 5. A terminal storage 47A in the terminal 4 includes an authentication processing program 470A for performing user authentication processing according to Embodiment 5, a authentication biometric information database 471A putting together user biometric information acquired by the terminal 4, an authentication user habit database 472A putting together user habit data acquired by the terminal 4, and an inclination information table 481 for storing an inclination state of the terminal 4.

The authentication processing program 470A is a program performing processing of authenticating a user, based on user biometric information and user habit data that are acquired by the terminal 4. The authentication biometric information database 471A is a database for saving information about user biometric information and an authentication value used for authentication. The authentication user habit database 472A is a database for saving information about a user-specific habit at the time of operating the terminal 4, an acceptance condition for authentication, and the like. User-specific habits refer to habits specific to a user such as an action taken when the user operates the terminal 4, the distance between a screen of a display 49 and the face of the user, a keystroke, the way the user holds the terminal 4, the position at which the terminal 4 is used, a connection count to a specific communication network, launching a specific application, and an operation.

The inclination information table 481 is a table for storing an inclination angle of the terminal 4 detected by an inclination detector 43, an acquisition date and time, and a standby time for acquisition. Details of the authentication biometric information database 471A, the authentication user habit database 472A, and the inclination information table 481 will be described later.

Figure 4C:
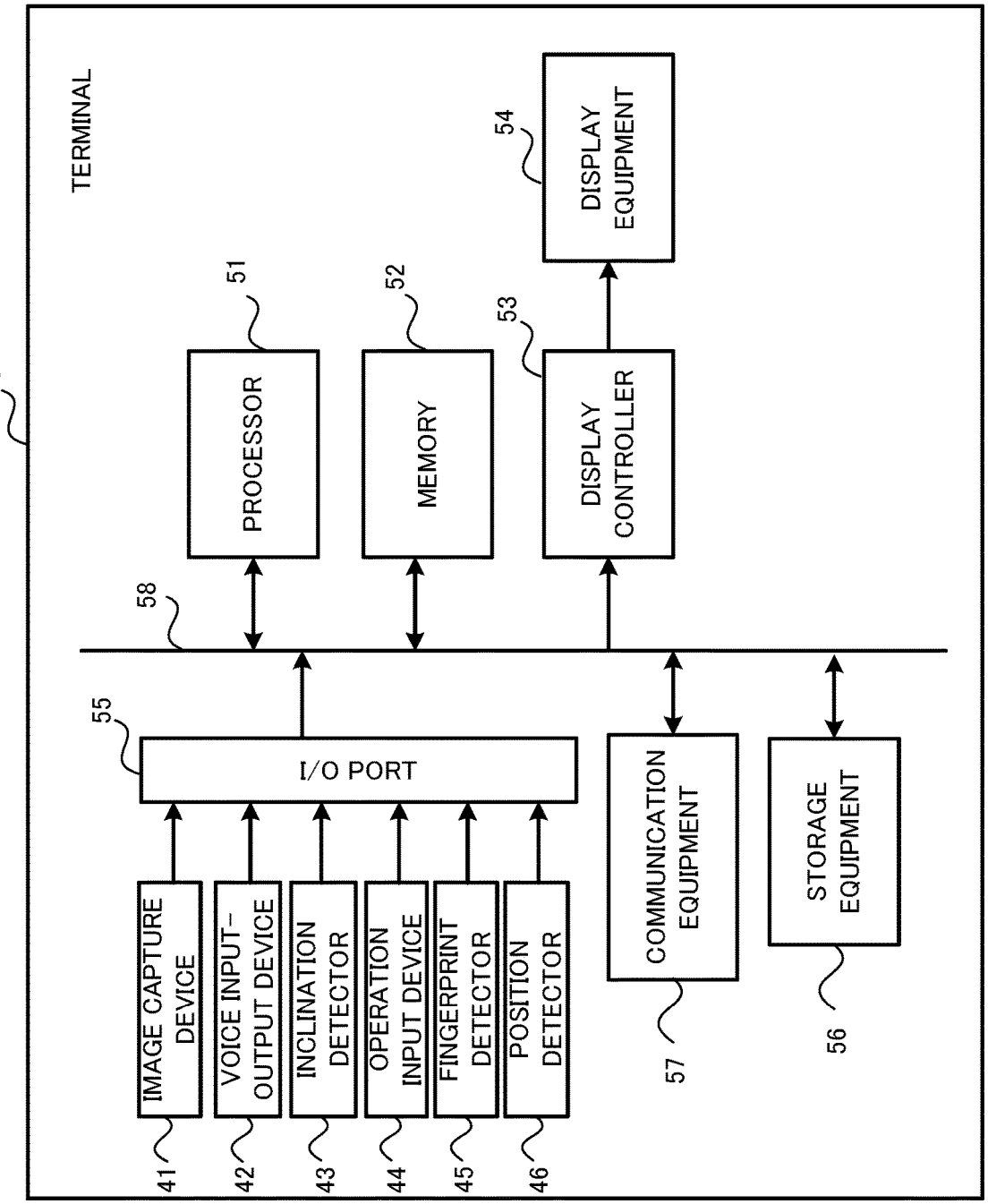
FIG. 4C is a diagram illustrating an example of a hardware configuration of the terminal in the information processing system illustrated in FIG. 1.
Figure 37:
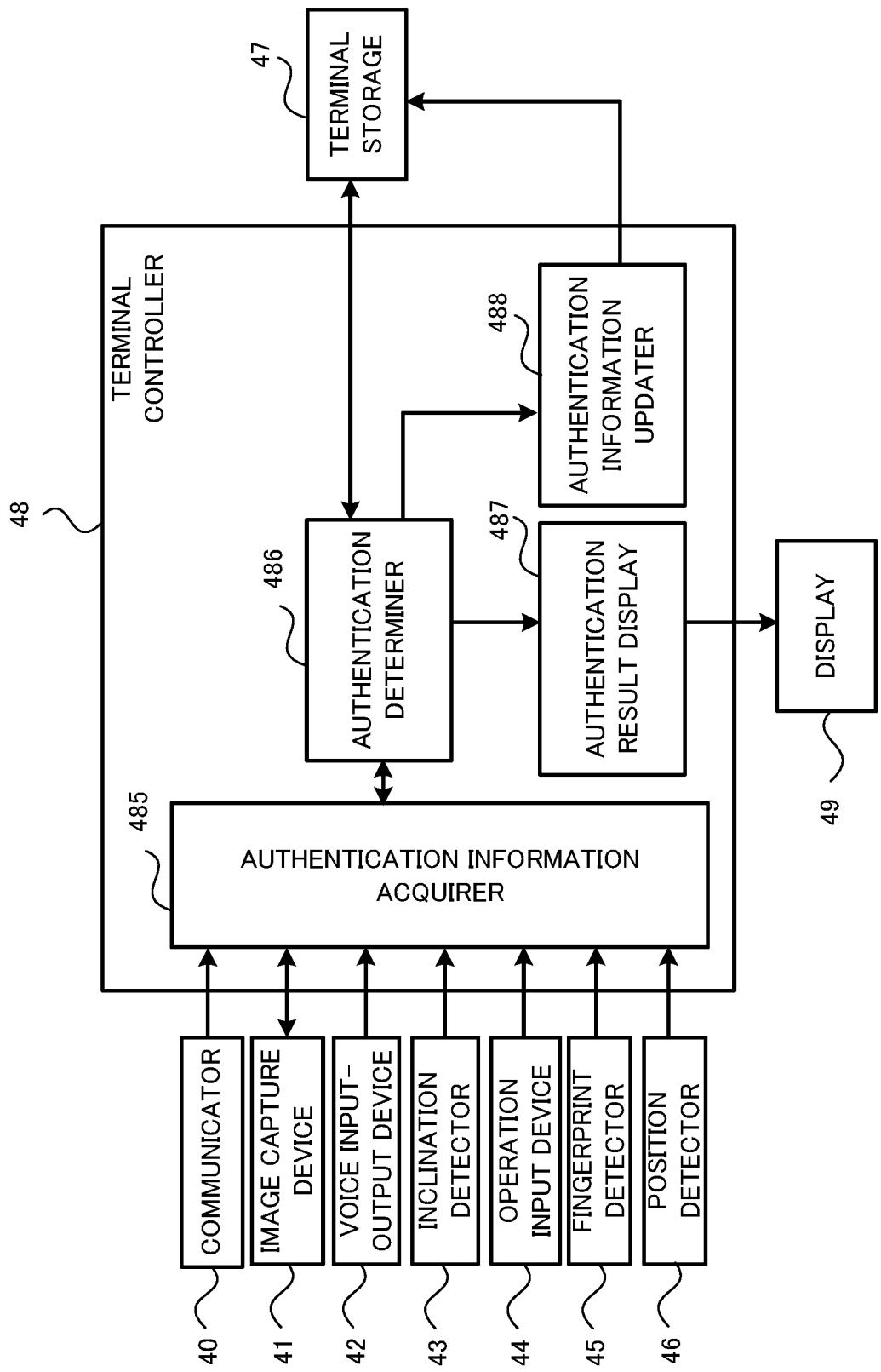
FIG. 37 is an information processing block diagram of the terminal illustrated in FIG. 36.

An information processing block illustrated in FIG. 37 is provided in a terminal controller 48 by a processor 51 in the terminal 4 illustrated in FIG. 4C executing the authentication processing program 470A stored in the terminal storage 47A in the terminal 4 illustrated in FIG. 36. Thus, the terminal 4 can authenticate a user to be the user himself or herself, based on biometric information such as an image of the face, a fingerprint, and a voiceprint of the user himself or herself, and user habit data such as a specific action taken when the user operates the terminal 4 and an operation state and can execute various functions in the terminal 4.

The information processing block includes an authentication information acquirer 485 acquiring authentication biometric information and user habit data from a communicator 40, an image capture device 41, and the like, an authentication determiner 486 authenticating whether a user is the user himself or herself, an authentication result display 487 causing the display 49 to display an authentication result, and an authentication information updater 488 updating information in various databases and tables stored in the terminal storage 47A in accordance with an instruction from the authentication determiner 486.

The authentication information acquirer 485 acquires authentication biometric information and user habits from the communicator 40, the image capture device 41, and the like. The authentication determiner 486 performs user authentication, based on the authentication biometric information and the user habits acquired from the authentication information acquirer 485, authentication values stored in various databases in the terminal storage 47A, an acceptance condition, and the like. The authentication result display 487 receives a user authentication result from the authentication determiner 486 and causes the display 49 to display a message, an image, and the like, based on the authentication result. The authentication information updater 488 updates data stored in the various databases and tables stored in the terminal storage 47A in accordance with an instruction from the authentication determiner 486. Various pieces of biometric information acquired by the authentication information acquirer 485 are examples of first authentication data and third authentication data in the claims. Various pieces of user habit data acquired by the authentication information acquirer 485 are examples of second authentication data in the claims.

Next, a structure of a table in each of the authentication biometric information database 471A, the authentication user habit database 472A, and the inclination information table 481 that are stored in the terminal storage 47A will be described below referring to FIG. 38A to FIG. 38C. First, as illustrated in FIG. 38A, a biometric information type such as face or voice, registered information being biometric information of the user himself or herself, and the mean value of authentication values determined from registered information and biometric information acquired by the authentication information acquirer 485 illustrated in FIG. 37 are stored in the table in the authentication biometric information database 471A. The registered information stored in the table in the authentication biometric information database 471A is biometric information of the user himself or herself. The registered information is information preregistered before authentication processing is performed in the terminal 4 and is updated when the user himself or herself is authenticated. For example, the registered information stores a feature value determined from a face image when the biometric information type is face, voice data, a feature value determined from the voice data, or both voice data and a feature value thereof when the biometric information type is voice, iris data when the biometric information type is iris, and a feature value determined from an image of a fingerprint when the biometric information type is fingerprint.

According to the present embodiment, determination of similarity of biometric information is made by an authentication value. The authentication value is a value determined based on a comparison result between registered information and biometric information acquired by the authentication information acquirer 485 illustrated in FIG. 37. The authentication value approaches 0 when the registered information is similar to the biometric information acquired by the authentication information acquirer 485 and approaches 1 when the two are not similar. The authentication biometric information database 471A includes the mean value of authentication values, an authentication threshold value being a threshold value for determining an authentication value, and an allowable authentication value including an allowable authentication range value indicating a gray situation of a user in the authentication threshold value.

First, the mean value of authentication values is the mean value of registered information and an authentication value determined from biometric information acquired by the authentication information acquirer 485. The authentication threshold value is a value being a criterion for determining a user to be the user himself or herself when an authentication value determined based on a result of comparing registered information with biometric information acquired by the authentication information acquirer 485 is equal to or less than the authentication threshold value. The authentication threshold value is a value varying with status of user authentication and an upper limit is predetermined. The upper limit is a value determined in such a way that a user should not be authenticated to be the user himself or herself, based solely on biometric information, when an authentication value is equal to or greater than the upper limit. For example, in a case that a default value of the authentication threshold value is set to 0.4 between 0 approached by an authentication value when registered information and biometric information acquired by the authentication information acquirer 485 are similar and 1 approached by an authentication value when the two are not similar, the upper limit of the authentication threshold value is set to 0.45. Further, the allowable authentication value is a value being a criterion for determining a user to be not the user himself or herself when an authentication value determined based on a result of comparing registered information with biometric information acquired by the authentication information acquirer 485 is equal to or greater than the allowable authentication value. The allowable authentication value is a value including an allowable authentication range value indicating a gray situation of a user in the authentication threshold value, as described above, and therefore is a value varying with variation in the authentication threshold value and the allowable authentication range value. An upper limit is predetermined for the allowable authentication value and is referred to as a maximum allowable authentication value. The maximum allowable authentication value is a value determined in such a way that a user should be determined to be another person when an authentication value is equal to or greater than the maximum allowable authentication value. For example, the maximum allowable authentication value is set to 0.5 being a midpoint between 0 approached by an authentication value when registered information and biometric information acquired by the authentication information acquirer 485 are similar and 1 approached by an authentication value when the two are not similar.

A value between the authentication threshold value and the allowable authentication value is referred to as an allowable authentication range value and is a value indicating a situation in which whether a user is the user himself or herself is gray. When an authentication value is within the allowable authentication range value, it is assumed that whether a user is the user himself or herself is not determined solely by biometric information and that the user is authenticated to be the user himself or herself when a user-specific user habit meets an acceptance condition and is not authenticated to be the user himself or herself when the condition is not met. User authentication based on a user habit is hereinafter referred to as secondary authentication. The allowable authentication range value is a value predetermined in such a way that when an authentication value falls within the range, the user may be mainly considered as the user himself or herself. For example, the allowable authentication range value is 0.08 being equal to or less than 10% of the difference between 0 approached in a case of similarity and 1 approached in a case of dissimilarity. When the authentication threshold value reaches the upper limit, the allowable authentication range value is a value acquired by subtracting the upper limit of the authentication threshold value from the maximum allowable authentication value. For example, when the upper limit of the authentication threshold value is 0.45 and the maximum allowable authentication value is 0.5, the allowable authentication range value is 0.05. Accordingly, when the authentication threshold value reaches the upper limit, the allowable authentication range value takes a value smaller than a value in a case of the authentication threshold value not reaching the upper limit.

Next, the table in the authentication user habit database 472A will be described below referring to FIG. 38B. The table in the authentication user habit database 472A stores a user habit type such as communication connection and event execution, acquired information acquired by the authentication information acquirer 485 illustrated in FIG. 37, the latest status in each user habit, and an acceptance condition of each user habit. For example, the acquired information stores a destination address, a service set identifier (SSID), a basic service set identifier (BSSID), or the like when the user habit type is communication connection, location information such as a name and an address of a location where an event previously saved in a schedule book takes place when the user habit type is event execution, a distance when the user habit type is the distance between the face and the terminal device, and a name, an identifier (ID), or the like indicating a connected device when the user habit type is device connection.

For example, the latest status in each user habit is the total count of past connections to a communication destination or the like indicated in acquired information when the user habit type is communication connection. An initial value of the total count of connections to a communication destination or the like is 0, and the count is added with a connection to the communication destination or the like. Further, when the user habit type is event execution, the distance between a location stored in acquired information and the current location of the user is stored. When the user habit type is the distance between a face and a terminal 4, the mean distance between the face and the terminal 4 calculated at the time of the user being authenticated to be the user himself or herself in the past is stored. The mean distance between the face and the terminal 4 is updated every time the user is authenticated to be the user himself or herself. An initial value of the mean distance between the face and the terminal 4 is set to a distance determined at the time of preregistration of the biometric information illustrated in FIG. 38A before authentication of the user himself or herself is performed by the terminal 4.

Further, when the user habit type is device connection, whether a device indicated by a name, an ID, or the like stored in acquired information is connected is stored. For example, device connection refers to connection between a device pair-set by Bluetooth (registered trademark) and the terminal 4. An acceptance condition of each user habit is a condition predetermining a condition by which reliability of each user habit can be guaranteed.

Next, FIG. 38C illustrates a table in the inclination information table 481. The inclination information table 481 stores an angle indicating the inclination of the terminal 4 and being acquired from the inclination detector 43 illustrated in FIG. 37, an acquisition date and time at which the angle is acquired, and a standby time being an interval for detecting the inclination. Every time the standby time elapses, an angle indicating the inclination of the terminal 4 is acquired from the inclination detector 43 by the authentication information acquirer 485 illustrated in FIG. 37 and is updated. Further, when the angle is updated, the acquisition date and time at which the angle is acquired is also updated.

When completing execution of initialization processing after power is turned on or when returning from a sleep state, the terminal 4 according to the present embodiment enters a lock state in which operation of each function is not permitted until authentication is successful. When entering the lock state or when authentication is requested during operation of each function, the terminal controller 48 in the terminal 4 illustrated in FIG. 36 executes the authentication processing program 470A stored in the terminal storage 47A and determines whether a user is the user himself or herself. User authentication processing by the authentication processing program 470A is performed in the background at predetermined authentication intervals.

Therefore, when the user authentication processing by the authentication processing program 470A is used as the authentication processing in Embodiments 1 to 4, a first user and a second user may be authenticated from time to time in the background while a first terminal 4A and a second terminal 4B are started, and the authentication result may be used in each step in the flowcharts illustrated in FIG. 15, FIG. 20, FIG. 22, and FIG. 26. The processing in the authentication processing program 470A executed by the terminal controller 48 will be described below referring to flowcharts of the authentication processing illustrated in FIG. 39A and FIG. 39B. The authentication processing is an example of user authentication means in the claims.

Figure 39A:
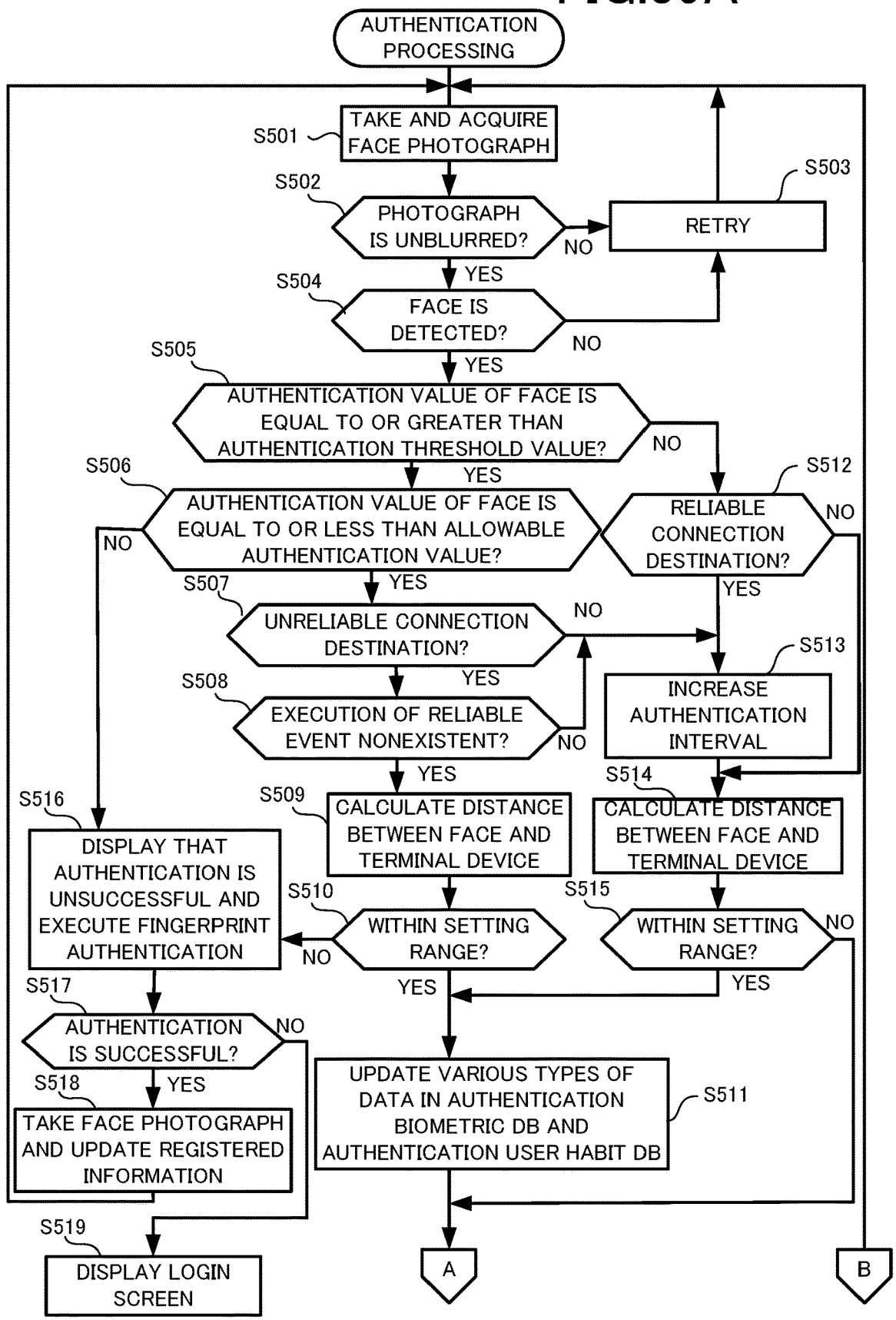
FIG. 39A is a flowchart of authentication processing in Embodiment 5.

First, FIG. 39A is referred to. It is assumed in the present embodiment that a face image of a user is used as biometric information. The authentication information acquirer 485 illustrated in FIG. 37 causes the image capture device 41 to take a face photograph of a user operating the terminal 4. Specifically, the authentication information acquirer 485 causes a front-facing camera 41A to take a face photograph of a user facing the front of the terminal 4. The authentication information acquirer 485 acquires the face photograph of the user from the image capture device 41 (Step S501). The authentication information acquirer 485 determines whether the acquired face photograph of the user is unblurred (Step S502). When the face photograph of the user is not unblurred (Step S502: NO), the authentication information acquirer 485 causes the image capture device 41 to retry taking a face photograph of the user (Step S503).

Further, when the face photograph of the user is unblurred (Step S502: YES), the authentication information acquirer 485 determines whether the face of the user can be detected from the face photograph of the user caused to be taken by the image capture device 41 (Step S504).

When the face of the user cannot be detected from the face photograph of the user (Step S504: NO), the authentication information acquirer 485 causes the image capture device 41 to retry taking a face photograph of the user (Step S503). When the face of the user cannot be detected from the face photograph of the user, an action such as locking the operation in order to prevent the currently operating user from further performing operation, or displaying a message indicating use of another authentication method may be taken. Further, when the face of the user is detected from the face photograph of the user (Step S504: YES), the authentication information acquirer 485 determines a feature value of the detected face image of the user. The authentication information acquirer 485 transmits the determined feature value of the face image of the user to the authentication determiner 486.

The authentication determiner 486 acquires the authentication biometric information database 471A stored in the terminal storage 47A illustrated in FIG. 36. The authentication determiner 486 acquires a feature value of a face image, and an allowable authentication value and an authentication threshold value of an authentication value that are stored in registered information mapped to "face" out of biometric information types from the table in the authentication biometric information database 471A illustrated in FIG. 38A. The authentication determiner 486 compares the feature value of the face image in the registered information, the feature value being acquired from the authentication biometric information database 471A, with the feature value of the face image received from the authentication information acquirer 485 and determines an authentication value of the face, based on the comparison result. The authentication determiner 486 determines whether the determined authentication value of the face is equal to or greater than an authentication threshold value acquired from the authentication biometric information database 471A (Step S505).

When the determined authentication value of the face is equal to or greater than the authentication threshold value (Step S505: YES), the authentication determiner 486 determines whether the determined authentication value of the face is equal to or less than an allowable authentication value acquired from the authentication biometric information database 471A (Step S506). When the determined authentication value of the face is equal to or less than the allowable authentication value (Step S506: YES), whether the user using the terminal 4 is the user himself or herself is gray and therefore the authentication determiner 486 executes the secondary authentication being authentication by a user habit. First, the authentication determiner 486 causes the authentication information acquirer 485 to acquire a currently connected communication destination from the communicator 40. The authentication determiner 486 receives the acquired current communication destination of the communicator 40 from the authentication information acquirer 485.

Next, the authentication determiner 486 acquires the authentication user habit database 472A from the terminal storage 47A illustrated in FIG. 36. The authentication determiner 486 acquires acquired information, a connection count, and an acceptance condition that are mapped to "communication connection" out of user habit types stored in the table in the authentication user habit database 472A illustrated in FIG. 38B. For example, SSIDs ABC_WLAN and 123WLAN are stored in the acquired information for "communication connection" as illustrated in FIG. 38B. For this ABC_WLAN, 31 as a connection count and a connection count equal to or greater than 100 as an acceptance condition are stored. Further, for 123WLAN, 157 as a connection count and a connection count equal to or greater than 100 as an acceptance condition are stored. A case of satisfying an acceptance condition is hereinafter referred to as a reliable case, and a case of not satisfying the acceptance condition is referred to as an unreliable case.

The authentication determiner 486 determines whether the current communication destination of the communicator 40 is an unreliable connection destination by comparing the current communication destination received from the authentication information acquirer 485 with the acquired information acquired from the authentication user habit database 472A (Step S507). For example, it is assumed here that the SSID ABC_WLAN is acquired as the current communication destination of the communicator 40. ABC_WLAN in the acquired information for the user habit type "communication connection" stored in the authentication user habit database 472A has 31 as a connection count and a connection count equal to or greater than 100 as an acceptance condition. Accordingly, the current communication destination is an unreliable communication destination (Step S507: YES), and therefore whether a reliable event is executed is determined (Step S508).

The authentication determiner 486 causes the authentication information acquirer 485 to acquire a content of an event executed immediately before from the operation input device 44. From a calendar included in the terminal 4, the authentication determiner 486 acquires whether a scheduled event exists at the current date and time and information about the location where the scheduled event takes place. When a scheduled event does not exist on the day, the authentication determiner 486 determines nonexistence of execution of a reliable event (Step S508: YES) and calculates the distance between the face and the terminal 4 (Step S509). Further, when a scheduled event exists on the day, the authentication determiner 486 causes the authentication information acquirer 485 to acquire the current position information from a position detector 46. Next, the authentication determiner 486 acquires the authentication user habit database 472A from the terminal storage 47A illustrated in FIG. 36.

The authentication determiner 486 acquires acquired information and an acceptance condition mapped to "event execution" out of the user habit types stored in the table in the authentication user habit database 472A illustrated in FIG. 38B. For example, it is assumed that "○× Park" and "△● Movie Theater" are stored as locations where events take place in acquired information for "event execution" and that "a distance within 100 m" is stored as an acceptance condition for both locations, as illustrated in FIG. 38B.

For example, it is assumed here that "○× Park" is stored as a location of an event taking place at the current date and time on the calendar included in the terminal 4. The authentication determiner 486 compares the current position information caused to be acquired from the position detector 46 by the authentication information acquirer 485 with position information of "○× Park" being the location of the event taking place at the current date and time. For example, it is assumed that the distance between the current position information and the position information of "○× Park" being the location of the event is 113 m. In this case, execution of a reliable event is determined to be nonexistent (Step S508:

YES), and the distance between the face and the terminal 4 is calculated (Step S509). The distance between the face of the user and the terminal 4 is calculated based on the proportion of the face of the user in a face photograph of the user facing the front of the terminal 4 taken by the front-facing camera 41A illustrated in FIG. 4A.

Next, the authentication determiner 486 acquires the authentication user habit database 472A from the terminal storage 47A illustrated in FIG. 36. The authentication determiner 486 acquires a mean distance and an acceptance condition mapped to "the distance between the face and the terminal device" out of the user habit types stored in the table in the authentication user habit database 472A illustrated in FIG. 38B. For example, 262 mm is stored as a mean distance and plus or minus 20 mm of the mean distance as an acceptance condition for "the distance between the face and the terminal device," as illustrated in FIG. 38B.

The authentication determiner 486 determines whether the distance between the face of the user and the terminal 4 calculated in Step S509 is within a setting range set in the acceptance condition acquired from the authentication user habit database 472A (Step S510). Specifically, the mean distance acquired from the authentication user habit database 472A is 262 mm, and the acceptance condition is plus or minus 20 mm of the mean distance, and therefore whether the distance falls within a range from 242 mm to 282 mm is determined.

When the distance between the face of the user and the terminal 4 calculated in Step S509 falls within the range from 242 mm to 282 mm (Step S510: YES), the authentication determiner 486 authenticates the user using the terminal 4 to be the user himself or herself. The authentication determiner 486 causes the authentication information updater 488 to update various types of data stored in the authentication biometric information database 471A and the authentication user habit database 472A that are illustrated in FIG. 36 (Step S511).

Specifically, the authentication information updater 488 updates registered information mapped to the biometric information type "face" in the table in the authentication biometric information database 471A illustrated in FIG. 38A by adding a feature value of the face image received from the authentication information acquirer 485 by the authentication determiner 486 to a feature value of the face image stored in the registered information. Next, the authentication information updater 488 updates a count stored as the latest status mapped to the user habit type "communication connection" in the table in the authentication user habit database 472A illustrated in FIG. 38B by adding 1. Further, the authentication information updater 488 updates the latest status mapped to the user habit type "the distance between the face and the terminal device" stored in the table in the authentication user habit database 472A illustrated in FIG. 38B with a mean distance determined from the stored mean distance and "the distance between the face and the terminal device" calculated in Step S509.

Thus, precision of user biometric information and user habits improves by updating biometric information stored in the authentication biometric information database 471A and user habits stored in the authentication user habit database 472A. Therefore, precision of user authentication can be improved.

Further, when an authentication value of the face determined by the authentication determiner 486 is not equal to or greater than the authentication threshold value of the authentication value (Step S505: NO), the authentication determiner 486 causes the authentication information acquirer 485 to acquire a communication destination currently connected to the communicator 10. The authentication determiner 486 receives the acquired current communication destination of the communicator 40 from the authentication information acquirer 485. Next, the authentication determiner 486 acquires the authentication user habit database 472A from the terminal storage 47A illustrated in FIG. 36. The authentication determiner 486 acquires acquired information, a count, and an acceptance condition that are mapped to "communication connection" out of the user habit types stored in the table in the authentication user habit database 472A illustrated in FIG. 38B. The authentication determiner 486 determines whether the current communication destination is a reliable connection destination by comparing the current communication destination of the communicator 40 received from the authentication information acquirer 485 with the acquired information acquired from the authentication user habit database 472A (Step S512).

For example, it is assumed here that the SSID 123WLAN is acquired as the current communication destination of the communicator 40. A connection count and an acceptance condition for 123WLAN in the acquired information for the user habit type "communication connection" stored in the authentication user habit database 472A are 156 and a connection count equal to or greater than 100, respectively. Accordingly, the current communication destination is a reliable communication destination (Step S512: YES), and therefore the authentication determiner 486 authenticates the user using the terminal 4 to be the user himself or herself. Subsequently, the authentication determiner 486 makes the authentication interval longer than the current authentication interval (Step S513). The reason is that the user himself or herself is considered to be in a reliable environment such as a home or a workplace when the current communication destination is a reliable communication destination. In this case, by making the authentication interval longer than the current authentication interval, the authentication frequency may be reduced and authentications may be performed a minimally required number of times.

For example, it is assumed here that the SSID ABC_WLAN is acquired as the current communication destination of the communicator 40. A connection count and an acceptance condition of ABC_WLAN in the acquired information for the user habit type "communication connection" stored in the authentication user habit database 472A are 31 and a connection count equal to or greater than 100, respectively. Accordingly, the current communication destination is not a reliable communication destination (Step S512: NO), and therefore the authentication determiner 486 does not authenticate the user using the terminal 4 to be the user himself or herself and does not make the authentication interval longer than the current authentication interval.

For example, it is assumed in Step S507 that the SSID 123WLAN is acquired as the current communication destination of the communicator 40. A connection count and an acceptance condition of 123WLAN in the acquired information for the user habit type "communication connection" stored in the authentication user habit database 472A are 156 and a connection count equal to or greater than 100, respectively. Accordingly, the current communication destination is not an unreliable communication destination (Step S507: NO), and therefore the authentication determiner 486 authenticates the user using the terminal 4 to be the user himself or herself.

Further, for example, it is assumed in Step S508 that "Δ● Movie Theater" is stored as a location of an event taking place at the current date and time on the calendar included in the terminal 4. The authentication determiner 486 compares the current position information caused to be acquired from the position detector 46 by the authentication information acquirer 485 with position information of "Δ● Movie Theater" being the location of the event taking place at the current date and time. For example, the distance between the current position information and the position information of "Δ● Movie Theater" being the location of the event is assumed to be 72 m. In this case, execution of a reliable event is not nonexistent (Step S508: NO), and the authentication determiner 486 authenticates the user using the terminal 4 to be the user himself or herself. Subsequently, the authentication determiner 486 makes the authentication interval longer than the current authentication interval (Step S513).

The authentication determiner 486 calculates the distance between the face of the user and the terminal 4 (Step S514). Next, the authentication determiner 486 acquires the authentication user habit database 472A from the terminal storage 47A illustrated in FIG. 36. The authentication determiner 486 determines whether the distance between the face of the user and the terminal 4 calculated in Step S514 falls within a setting range set in an acceptance condition acquired from the authentication user habit database 472A (Step S515). When the distance between the face of the user and the terminal 4 calculated in Step S514 falls within the setting range (Step S515: YES), the authentication determiner 486 authenticates the user using the terminal 4 to be the user himself or herself. The authentication determiner 486 causes the authentication information updater 488 to update various types of data stored in the authentication biometric information database 471A and the authentication user habit database 472A that are illustrated in FIG. 36 (Step S511).

Specifically, the authentication information updater 488 updates registered information mapped to the biometric information type "face" in the table in the authentication biometric information database 471A illustrated in FIG. 38A by adding a feature value of the face image received from the authentication information acquirer 485 by the authentication determiner 486 in Step S505 to a feature value of the face image stored in the registered information.

Next, the authentication information updater 488 updates a count stored in the latest status mapped to the user habit type "communication connection" in the table in the authentication user habit database 472A illustrated in FIG. 38B by adding 1. Next, the authentication information updater 488 updates the latest status mapped to the user habit type "event execution" in the table in the authentication user habit database 472A by writing the distance between the location of the event determined in Step S508: NO and the terminal 4 into the latest status. Further, the authentication information updater 488 updates the latest status mapped to the user habit type "the distance between the face and the terminal device" stored in the table in the authentication user habit database 472A illustrated in FIG. 38B with a mean distance determined from the mean distance stored in the latest status and "the distance between the face and the terminal device" calculated in Step S514.

When the distance between the face of the user and the terminal 4 calculated in Step S514 does not fall within the setting range (Step S515: NO), the authentication determiner 486 does not cause the authentication information updater 488 to update various types of data stored in the authentication biometric information database 471A and the authentication user habit database 472A that are illustrated in FIG. 36.

Further, when an authentication value of the face determined by the authentication determiner 486 is not equal to or less than the allowable authentication value of the authentication value (Step S506: NO) or the distance between the face and the terminal device does not fall within the setting range in Step S510 (Step S510: NO), the authentication determiner 486 determines the user using the terminal 4 to be not the user himself or herself. The authentication determiner 486 causes the authentication result display 487 illustrated in FIG. 37 to display that the authentication is unsuccessful on the display 49. Next, the authentication determiner 486 calls existing biometric authentication means included in the terminal 4. It is assumed here that fingerprint authentication is called as the existing biometric authentication means. The authentication determiner 486 executes fingerprint authentication (Step S516).

When the fingerprint authentication is successfully performed (Step S517: YES), the authentication information acquirer 485 causes the image capture device 41 to take a face photograph of the user operating the terminal 4 in accordance with an instruction from the authentication determiner 486. The authentication information acquirer 485 acquires an image of the face photograph of the user from the image capture device 41 and determines a feature value of the image of the face of the user. The authentication information acquirer 485 transmits the determined feature value of the image of the face of the user to the authentication determiner 486. The authentication determiner 486 transmits the received feature value of the image of the face of the user to the authentication information updater 488 illustrated in FIG. 37. The authentication information updater 488 updates a feature value of the face image stored in registered information mapped to the biometric information type "face" in the table in the authentication biometric information database 471A illustrated in FIG. 38A by adding the received feature value of the image of the face of the user to the stored feature value (Step S518). The authentication determiner 486 returns to Step S501 and executes the steps in and after Step S501.

Further, when the fingerprint authentication is not successfully performed (Step S517: NO), the authentication determiner 486 causes the authentication result display 487 illustrated in FIG. 37 to display that the authentication is not successful on the display 49. Next, the authentication determiner 486 causes the authentication result display 487 illustrated in FIG. 37 to display a login screen on the display 49 (Step S519).

Figure 39B:
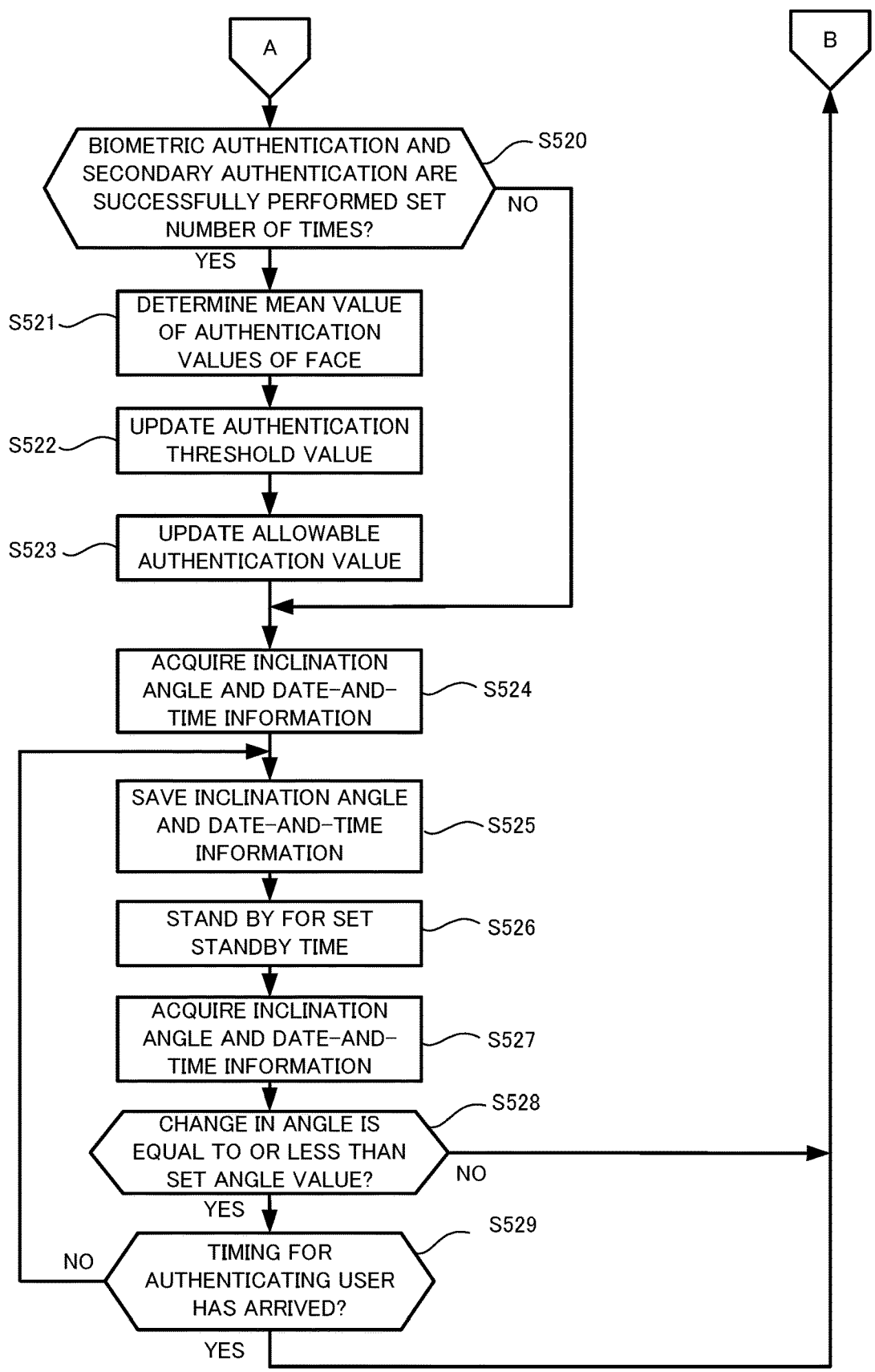
FIG. 39B is a flowchart continued from the flowchart of the authentication processing illustrated in FIG. 39A.

The processing advances to FIG. 39B. The authentication determiner 486 determines whether biometric authentication and secondary authentication are successfully performed a preset number of times (Step S520). For example, the preset number of times is any number of times such as 10 consecutive times or a total of 20 times from a start of the terminal 4. When biometric authentication and secondary authentication are successfully performed the preset number of times (Step S520: YES), the authentication determiner 486 determines the mean value of authentication values of the face determined by the set number of authentications (Step S521). Specifically, the authentication determiner 486 acquires the authentication biometric information database 471A illustrated in FIG. 36 from the terminal storage 47A. The authentication determiner 486 acquires the mean value of authentication values mapped to "face" out of the biometric information types from the table in the authentication biometric information database 471A illustrated in FIG. 38A. The authentication determiner 486 calculates the mean value of authentication values of the face by adding the authentication value of the face determined in Step S505 and the mean value of authentication values acquired from the authentication biometric information database 471A and then dividing the sum by 2. Further, when biometric authentication and secondary authentication are not successfully performed the preset number of times (Step S520: NO), the authentication determiner 486 skips the processing in Step S521 to Step S523 and advances to Step S524.

The authentication determiner 486 transmits the mean value of authentication values of the face determined in Step S521 to the authentication information updater 488. The authentication information updater 488 compares the received mean value of authentication values of the face with a preset upper limit of the authentication threshold value. When the mean value of authentication values of the face is equal to or greater than the preset upper limit of the authentication threshold value, the authentication information updater 488 updates the authentication threshold value mapped to "face" out of the biometric information types in the table in the authentication biometric information database 471A illustrated in FIG. 38A by writing the upper limit of the authentication threshold value into the authentication threshold value. Further, when the mean value of authentication values of the face is equal to or less than the preset upper limit of the authentication threshold value, the authentication information updater 488 updates the authentication threshold value mapped to "face" out of the biometric information types in the table in the authentication biometric information database 471A illustrated in FIG. 38A by writing the mean value of authentication values of the face determined in Step S521 into the authentication threshold value (Step S522).

Next, the authentication information updater 488 updates the allowable authentication value (Step S523). Specifically, when the mean value of authentication values of the face determined in Step S521 is equal to or greater than a preset upper limit of the authentication threshold value, the authentication information updater 488 sets a preset maximum allowable authentication value to the allowable authentication value. Further, when the mean value of authentication values of the face determined in Step S521 is equal to or less than the preset upper limit of the authentication threshold value and a value acquired by adding the mean value of authentication values of the face determined in Step S521 and a default allowable authentication range value is equal to or less than the maximum allowable authentication value, the added value is set to the allowable authentication value. When the value acquired by adding the mean value of authentication values of the face determined in Step S521 and the default allowable authentication range value is equal to or greater than the maximum allowable authentication value, the maximum allowable authentication value is set to the allowable authentication value. The authentication information updater 488 acquires the authentication biometric information database 471A illustrated in FIG. 36 from the terminal storage 47A. The authentication information updater 488 updates the allowable authentication value mapped to "face" out of the biometric information types in the table in the authentication biometric information database 471A illustrated in FIG. 38A by writing the determined allowable authentication value into the allowable authentication value mapped to "face."

The authentication information acquirer 485 illustrated in FIG. 37 acquires an angle of inclination of the terminal 4 from the inclination detector 43. Next, the authentication information acquirer 485 acquires current date-and-time information from an unillustrated timer (Step S524). The authentication information acquirer 485 transmits the acquired angle of inclination of the terminal 4 and the acquired current date-and-time information to the authentication determiner 486. The authentication determiner 486 transmits the received angle of inclination of the terminal 4 and the received current date-and-time information to the authentication information updater 488. The authentication information updater 488 writes and saves the received angle of inclination of the terminal 4 and the received current date-and-time information into the inclination information table 481 stored in the terminal storage 47A illustrated in FIG. 36 (Step S525).

The authentication determiner 486 acquires a standby time stored in the table in the inclination information table 481 illustrated in FIG. 38C. The authentication determiner 486 transmits the acquired standby time to the authentication information acquirer 485. The authentication information acquirer 485 stands by to acquire data from the communicator 40, the image capture device 41, and the like during the received standby time (Step S526). When the standby time ends, the authentication information acquirer 485 acquires an angle of inclination of the terminal 4 from the inclination detector 43. Next, the authentication information acquirer 485 acquires current date-and-time information from the unillustrated timer (Step S527). The authentication information acquirer 485 transmits the acquired angle of inclination of the terminal 4 and the acquired current date-and-time information to the authentication determiner 486.

The authentication determiner 486 acquires the angle of the terminal 4 stored in the table in the inclination information table 481 illustrated in FIG. 38C. The authentication determiner 486 determines whether a change in the angle exists by comparing the angle of inclination of the terminal 4 received from the authentication information acquirer 485 with the angle of the terminal 4 acquired from the inclination information table 481 (Step S528). When the change in the angle of the terminal 4 is not equal to or less than a preset angle value such as 30 degrees (Step S528: NO), the authentication determiner 486 determines that the terminal 4 is moved by the user and some operation is performed and returns to Step S501 described in FIG. 39A. Subsequently, the authentication determiner 486 executes the processing in and after Step 501.

Further, when the change in the angle of the terminal 4 is equal to or less than the preset angle value (Step S528: YES), the authentication determiner 486 determines that the terminal 4 is not moved by the user. Next, the authentication determiner 486 determines whether a timing for authenticating the user has arrived (Step S529). The timing for authenticating the user is a timing at which a preset authentication interval of time elapses. When the timing for authenticating the user has arrived (Step S529: YES), the authentication determiner 486 returns to Step S501 described in FIG. 39A. Subsequently, the authentication determiner 486 executes the processing in and after Step 501. When the timing for authenticating the user has not arrived (Step S529: NO), the authentication determiner 486 returns to Step S525. The authentication determiner 486 executes the processing in Step S525 to Step S529.

When an authentication value determined from biometric information and the authentication threshold value take the same value in the aforementioned embodiment, whether the authentication is successful may be determined either in a case that the authentication value determined from the biometric information is equal to or less than the authentication threshold value or in a case that the authentication value determined from the biometric information is equal to or greater than the authentication threshold value. Further, when an authentication value determined from biometric information and the allowable authentication value take the same value, whether the authentication is successful may be determined either in a case that the authentication value determined from the biometric information is equal to or less than the allowable authentication value or in a case that the authentication value determined from the biometric information is equal to or greater than the allowable authentication value.

As described above, the authentication processing executed in the terminal 4 in the information processing system 100 according to aforementioned Embodiment 5 performs authentication by using user habit data in a gray situation in which an authentication result based on biometric information of a user using the terminal 4 cannot clearly determine whether the user is the user himself or herself. Thus, even in the gray situation in which whether a user using the terminal 4 is the user himself or herself cannot be clearly determined by authentication based on biometric information, the user himself or herself can be authenticated by using user habit data. Further, the user authentication processing performed in the terminal 4 can improve the precision of authentication by being executed in the background and updating user biometric information and user habits while the terminal 4 is in operation. Thus, security can be guaranteed while an operation load of a user is lightened.

Modified Example 1

Biometric information and user habit data registered in the terminal 4 for determining a score value may be updated every time a user is authenticated, in order to enhance precision in aforementioned Embodiments 1 to 4. Further, a value set to the score value item in the score value table 473 illustrated in FIG. 5D may be appropriately set by a user.

Modified Example 2

It is assumed in aforementioned Embodiments 1 to 5 that each of the first terminal 4A and the second terminal 4B is configured by using a smartphone. However, without being limited to a smartphone, each of the first terminal 4A and the second terminal 4B may be configured by using any type of equipment such as a personal computer (PC), a tablet, or a personal digital assistant (PDA).

Modified Example 3

In the authentication server 1, personal authentication is performed based on biometric information of a second user in aforementioned Embodiments 1 to 4. However, without being limited to biometric information, personal authentication may be performed by using a user habit that can be acquired by the second terminal 4B.

Modified Example 4

It is assumed in Embodiments 1 to 4 that a user deposit file is saved in the first cloud 3A and the second cloud 3B in a distributed manner by the first terminal 4A used by a first user and is acquired and restored from the first cloud 3A and the second cloud 3B by the second terminal 4B used by a second user. However, the operations of the first terminal 4A used by the first user and the second terminal 4B used by the second user may be reversed.

Modified Example 5

It is assumed in Embodiments 1 to 4 that a second user can acquire and restore a user deposit file saved in the first cloud 3A and the second cloud 3B in a distributed manner after a starting date and time of use set by a first user passes. Without being limited to the above, a usable period of the user deposit file set by the first user may be set to a time at and after the death of the first user himself or herself, a time when the first user becomes immobile due to injury or disease, or the like.

Modified Example 6

It is assumed in aforementioned Embodiments 1 to 4 that the authentication processing of authenticating each of a first user and a second user to be the user himself or herself executed by the first terminal 4A and the second terminal 4B is performed in predetermined steps in the flowcharts illustrated in FIG. 15, FIG. 20, FIG. 22, and FIG. 26. However, without being limited to the above, the first user and the second user may be authenticated in the background from time to time while the first terminal 4A and the second terminal 4B are started, and the authentication result may be used in each step in the flowcharts illustrated in FIG. 15, FIG. 20, FIG. 22, and FIG. 26.

Modified Example 7

It is assumed in aforementioned Embodiments 1 to 3 that a user deposit file generated by a first user is distributed across the clouds 3 in the file check-in processing in Step S38 in the flowchart illustrated in FIG. 15. Without being limited to the above, a timing at which the user deposit file generated by the first user is distributed across the clouds 3 may be any timing.

Modified Example 8

It is assumed in aforementioned Embodiments 1 to 5 that the user authentication processing is provided by executing the authentication processing program 470 illustrated in FIG. 4B or the authentication processing program 470A illustrated in FIG. 36. The steps performed in the authentication processing program 470 or 470A may be provided in whole or in part by a semiconductor chip such as an application specific integrated circuit (ASIC) or a system large-scale integration (LSI), a circuit configured with various circuit elements, or the like.

Modified Example 9

Figure 17:
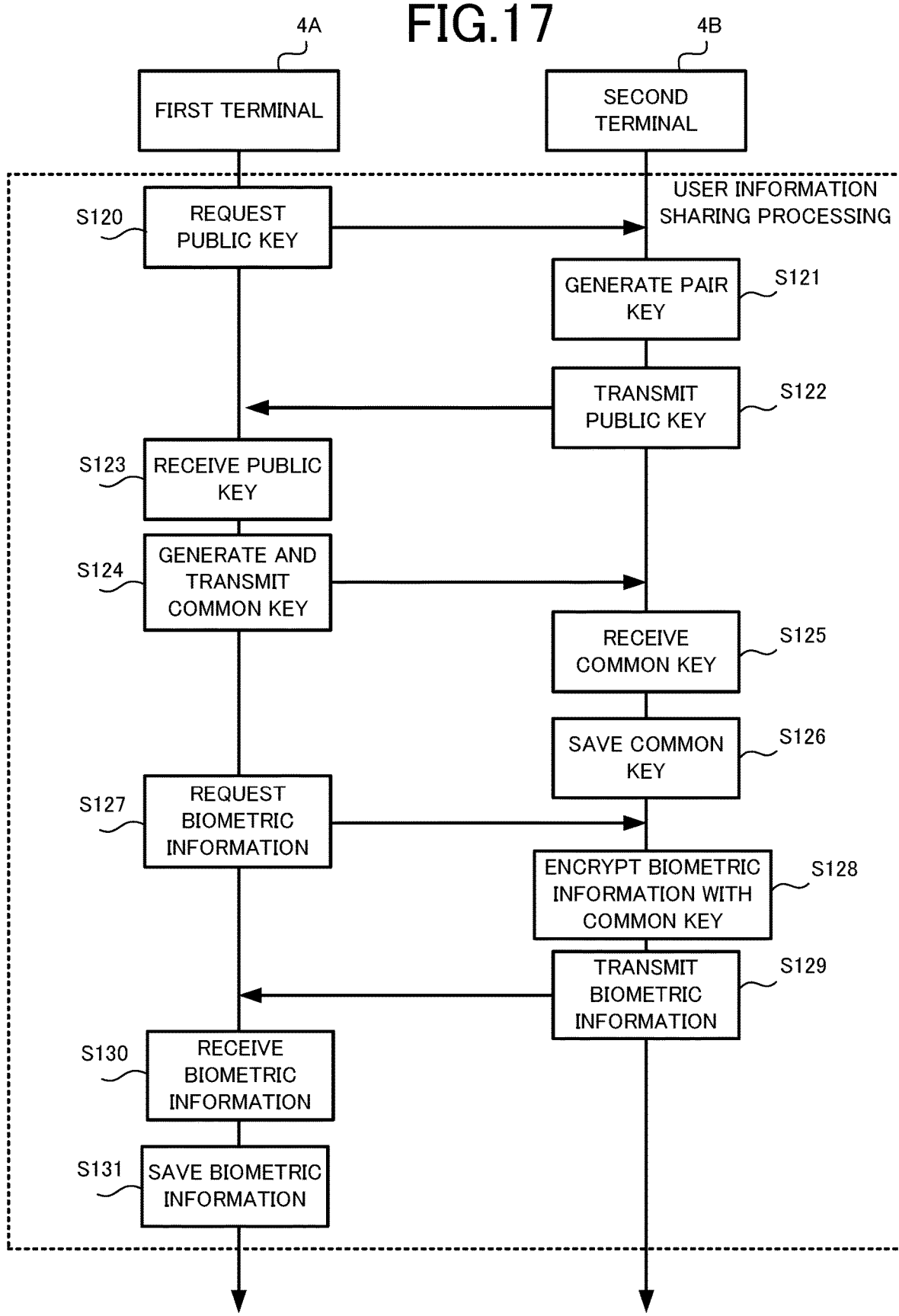
FIG. 17 is a flowchart of user information sharing processing in the file deposit processing illustrated in FIG. 15.

It is assumed in aforementioned Embodiment 1 that the terminal controller 48 in the first terminal 4A requests biometric information of a second user from the second terminal 4B in Step S127 described in FIG. 17 and uses the requested biometric information of the second user in subsequent processing. Without being limited to the above, the terminal controller 48 in the first terminal 4A may request, from the second terminal 4B, a name of the second user and information required for registration in the authentication server 1 that are transmitted to the authentication server 1 in Step S106 described in FIG. 16 in addition to the biometric information of the second user and use the requested biometric information, the requested name of the second user, and the like in subsequent processing.

Modified Example 10

It is assumed in Embodiment 4 that the terminal controller 48 in the first terminal 4A requests biometric information of a second user from the second terminal 4B in Step S388 described in FIG. 31 and uses the requested biometric information of the second user in subsequent processing. Without being limited to the above, the terminal controller 48 in the first terminal 4A may request, from the second terminal 4B, an ID of the second user determined to be the ID of the second user in Step S364 described in FIG. 30 (Step S364: YES) in addition to the biometric information of the second user and use the requested biometric information and the requested ID of the second user in subsequent processing.

Modified Example 11

Figure 32:
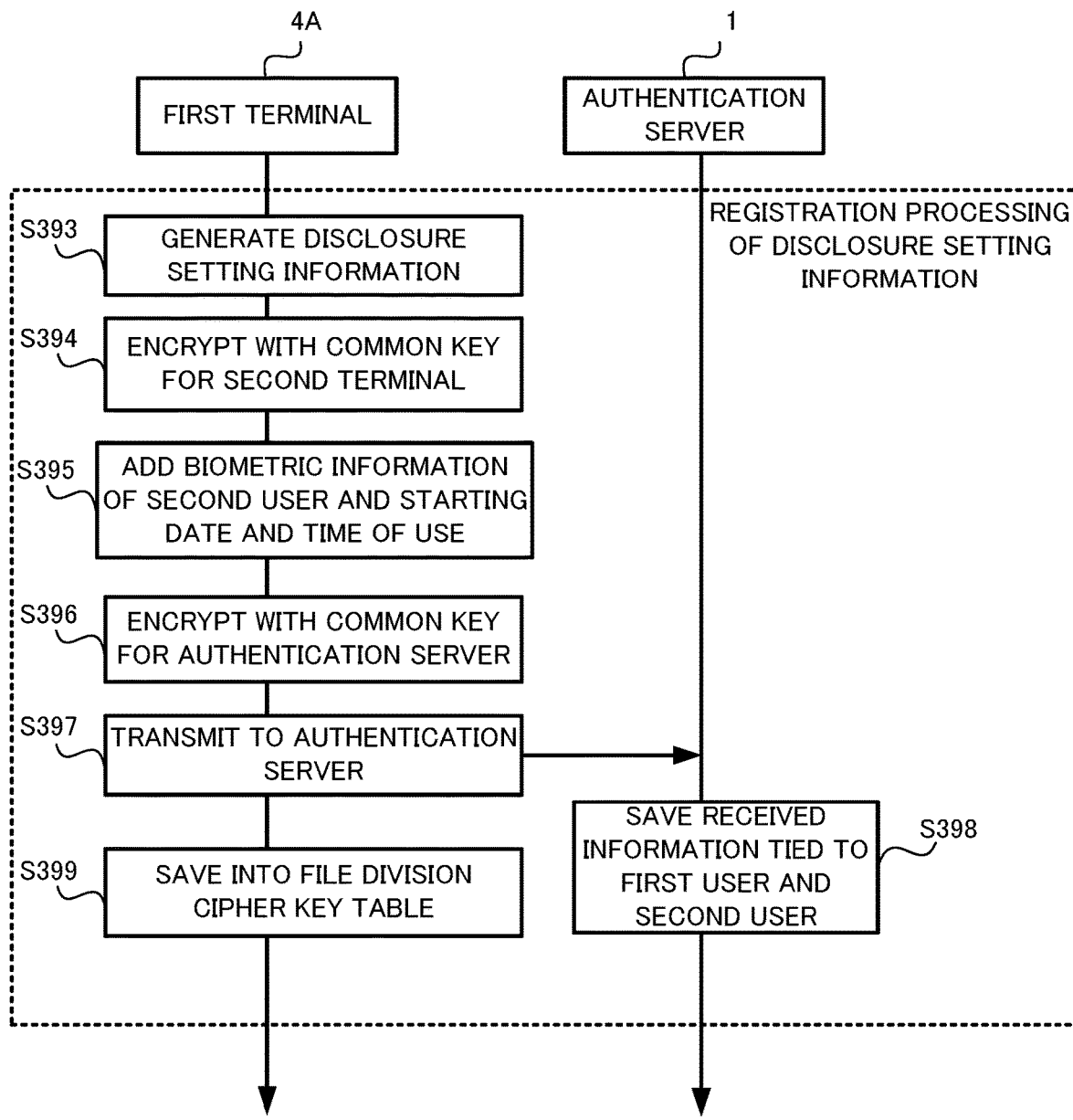
FIG. 32 is a flowchart of registration processing of disclosure setting information in the file deposit processing illustrated in FIG. 26.
Figure 33:
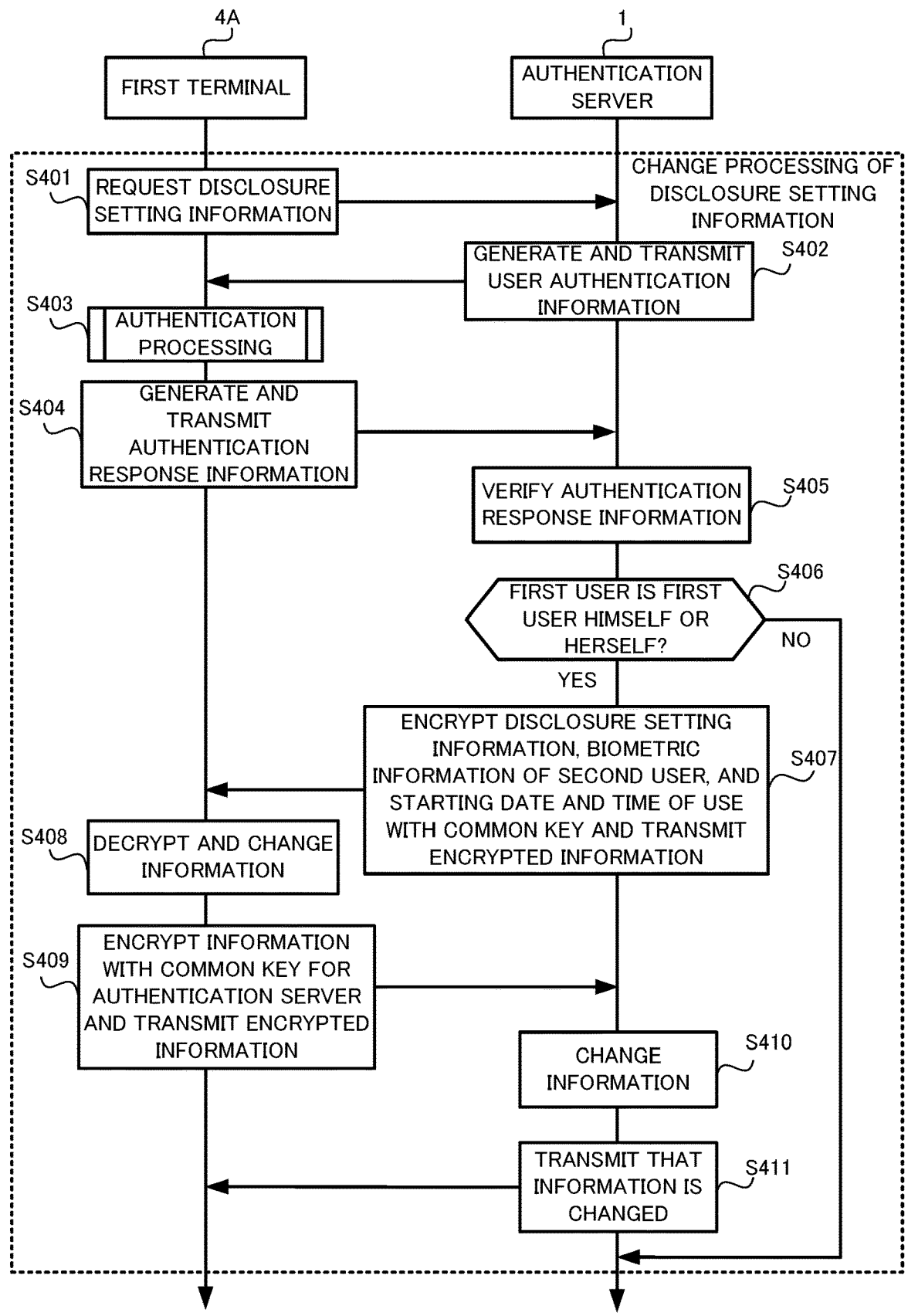
FIG. 33 is a flowchart of change processing of disclosure setting information in the file deposit processing illustrated in FIG. 26.
Figure 34:
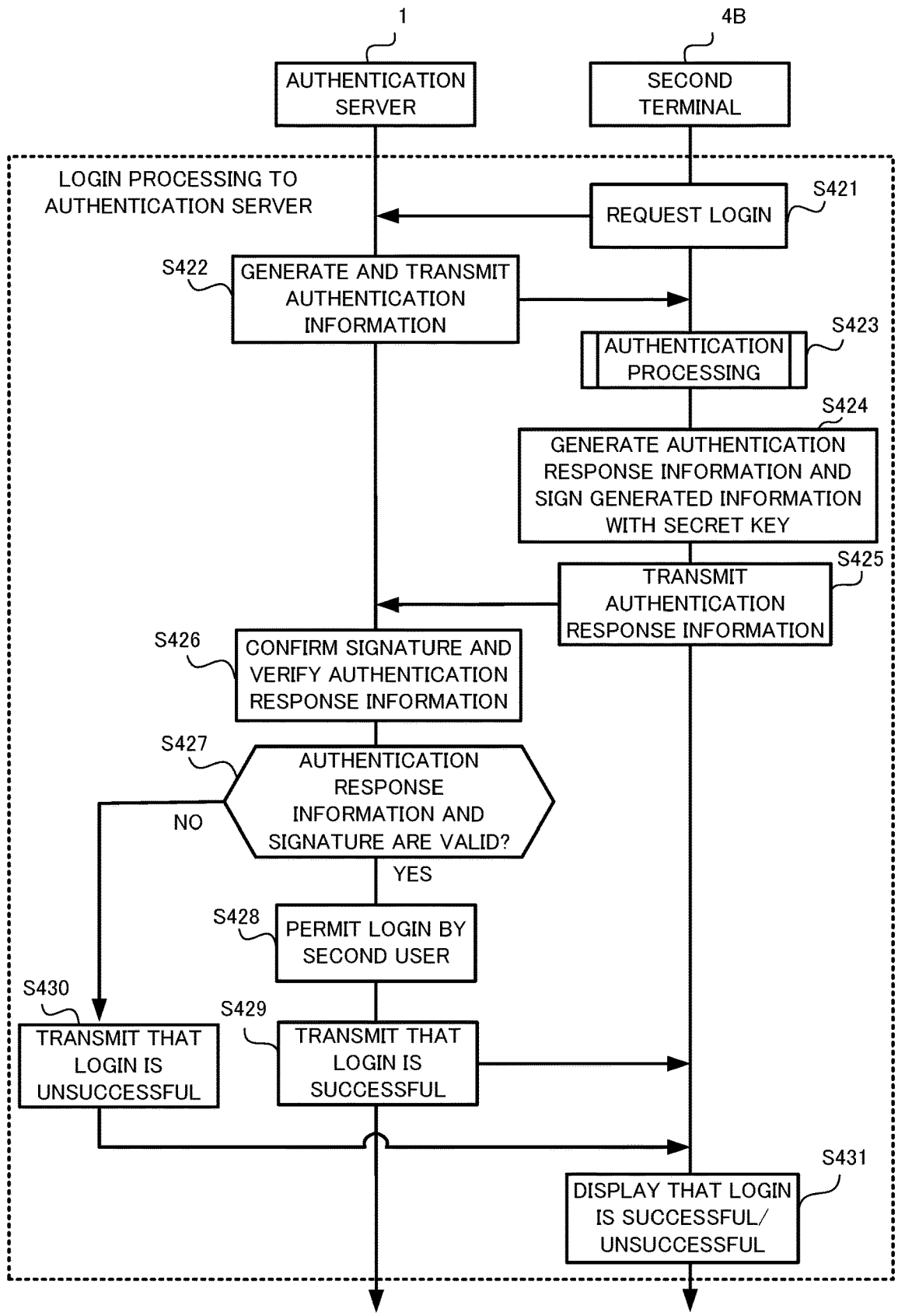
FIG. 34 is a flowchart of login processing to the authentication server in the file deposit processing illustrated in FIG. 26.
Figure 35:
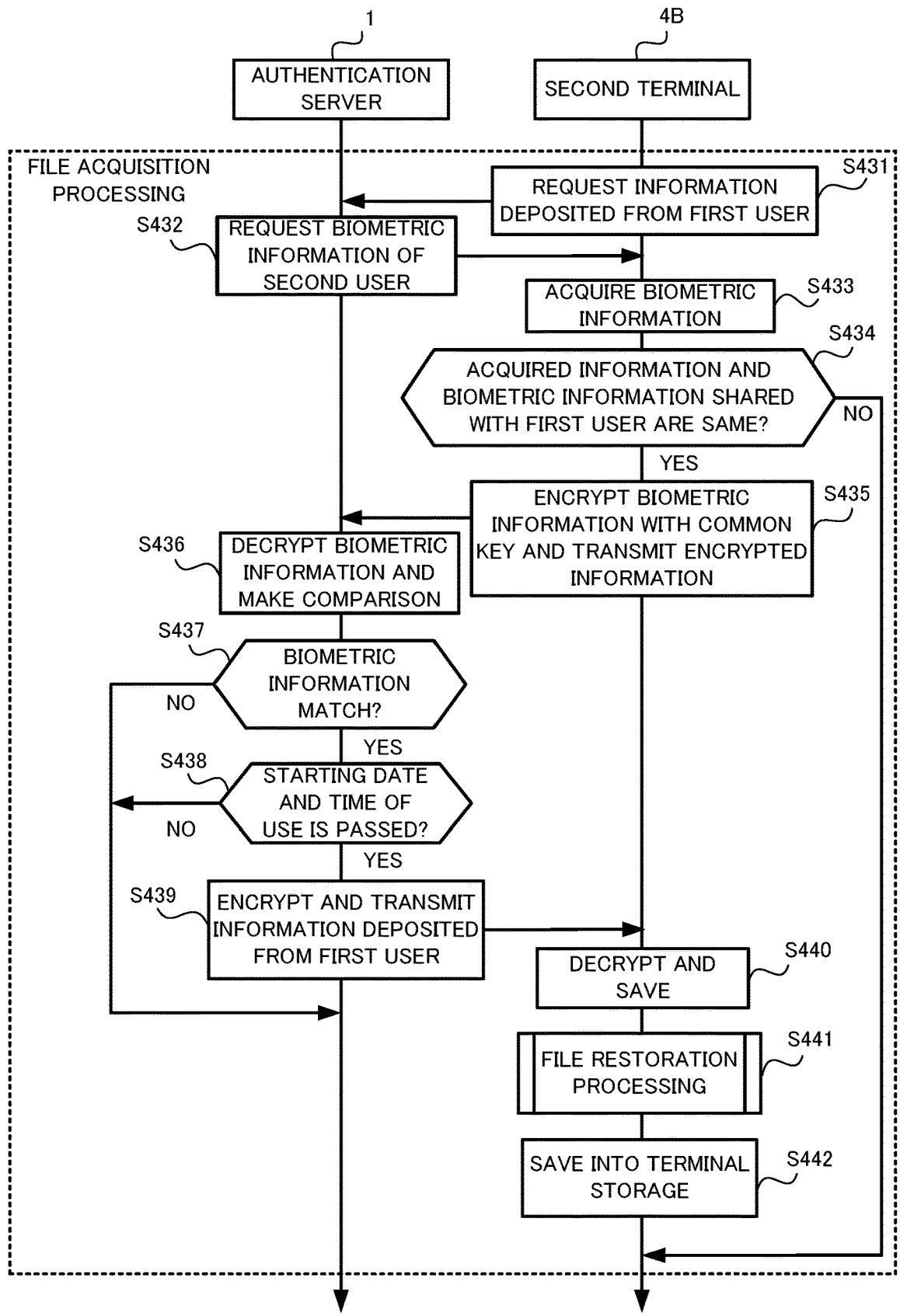
FIG. 35 is a flowchart of file acquisition processing in the file deposit processing illustrated in FIG. 26.

It is assumed in Embodiment 4 that the terminal controller 48 in the first terminal 4A adds biometric information of a second user and a starting date and time of use of a user deposit file to encrypted disclosure setting information data in Step S395 described in FIG. 32. Without being limited to the above, the terminal controller 48 in the first terminal 4A may acquire an ID of the second user determined to be the ID of the second user in Step S364 described in FIG. 30 (Step S364: YES) from the second terminal 4B and add the ID to the encrypted disclosure setting information data along with the biometric information of the second user and the starting date and time of use of the user deposit file.

Modified Example 12

Authentication based on an image of the face of a user and fingerprint authentication are used as authentication based on user biometric information in Embodiment 5. Without being limited to the above, authentication based on user biometric information may include any method such as voiceprint authentication and iris authentication. Further, while authentication based on a face image of a user is solely used as a condition for making a determination using secondary authentication in the aforementioned embodiment, the determination may be made based on a plurality of pieces of biometric information.

Modified Example 13

Connection to a reliable connection destination, execution of a reliable event, and the distance between the face of a user and the terminal 4 are used as criteria for secondary authentication based on user habits in aforementioned Embodiment 5. Without being limited to the above, another method may be used or included. For example, whether a device held by the user himself or herself is connected to the terminal 4 by Bluetooth (registered trademark) may be determined, and when the device is connected, the user is authenticated to be the user himself or herself. In order to use equipment connected by Bluetooth (registered trademark), two pieces of equipment need to be "paired." Therefore, connection of equipment by Bluetooth (registered trademark) provides specificity of an individual and can authenticate the user himself or herself by being used as secondary authentication. Furthermore, whether a user is the user himself or herself may be determined from a pattern, regularity, or the like of activity routes of the user acquired by the position detector 46 illustrated in FIG. 37; and the user may be authenticated as the user himself or herself when there is a match in a pattern, regularity, or the like of activity routes.

Modified Example 14

A user is authenticated to be the user himself or herself when one type of secondary authentication is successful in aforementioned Embodiment 5. Without being limited to the above, a user may be authenticated to be the user himself or herself solely when every one of a plurality of types of secondary authentication is successful. Thus, precision of authentication can be further enhanced.

Modified Example 15

When biometric authentication and secondary authentication are successful, the authentication determiner 486 makes the authentication interval longer than the current authentication interval and reduces the authentication frequency in Step S513 in the flowchart illustrated in FIG. 39A in aforementioned Embodiment 5. However, without being limited to the above, when biometric authentication and secondary authentication are successful, the authentication interval may not need to be made longer than the current authentication interval and the authentication frequency does not need to be reduced. Specifically, Step S513 in the flowchart illustrated in FIG. 39A does not need to be performed.

Modified Example 16

When there is no change in inclination of the terminal 4 in a state of user authentication being successful and the user continuously operating the terminal 4, it can be determined that the user himself or herself is continuing operation of the terminal 4 in aforementioned Embodiment 5. In this case, for example, the authentication threshold value and the allowable authentication value of biometric authentication may be loosely set, or the authentication interval may be increased. Thus, use of resources in the terminal 4 can be saved while minimally required authentication of the user himself or herself is performed in the background.

Modified Example 17

Background authentication is performed at predetermined authentication intervals in aforementioned Embodiment 5. Without being limited to the above, background authentication may be randomly performed without determining a timing and an interval of the authentication. For example, authentication may be performed from time to time when a spatial change is detected, the change being, for example, a change in the position of the terminal 4 or a change in inclination of the terminal 4 by one of various sensors equipped on the terminal 4. Further, authentication may be performed when a user performs an operation for performing special processing, an irregular operation, or the like on the terminal 4.

Further, each of the authentication server 1, the first terminal 4A, and the second terminal 4B can be provided by using a common computer system without relying on a dedicated system, in Embodiments 1 to 5 of the present disclosure. For example, a computer that can provide the functions of the authentication server 1, the first terminal 4A, and the second terminal 4B may be configured by storing a program for providing the aforementioned functions into a non-transitory recording medium such as a computer-readable compact disc read only memory (CD-ROM) or a digital versatile disc read only memory (DVD-ROM), distributing the program, and installing the program on the computer. Then, when the functions are provided by sharing between an operating system (OS) and an application, or cooperation between an OS and an application, only the application may be stored in the non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-082505, filed on Apr. 24, 2019, and Japanese Patent Application No. 2019-215159, filed on Nov. 28, 2019, of which the entirety of the disclosures is incorporated by reference herein.

INDUSTRIAL APPLICABILITY

The present disclosure can be suitably used in an information processing system.

REFERENCE SIGNS LIST

1 Authentication server
2 Network
3 Cloud
3A First cloud
3B Second cloud
4 Terminal
4A First terminal
4B Second terminal
11 Server controller
12 Server storage
30 First storage
31 Second storage
40 Communicator
41 Image capture device
41A Front-facing camera
41B Main camera
42 Voice input-output device
42A Speaker
42B Telephone conversation microphone
43 Inclination detector
44 Operation input device
45 Fingerprint detector
45A Left fingerprint sensor
45B Right fingerprint sensor
46 Position detector
47 Terminal storage
48 Terminal controller
49 Display
51 Processor
52 Memory
53 Display controller
54 Display equipment
55 I/O port
56 Storage equipment
57 Communication equipment 58 Data bus
100 Information processing system
110 User authentication processing program
120, 120A Cipher key information database
470, 470A Authentication processing program
471, 471A Authentication biometric information database
472, 472A Authentication user habit database
473 Score value table
474 File management processing program
475 File management table
476, 476A First cipher key database
477 File division cipher key table
478 File deposit processing program
479, 479A Second cipher key database
480 File acquisition processing program
481 Inclination information table
485 Authentication information acquirer
486 Authentication determiner
487 Authentication result display
488 Authentication information updater

The invention claimed is:

1. An information processing system comprising:
a first terminal storing, into a plurality of clouds in a distributed manner, a plurality of divided files generated by dividing a file including data of information generated by a first user into the plurality of divided files;
an authentication server authenticating a user; and
a second terminal comprising one or more processors configured to:
determine that a sum of a score value based on first authentication data acquired from a second user using the second terminal, and a score value based on second authentication data acquired from the second user is equal to or greater than a predetermined total value;
determine that the second user is authenticated to be the second user himself or herself by the authentication server;
acquire the plurality of divided files distributed across the plurality of clouds by the first terminal and acquire a file including data of information generated by the first user by restoring the acquired plurality of divided files;
determine the authentication to be successful when an authentication value based on the acquired first authentication data in a background is less than a predetermined authentication threshold value; and
determine whether the authentication is successful, based on the acquired second authentication data, when an authentication value based on the acquired first authentication data is equal to or greater than the predetermined authentication threshold value and equal to or less than a predetermined allowable authentication value.

2. The information processing system according to claim 1, wherein the first authentication data are data based on biometric information of the second user using the second terminal, and the second authentication data are data based on a specific behavior of the second user when using the second terminal.

3. The information processing system according to claim 1, wherein one or more processors are further configured to: acquire third authentication data; determine that an authentication value based on the first authentication data exceeds the predetermined allowable authentication value; or that authentication based on the second authentication data is determined to be unsuccessful; and determine, based on the third authentication data, whether authentication is successful.

4. The information processing system according to claim 1, wherein the first terminal comprising one or more processors configured to: determine that a sum of a score value based on fourth authentication data acquired from the first user using the first terminal, and a score value based on fifth authentication data acquired from the first user is equal to or greater than the predetermined total value; and in response to determining that the sum of the score value based on the fourth authentication data and the score value based on the fifth authentication data is equal to or greater than the predetermined total value, determine that the first user is authenticated to be the first user himself or herself.

5. The information processing system according to according to claim 4, wherein the fourth authentication data are data based on biometric information of the first user using the first terminal, and the fifth authentication data are data based on a specific behavior of the first user using the first terminal.

6. The information processing system according to claim 1, wherein: the first terminal sets a starting date and time of use of the plurality of divided files by the second user, and in response to determining that the starting date and time of use set by the first terminal is passed, the authentication server causes the second terminal to acquire the plurality of divided files distributed across the plurality of clouds.

7. An information processing method executed by an information processing system, the information processing method comprising:
storing, by a first terminal in a distributed manner, a plurality of divided files generated by dividing a file including data of information generated by a first user into the plurality of divided files;
determining, by a second terminal, that a sum of a score value based on first authentication data acquired from a second user using the second terminal, and a score value based on second authentication data acquired from the second user is equal to or greater than a predetermined total value;
determining, by the second terminal, that the second user is authenticated to be the second user himself or herself; acquiring the plurality of divided files stored in the distributed manner and acquiring a file including data of information generated by the first user by restoring the acquired plurality of divided files;
determine the authentication to be successful when an authentication value based on the acquired first authentication data in a background is Less than a predetermined authentication threshold value; and
determine whether the authentication is successful, based on the acquired second authentication data, when an authentication value based on the acquired first authentication data is equal to or greater than the predetermined authentication threshold value and equal to or less than a predetermined allowable authentication value.

8. A non-transitory computer-readable recording medium storing a program, wherein:
the program causes one or more processors of a first terminal to store, by a first terminal in a distributed manner, a plurality of divided files generated by dividing a file including data of information generated by a first user into the plurality of divided files; and the program causes one or more processors of a second terminal to determine that a sum of a score value based on first authentication data acquired from a second user using the second terminal, and a score value based on second authentication data acquired from the second user is equal to or greater than a predetermined total value;

determine that the second user is authenticated to be the second user himself or herself; acquire the plurality of divided files stored in the distributed manner and acquire a file including data of information generated by the first user by restoring the acquired plurality of divided files;

determine the authentication to be successful when an authentication value based on the acquired first authentication data in a background is less than a predetermined authentication threshold value; and determine whether the authentication is successful, based on the acquired second authentication data, when an authentication value based on the acquired first authentication data is equal to or greater than the predetermined authentication threshold value and equal to or less than a predetermined allowable authentication value.

9. An information processing system comprising: a first terminal storing, into a plurality of clouds in a distributed manner, a plurality of divided files generated by dividing a file including data of information generated by a first user into the plurality of divided files; an authentication server authenticating a user; and a second terminal comprising one or more processors configured to: determine that a sum of a score value based on first authentication data acquired from a second user using the second terminal, and a score value based on second authentication data acquired from the second user is equal to or greater than a predetermined total value; determine that the second user is authenticated to be the second user himself or herself by the authentication server; acquire the plurality of divided files distributed across the plurality of clouds by the first terminal and acquire a file including data of information generated by the first user by restoring the acquired plurality of divided files; determine that a sum of a score value based on fourth authentication data acquired from the first user using the first terminal, and a score value based on fifth authentication data acquired from the first user is equal to or greater than the predetermined total value; and in response to determining that the sum of the score value based on the fourth authentication data and the score value based on the fifth authentication data is equal to or greater than the predetermined total value, determine that the first user is authenticated to be the first user himself or herself.

10. The information processing system according to claim 9, wherein the fourth authentication data are data based on biometric information of the first user using the first terminal, and the fifth authentication data are data based on a specific behavior of the first user using the first terminal.

11. An information processing system comprising: a first terminal storing, into a plurality of clouds in a distributed manner, a plurality of divided files generated by dividing a file including data of information generated by a first user into the plurality of divided files; an authentication server authenticating a user; and a second terminal comprising one or more processors configured to: determine that a sum of a score value based on first authentication data acquired from a second user using the second terminal, and a score value based on second authentication data acquired from the second user is equal to or greater than a predetermined total value; determine that the second user is authenticated to be the second user himself or herself by the authentication server; and acquire the plurality of divided files distributed across the plurality of clouds by the first terminal and acquire a file including data of information generated by the first user by restoring the acquired plurality of divided files; wherein the first terminal sets a starting date and time of use of the plurality of divided files by the second user; and wherein in response to determining that the starting date and time of use set by the first terminal is passed, the authentication server causes the second terminal to acquire the plurality of divided files distributed across the plurality of clouds.

12. An information processing method executed by an information processing system, the information processing method comprising: storing, by a first terminal in a distributed manner, a plurality of divided files generated by dividing a file including data of information generated by a first user into the plurality of divided files; determining, by a second terminal, that a sum of a score value based on first authentication data acquired from a second user using the second terminal, and a score value based on second authentication data acquired from the second user is equal to or greater than a predetermined total value; determining, by the second terminal, that the second user is authenticated to be the second user himself or herself; acquiring the plurality of divided files stored in the distributed manner and acquiring a file including data of information generated by the first user by restoring the acquired plurality of divided files; determine that a sum of a score value based on fourth authentication data acquired from the first user using the first terminal, and a score value based on fifth authentication data acquired from the first user is equal to or greater than the predetermined total value; and in response to determining that the sum of the score value based on the fourth authentication data and the score value based on the fifth authentication data is equal to or greater than the predetermined total value, determine that the first user is authenticated to be the first user himself or herself.

13. An information processing method executed by an information processing system, the information processing method comprising: storing, by a first terminal in a distributed manner, a plurality of divided files generated by dividing a file including data of information generated by a first user into the plurality of divided files; determining, by a second terminal, that a sum of a score value based on first authentication data acquired from a second user using the second terminal, and a score value based on second authentication data acquired from the second user is equal to or greater than a predetermined total value; determining, by the second terminal, that the second user is authenticated to be the second user himself or herself; acquiring the plurality of divided files stored in the distributed manner and acquiring a file including data of information generated by the first user by restoring the acquired plurality of divided files; setting a starting date and time of use of the plurality of divided files by the second user; and in response to determining that the starting date and time of use set by the first terminal is passed, causing the second terminal to acquire the plurality of divided files distributed across a plurality of clouds.

14. A non-transitory computer-readable recording medium storing a program, wherein: the program causes one or more processors of a first terminal to store, by a first terminal in a distributed manner, a plurality of divided files generated by dividing a file including data of information generated by a first user into the plurality of divided files; and the program causes one or more processors of a second terminal to: determine that a sum of a score value based on first authentication data acquired from a second user using the second terminal, and a score value based on second authentication data acquired from the second user is equal to or greater than a predetermined total value; determine that the second user is authenticated to be the second user himself or herself; acquire the plurality of divided files stored in the distributed manner and acquire a file including data of information generated by the first user by restoring the acquired plurality of divided files; determine that a sum of a score value based on fourth authentication data acquired from the first user using the first terminal, and a score value based on fifth authentication data acquired from the first user is equal to or greater than the predetermined total value; and in response to determining that the sum of the score value based on the fourth authentication data and the score value based on the fifth authentication data is equal to or greater than the predetermined total value, determine that the first user is authenticated to be the first user himself or herself.

15. A non-transitory computer-readable recording medium storing a program, wherein: the program causes one or more processors of a first terminal to store, by a first terminal in a distributed manner, a plurality of divided files generated by dividing a file including data of information generated by a first user into the plurality of divided files; and the program causes one or more processors of a second terminal to: determine that a sum of a score value based on first authentication data acquired from a second user using the second terminal, and a score value based on second authentication data acquired from the second user is equal to or greater than a predetermined total value; determine that the second user is authenticated to be the second user himself or herself; and acquire the plurality of divided files stored in the distributed manner and acquire a file including data of information generated by the first user by restoring the acquired plurality of divided files; wherein the first terminal sets a starting date and time of use of the plurality of divided files by the second user; and wherein in response to determining that the starting date and time of use set by the first terminal is passed, an authentication server causes the second terminal to acquire the plurality of divided files distributed across a plurality of clouds.

\* \* \* \* \*